US009989623B2

(12) United States Patent
Send et al.

(10) Patent No.: US 9,989,623 B2
(45) Date of Patent: Jun. 5, 2018

(54) DETECTOR FOR DETERMINING A LONGITUDINAL COORDINATE OF AN OBJECT VIA AN INTENSITY DISTRIBUTION OF ILLUMINATED PIXELS

(71) Applicant: BASF SE, Ludwigshafen (DE)

(72) Inventors: Robert Send, Karlsruhe (DE); Ingmar Bruder, Neuleiningen (DE); Stephan Irle, Siegen (DE); Erwin Thiel, Siegen (DE)

(73) Assignee: BASF SE, Ludwigshafen (DE)

( * ) Notice: Subject to any disclaimer, the term of this patent is extended or adjusted under 35 U.S.C. 154(b) by 84 days.

(21) Appl. No.: 14/897,467

(22) PCT Filed: Jun. 5, 2014

(86) PCT No.: PCT/EP2014/061682
§ 371 (c)(1),
(2) Date: Dec. 10, 2015

(87) PCT Pub. No.: WO2014/198623
PCT Pub. Date: Dec. 18, 2014

(65) Prior Publication Data
US 2016/0139243 A1 May 19, 2016

(30) Foreign Application Priority Data

Jun. 13, 2013 (EP) ...................................... 13171901
Mar. 12, 2014 (DE) ........................ 10 2014 006 280

(51) Int. Cl.
*G01S 5/16* (2006.01)
*G01C 3/32* (2006.01)
(Continued)

(52) U.S. Cl.
CPC ................ *G01S 5/16* (2013.01); *A63F 13/25* (2014.09); *G01B 11/002* (2013.01); *G01C 3/32* (2013.01);
(Continued)

(58) Field of Classification Search
CPC .................................. G01S 5/16; G01S 11/12
(Continued)

(56) References Cited

U.S. PATENT DOCUMENTS 3,035,176 A 5/1962 Kis et al.
3,112,197 A 11/1963 Neugebauer et al.
(Continued)

FOREIGN PATENT DOCUMENTS

CA 1065054 10/1979
CA 2196563 A1 12/1996
(Continued)

OTHER PUBLICATIONS

International Search Report dated Sep. 24, 2014 in PCT/EP2014/061682.
(Continued)

*Primary Examiner* — Seung C Sohn
(74) *Attorney, Agent, or Firm* — Oblon, McClelland, Maier & Neustadt, L.L.P.

(57) ABSTRACT

A detector for determining a position of at least one object. The detector includes: at least one optical sensor configured to detect a light beam traveling from the object towards the detector, the optical sensor including at least one matrix of pixels; and at least one evaluation device configured to determine an intensity distribution of pixels of the optical sensor that are illuminated by the light beam, the evaluation device further configured to determine at least one longitudinal coordinate of the object by using the intensity distribution.

20 Claims, 10 Drawing Sheets

(51) Int. Cl.
    *G01S 17/46*     (2006.01)
    *G01S 11/12*     (2006.01)
    *G01S 7/481*     (2006.01)
    *A63F 13/25*     (2014.01)
    *G01B 11/00*     (2006.01)
    *H04N 5/351*     (2011.01)

(52) U.S. Cl.
    CPC ............ *G01S 5/163* (2013.01); *G01S 7/4816* (2013.01); *G01S 11/12* (2013.01); *G01S 17/46* (2013.01); *H04N 5/351* (2013.01)

(58) Field of Classification Search
    USPC ........................................ 250/559.29–559.38
    See application file for complete search history.

(56) References Cited

U.S. PATENT DOCUMENTS

| | | | |
|---|---|---|---|
| 3,384,752 | A | 5/1968 | Odone |
| 3,562,785 | A | 2/1971 | Craig |
| 3,937,950 | A | 2/1976 | Hosoe et al. |
| 3,954,340 | A | 5/1976 | Blomqvist et al. |
| 4,023,033 | A | 5/1977 | Bricot et al. |
| 4,053,240 | A | 10/1977 | Aizawa et al. |
| 4,079,247 | A | 3/1978 | Bricot et al. |
| 4,256,513 | A | 3/1981 | Yoshida |
| 4,286,035 | A | 8/1981 | Nishizima et al. |
| 4,469,945 | A | 9/1984 | Hoeberechts et al. |
| 4,524,276 | A | 6/1985 | Ohtombe |
| 4,565,761 | A | 1/1986 | Katagiri et al. |
| 4,593,187 | A | 6/1986 | Grotts et al. |
| 4,603,258 | A | 7/1986 | Sher et al. |
| 4,647,193 | A | 3/1987 | Rosenfeld |
| 4,675,535 | A | 6/1987 | Tsunekawa et al. |
| 4,694,172 | A | 9/1987 | Powell et al. |
| 4,760,004 | A | 7/1988 | Rochat et al. |
| 4,760,151 | A | 7/1988 | Rochat et al. |
| 4,767,211 | A | 8/1988 | Munakata et al. |
| 4,773,751 | A | 9/1988 | Matsuda et al. |
| 4,927,721 | A | 5/1990 | Gratzel et al. |
| 4,952,472 | A | 8/1990 | Baranyi et al. |
| 5,082,363 | A | 1/1992 | Nakanishi et al. |
| 5,216,476 | A | 6/1993 | Lanckton |
| 5,350,644 | A | 9/1994 | Graetzel et al. |
| 5,856,844 | A * | 1/1999 | Batterman ............... G01S 5/163 345/158 |
| 6,266,142 | B1 * | 7/2001 | Junkins .................. G01S 5/163 250/559.14 |
| 6,359,211 | B1 | 3/2002 | Spitler et al. |
| 6,512,233 | B1 | 1/2003 | Sato et al. |
| 6,930,297 | B1 | 8/2005 | Nakamura |
| 6,995,445 | B2 | 2/2006 | Forrest et al. |
| 7,022,966 | B2 | 4/2006 | Gonzo et al. |
| 7,049,601 | B2 | 5/2006 | Agano |
| 7,196,317 | B1 | 3/2007 | Meissner, II et al. |
| 7,247,851 | B2 | 7/2007 | Okada et al. |
| 7,301,608 | B1 | 11/2007 | Mendenhall et al. |
| 7,417,716 | B2 | 8/2008 | Nagasaka et al. |
| 7,626,569 | B2 | 12/2009 | Lanier |
| 7,677,742 | B2 | 3/2010 | Hillmer et al. |
| 7,768,498 | B2 | 8/2010 | Wey |
| 7,773,070 | B2 | 8/2010 | Trisnadi et al. |
| 8,013,901 | B2 * | 9/2011 | Fukuhara ............... B60R 11/04 348/222.1 |
| 8,019,166 | B2 * | 9/2011 | Cheng .................. H04N 19/176 345/556 |
| 8,144,173 | B2 | 3/2012 | Baba |
| 8,228,299 | B1 | 7/2012 | Maloney et al. |
| 8,231,809 | B2 | 7/2012 | Pschirer et al. |
| 8,345,003 | B1 | 1/2013 | Trisnadi et al. |
| 8,363,526 | B2 | 1/2013 | Hotta et al. |
| 8,390,793 | B2 | 3/2013 | Yamaguchi et al. |
| 8,411,289 | B2 | 4/2013 | Takahashi |
| 8,477,580 | B2 | 7/2013 | Yamamoto et al. |
| 8,563,855 | B2 | 10/2013 | Pschirer et al. |
| 8,593,565 | B2 | 11/2013 | Shuster |
| 8,902,354 | B2 | 12/2014 | Shuster |
| 8,908,157 | B2 | 12/2014 | Eisele et al. |
| 9,104,910 | B2 | 8/2015 | Huang |
| 9,385,326 | B2 | 7/2016 | Wonneberger et al. |
| 9,389,315 | B2 | 7/2016 | Bruder et al. |
| 9,428,518 | B2 | 8/2016 | Wonneberger et al. |
| 9,557,856 | B2 | 1/2017 | Send et al. |
| 9,665,182 | B2 | 5/2017 | Send et al. |
| 9,741,954 | B2 | 8/2017 | Bruder et al. |
| 9,829,564 | B2 | 11/2017 | Bruder et al. |
| 2001/0025938 | A1 | 10/2001 | Imai |
| 2002/0011576 | A1 | 1/2002 | Cho et al. |
| 2003/0017360 | A1 | 1/2003 | Tai et al. |
| 2003/0094607 | A1 | 5/2003 | Guenther et al. |
| 2003/0128351 | A1 | 7/2003 | Schmidt |
| 2003/0132391 | A1 | 7/2003 | Agano |
| 2003/0227635 | A1 | 12/2003 | Muller |
| 2004/0178325 | A1 | 9/2004 | Forrest et al. |
| 2004/0216625 | A1 | 11/2004 | Birnstock et al. |
| 2005/0052120 | A1 | 3/2005 | Gupta et al. |
| 2005/0184301 | A1 | 8/2005 | Nagasaka et al. |
| 2005/0217720 | A1 | 10/2005 | Rey-Mermet et al. |
| 2005/0268957 | A1 | 12/2005 | Enomoto et al. |
| 2005/0269616 | A1 | 12/2005 | Andriessen |
| 2006/0049397 | A1 | 3/2006 | Pfeiffer et al. |
| 2006/0082546 | A1 | 4/2006 | Wey |
| 2007/0008515 | A1 | 1/2007 | Otani et al. |
| 2007/0010924 | A1 | 1/2007 | Otani et al. |
| 2007/0080925 | A1 | 4/2007 | Radivojevic et al. |
| 2007/0109558 | A1 | 5/2007 | Harding |
| 2007/0122927 | A1 | 5/2007 | Li et al. |
| 2007/0176165 | A1 | 8/2007 | Forrest et al. |
| 2008/0080789 | A1 | 4/2008 | Marks |
| 2008/0157965 | A1 | 7/2008 | Shahar |
| 2008/0259310 | A1 | 10/2008 | Wada |
| 2008/0269482 | A1 | 10/2008 | Pschirer et al. |
| 2008/0297487 | A1 | 12/2008 | Hotelling et al. |
| 2009/0009747 | A1 | 1/2009 | Wolf |
| 2009/0046543 | A1 | 2/2009 | De Hoog et al. |
| 2009/0097010 | A1 | 4/2009 | Yamaguchi |
| 2009/0153841 | A1 | 6/2009 | Ophey et al. |
| 2009/0185158 | A1 | 7/2009 | Wolf |
| 2009/0188547 | A1 | 7/2009 | Hayashi et al. |
| 2009/0225319 | A1 | 9/2009 | Lee |
| 2009/0231582 | A1 | 9/2009 | Aebischer |
| 2010/0073462 | A1 | 3/2010 | Lee et al. |
| 2010/0091263 | A1 | 4/2010 | Kumagai et al. |
| 2010/0141964 | A1 | 6/2010 | Horsch |
| 2010/0194942 | A1 | 8/2010 | Wada |
| 2010/0231513 | A1 | 9/2010 | Deliwala |
| 2010/0258179 | A1 | 10/2010 | Wieting |
| 2010/0279458 | A1 | 11/2010 | Yeh |
| 2010/0282309 | A1 | 11/2010 | Pschirer et al. |
| 2010/0283868 | A1 | 11/2010 | Clark et al. |
| 2010/0297405 | A1 | 11/2010 | Flores et al. |
| 2011/0055846 | A1 | 3/2011 | Perez et al. |
| 2011/0096319 | A1 | 4/2011 | Otani et al. |
| 2011/0099105 | A1 | 4/2011 | Mennie et al. |
| 2011/0103215 | A1 | 5/2011 | Hotta et al. |
| 2011/0123188 | A1 | 5/2011 | Cardwell et al. |
| 2011/0194097 | A1 | 8/2011 | Yamaguchi et al. |
| 2011/0284756 | A1 | 11/2011 | Miko et al. |
| 2011/0297235 | A1 | 12/2011 | Bergmann |
| 2011/0306413 | A1 | 12/2011 | Bickerstaff et al. |
| 2012/0061587 | A1 | 3/2012 | Wu |
| 2012/0063287 | A1 | 3/2012 | Yamamoto et al. |
| 2012/0206336 | A1 | 8/2012 | Bruder |
| 2012/0242867 | A1 | 9/2012 | Shuster |
| 2012/0249998 | A1 | 10/2012 | Eisele et al. |
| 2012/0250137 | A1 | 10/2012 | Maxik et al. |
| 2012/0262365 | A1 | 10/2012 | Mallinson |
| 2012/0289672 | A1 | 11/2012 | Kastler et al. |
| 2013/0076695 | A1 | 3/2013 | Gomez et al. |
| 2013/0135604 | A1 | 5/2013 | Gogolla et al. |
| 2013/0201492 | A1 | 8/2013 | Takahashi |
| 2013/0222551 | A1 | 8/2013 | Shamir et al. |
| 2013/0235390 | A1 | 9/2013 | Holzapfel et al. |

(56) References Cited

U.S. PATENT DOCUMENTS

| | | |
|---|---|---|
| 2013/0271818 A1 | 10/2013 | Maxik et al. |
| 2014/0015242 A1 | 1/2014 | Forrest |
| 2014/0066656 A1 | 3/2014 | Bruder et al. |
| 2014/0078376 A1 | 3/2014 | Shuster |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0291480 A1 | 10/2014 | Bruder et al. |
| 2014/0347442 A1 | 11/2014 | Wang et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0286340 A1 | 10/2015 | Send et al. |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0266257 A1 | 9/2016 | Bruder et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1809801 A | 7/2006 |
| CN | 1896686 A | 1/2007 |
| CN | 101290348 A | 10/2008 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549381 A | 7/2012 |
| CN | 102737435 | 10/2012 |
| CN | 103106411 A | 5/2013 |
| CN | 103322910 A | 9/2013 |
| CN | 103492835 | 1/2014 |
| CN | 103649677 | 3/2014 |
| CN | 101449181 | 6/2014 |
| DE | 2 417 854 A1 | 10/1974 |
| DE | 25 01 124 A1 | 8/1975 |
| DE | 32 25 372 A1 | 2/1983 |
| DE | 196 04 856 | 8/1997 |
| DE | 10146752 | 4/2002 |
| DE | 10 2005 043 627 A1 | 3/2007 |
| DE | 10 2005 053 995 A1 | 5/2007 |
| DE | 10 2007 037 875 A1 | 2/2009 |
| EP | 0 112 169 A2 | 6/1984 |
| EP | 0 185 450 A2 | 6/1986 |
| EP | 0 754 930 A2 | 1/1997 |
| EP | 1 176 646 A1 | 1/2002 |
| EP | 1 191 819 A2 | 3/2002 |
| EP | 1 191 819 A3 | 3/2002 |
| EP | 1 330 117 A2 | 7/2003 |
| EP | 1 330 117 A3 | 7/2003 |
| EP | 1 667 246 A1 | 6/2006 |
| EP | 1 832 910 | 9/2007 |
| EP | 2 205 657 | 7/2010 |
| EP | 2 220 141 | 8/2010 |
| EP | 2 507 286 | 10/2012 |
| EP | 2 527 866 A1 | 11/2012 |
| EP | 2 725 617 A1 | 4/2014 |
| EP | 2 813 324 | 12/2014 |
| EP | 2 818 493 A1 | 12/2014 |
| EP | 2 831 180 | 2/2015 |
| EP | 3 008 421 | 4/2016 |
| EP | 3 008 757 | 4/2016 |
| EP | 3 036 503 | 6/2016 |
| GB | 2 432 723 A | 5/2007 |
| JP | S59-50579 | 3/1984 |
| JP | H02-170004 | 6/1990 |
| JP | 5-48833 A | 2/1993 |
| JP | 8-159714 A | 6/1996 |
| JP | 8-292586 A | 11/1996 |
| JP | 10-26513 A | 1/1998 |
| JP | 10-221064 A | 8/1998 |
| JP | H11-230860 | 8/1999 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-241340 A | 9/2005 |
| JP | 2007-530976 | 11/2007 |
| JP | 2008-522418 | 6/2008 |
| JP | 2010-531520 | 9/2010 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | WO 99/09603 A1 | 2/1999 |
| WO | WO 01/29576 A1 | 4/2001 |
| WO | WO 02/101838 A1 | 12/2002 |
| WO | 03/012371 A1 | 2/2003 |
| WO | WO 2004/114112 A1 | 12/2004 |
| WO | WO 2005/106965 A1 | 11/2005 |
| WO | WO 2006/134370 A1 | 12/2006 |
| WO | WO 2007/054470 A1 | 5/2007 |
| WO | WO 2009/013282 A1 | 1/2009 |
| WO | WO 2009/053291 A1 | 4/2009 |
| WO | WO 2009/058115 A1 | 5/2009 |
| WO | WO 2010/088032 A2 | 8/2010 |
| WO | WO 2010/094636 A1 | 8/2010 |
| WO | WO 2011/067192 A2 | 6/2011 |
| WO | WO 2011/083722 | 7/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | WO 2012/110924 A1 | 8/2012 |
| WO | WO 2012/139354 | 10/2012 |
| WO | 2012/152812 A1 | 11/2012 |
| WO | 2012/168395 A1 | 12/2012 |
| WO | WO 2013/009676 | 1/2013 |
| WO | WO 2013/091016 A1 | 6/2013 |
| WO | 2013/118037 A1 | 8/2013 |
| WO | WO 2013/144177 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | 2014/178923 A2 | 11/2014 |
| WO | 2014/198623 A1 | 12/2014 |
| WO | 2014/198625 A1 | 12/2014 |

(56) References Cited

FOREIGN PATENT DOCUMENTS

| WO | 2014/198626 A1 | 12/2014 |
|----|----------------|---------|
| WO | 2014/198629 A1 | 12/2014 |
| WO | 2015/024871 A1 | 2/2015 |
| WO | WO 2015/091607 | 6/2015 |
| WO | WO 2015/159192 | 10/2015 |
| WO | WO 2015/161989 | 10/2015 |
| WO | 2015/193804 A2 | 12/2015 |
| WO | 2016/005893 A1 | 1/2016 |
| WO | 2016/092454 A1 | 6/2016 |

OTHER PUBLICATIONS

International Preliminary Report on Patentability and Written Opinion dated Dec. 15, 2015 in PCT/EP2014/061682.
Shinsaku Hiura, et al., "Depth Measurement by the Multi-Focus Camera" IEEE—Computer Vision and Pattern Recognition, XP010291663, Jun. 1998, pp. 953-959.
Supplementary European Search Report issued Nov. 19, 2014 in Patent Application No. 12746808.0.
International Search Report and Written Opinion dated May 31, 2012 in PCT/IB2012/050592.
Extended European Search Report dated Aug. 23,2011 in Patent Application No. 11154531.5 (with English Translation of Category of Cited Documents).
Office Action dated Apr. 22. 2015 in Chinese Patent Application No. 201280018328.5.
International Search Report and Written Opinion dated May 16, 2014 in PCT/IB2013/061095.
International Preliminary Report on Patentability and Written Opinion dated Dec. 23, 2015 in PCT/EP2014/061688.
International Search Report dated Sep. 8, 2014 in PCT/EP2014/061688.
International Search Report and Written Opinion dated Oct. 31, 2014 in PCT/EP2014/067466.
International Search Report and Written Opinion dated Nov. 21, 2014 in PCT/EP2014/067465.
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003. pp. 14704-14705.
A. Balionyte, et at, "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara. et at, "Fabrication of Dye-Sensitized Solar Cells Using Triethylamine Hydrothiocyanate as a Cui Crystal Growth Inhibitor", Langmuir, vol. 18., 2002, pp. 10493-10495.

Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24,1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High Tg blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et at, "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353,1991, pp. 737-740.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
Atte Haapalinna, et al., "Measurement of the Absolute Linearity of Photodetectors with a Diode Laser," Meas. Sci. Technol., vol. 10, (1999) 1075-1078.
M. R. Andersen, et al., "Kinect Depth Sensor Evaluation for Computer Vision Applications", Electrical and Computer Engineering, Technical Report ECE-TR-6, Aarhus University, 2012. 39 pages.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462.
Takumi Kinoshita, et al., "Wideband dye-sensitized solar cells employing a phosphine-coordinated ruthenium sensitizer", Nature Photonics, vol. 7, 2013, pp. 535-539.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Volker Viereck, et al., "Large-area applications of optical MEMS: micromirror arrays guide daylight, optimize indoor illumination" Optical Components. Photonik International 2. 2009, pp. 48-49.
C.U. Murade, et al., "High speed adaptive liquid microlens array", Optics Express, vol. 20, No. 16, Jul. 2012, pp. 18180-18187.

(56) References Cited

OTHER PUBLICATIONS

Jason Heikenfeld. et al., "Recent Progress in Arrayed Electrowetting Optics", Optics & Photonics News. Jan. 2009, 7 pages, www.osa-opn.org.
Tao Peng, "Algorithms and models for 3-D shape measurement using digital fringe projections", Dissertation, University of AY Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang, et al., "An Intelligent Automated Door Control System Based on a Smart Camera", Sensors, 2013. 13(5), pp. 5923-5936.
"So funktioniert die DLP-Technologie" DLP-Technologie—www.dlp.com/de/technology/how-dlp-works, 2014, 2 Pages.
"New—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, 8 pages.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
International Search Report and Written Opinion dated May 31, 2012 in PCT/IB2012/050592 filed on Feb. 9, 2012.
International Search Report and Written Opinion dated Sep. 3, 2014 in PCT/EP2014/061691.
International Preliminary Report on Patentability dated Sep. 25, 2015 in PCT/EP2014/061691.
International Search Report and Written Opinion of the International Searching Authority dated Mar. 12, 2015 in PCT/EP2014/078155 Filed Dec. 17, 2014.
International Preliminary Report on Patentability and Written Opinion dated Dec. 23, 2015 in PCT/EP2014/061695.
Written Opinion of the International Searching Authority dated Sep. 9, 2014 in PCT/EP2014/061688 filed Jun. 5, 2014.
Kuthirumal, S., et al., "Flexible Depth of Field Photography," IEEE Transactions on Pattern Analysis and Machine Intelligence, vol. 33, No. 1 (2011), pp. 58-71.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
Wang, Feng-Peng et al., "Distance Measurement using Digital Cameras Based on Laser Spot Detection", published on Jun. 30, 2011, School of Physics and Electronic Information, Garman Normal University, Ganzhou 341000, China (with English Abstract).
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriei Levy et al., "Tunable optofluidic devices", Microfluid Nanofluid, 2008, vol. 4, pp. 97-105.
International Search Report and Written Opinion dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Search Report dated Mar. 22, 2016 in PCT/IB2015/059408 filed Dec. 7, 2015.
International Search Report and Written Opinion dated Jan. 18, 2016 in PCT/IB2015/057412 filed Sep. 28, 2015.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005. pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 . No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated May 27, 2016, in PCT/EP2016/051817, filed Jan. 28, 2016.
http://www.plenoptic.info/pages/refocusing.html.
C. Hahne, A. Aggoun, S. Haxha, V. Velisavljevic, and J. Fernández, "Light field geometry of a standard plenoptic camera." Opt. Express 22, 26659-26673 (2014).
C Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission arid Display of 3D Video (3DTV-CON), Jul. 2-4, 2014.
C. Hahne, A. Aggoun, and V. Velisavljevic, "The refocusing distance of a standard plenoptic photograph." in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).

* cited by examiner

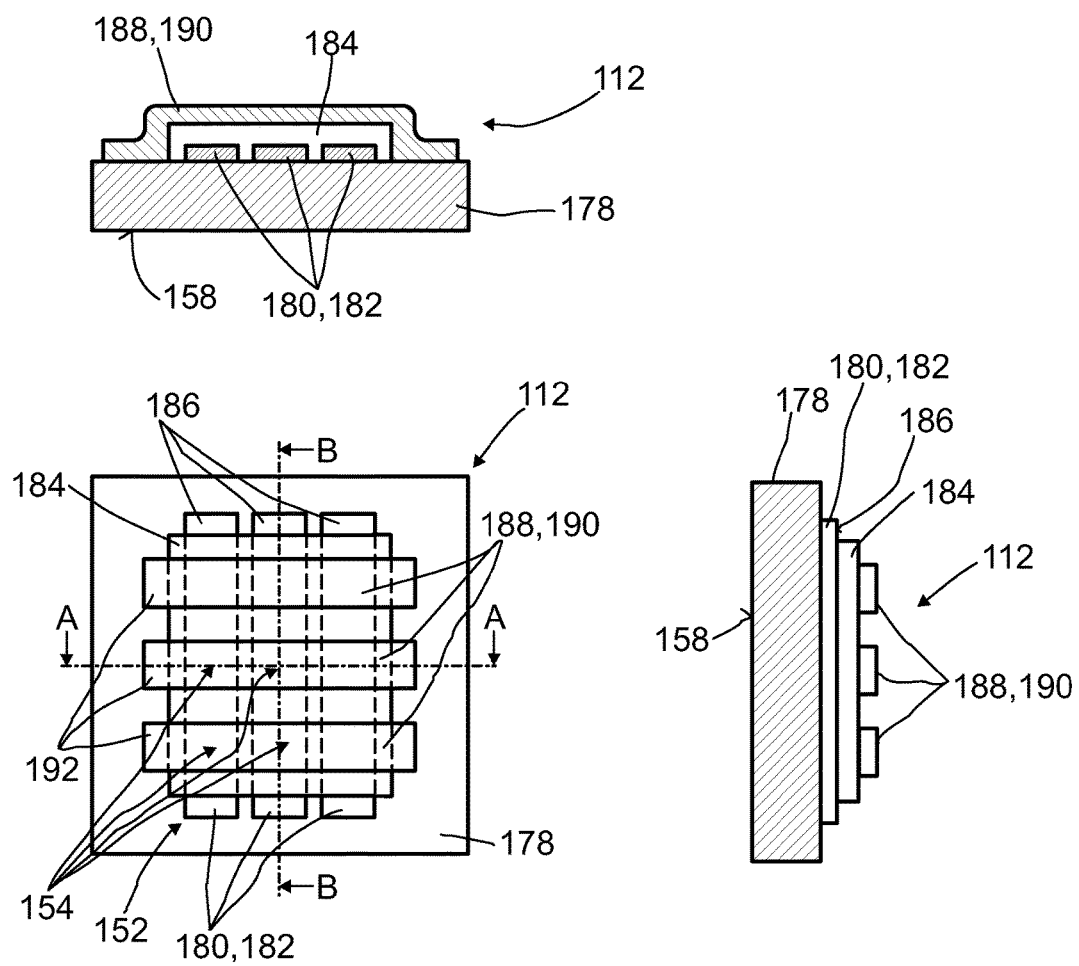

DETECTOR FOR DETERMINING A LONGITUDINAL COORDINATE OF AN OBJECT VIA AN INTENSITY DISTRIBUTION OF ILLUMINATED PIXELS

FIELD OF THE INVENTION

The present invention is based on previous European patent application number 13171901.5, the full content of which is herewith included by reference. The invention relates to a detector, a detector system and a method for determining a position of at least one object. The invention further relates to a human-machine interface for exchanging at least one item of information between a user and a machine, an entertainment device, a tracking system, a camera and various uses of the detector device. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples of detectors for optically detecting objects are triangulation systems, by means of which distance measurements can likewise be carried out.

In US 2007/0080925 A1, a low power consumption display device is disclosed. Therein, photoactive layers are utilized that both respond to electrical energy to allow a display device to display information and that generate electrical energy in response to incident radiation. Display pixels of a single display device may be divided into displaying and generating pixels. The displaying pixels may display information and the generating pixels may generate electrical energy. The generated electrical energy may be used to provide power to drive an image.

In EP 1 667 246 A1, a sensor element capable of sensing more than one spectral band of electromagnetic radiation with the same spatial location is disclosed. The element consists of a stack of sub-elements each capable of sensing different spectral bands of electromagnetic radiation. The sub-elements each contain a non-silicon semiconductor where the non-silicon semiconductor in each sub-element is sensitive to and/or has been sensitized to be sensitive to different spectral bands of electromagnetic radiation.

In WO 2012/110924 A1, the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

U.S. provisional applications 61/739,173, filed on Dec. 19, 2012, 61/749,964, filed on Jan. 8, 2013, and 61/867,169, filed on Aug. 19, 2013, and international patent application PCT/IB2013/061095, filed on Dec. 18, 2013, the full content of all of which is herewith included by reference, disclose a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

Despite the advantages implied by the above-mentioned devices and detectors, specifically by the detectors disclosed in WO 2012/110924 A1, U.S. 61/739,173 and 61/749,964, several technical challenges remain. Thus, generally, a need exists for detectors for detecting a position of an object in space which is both reliable and may be manufactured at low cost.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably at a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a detector for determining a position of at least one object is disclosed. As used herein, the term position refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
at least one optical sensor, the optical sensor being adapted to detect a light beam traveling from the object towards the detector, the optical sensor having at least one matrix of pixels; and
at least one evaluation device, the evaluation device being adapted for determining an intensity distribution of pixels of the optical sensor which are illuminated by the light beam, the evaluation device further being adapted for determining at least one longitudinal coordinate of the object by using the intensity distribution.

As used herein, an optical sensor generally refers to a light-sensitive device for detecting a light beam, such as for detecting an illumination and/or a light spot generated by a light beam. The optical sensor may be adapted, as outlined in further detail below, to determine at least one longitudinal coordinate of the object and/or of at least one part of the object, such as at least one part of the object from which the at least one light beam travels towards the detector.

As used herein, the term "longitudinal coordinate" generally refers to a coordinate in a coordinate system, wherein a change in the longitudinal coordinate of an object generally implies a change in a distance between the object and the detector. Thus, as an example, the longitudinal coordinate may be a coordinate on a longitudinal axis of a coordinate system in which the longitudinal axis extends away from the detector and/or in which the longitudinal axis is parallel and/or identical to an optical axis of the detector. Thus, generally, the longitudinal coordinate of the object may constitute a distance between the detector and the object and/or make contributions to a distance between the detector and the object.

Similarly, as will be outlined in further detail below, a transversal coordinate may simply referred to a coordinate in a plane perpendicular to the above-mentioned longitudinal axis of the coordinate system. As an example, a Cartesian coordinate system may be used, with a longitudinal axis extending away from the detector and with two transversal axes extending perpendicular to the longitudinal axis.

As further used herein, a pixel generally refers to a light-sensitive element of the optical sensor, such as a minimum uniform unit of the optical sensor adapted to generate a light signal. As an example, each pixel may have a light-sensitive area of 1 $\mu m^2$ to 5,000,000 $\mu m^2$, preferably 100 $\mu m^2$ to 4,000,000 $\mu m^2$, preferably 1,000 $\mu m^2$ to 1,000,000 $\mu m^2$ and more preferably 2,500 $\mu m^2$ to 50,000 $\mu m^2$. Still, other embodiments are feasible. The expression matrix generally refers to an arrangement of a plurality of the pixels in space, which may be a linear arrangement or an areal arrangement. Thus, generally, the matrix preferably may be selected from the group consisting of a one-dimensional matrix and a two-dimensional matrix. As an example, the matrix may comprise 100 to 100,000,000 pixels, preferably 1,000 to 1,000,000 pixels and, more preferably, 10,000 to 500,000 pixels. Most preferably, the matrix is a rectangular matrix having pixels arranged in rows and columns.

As further used herein, the term evaluation device generally refers to an arbitrary device adapted to perform the named operations, preferably by using at least one data processing device and, more preferably, by using at least one processor. Thus, as an example, the at least one evaluation device may comprise at least one data processing device having a software code stored thereon comprising a number of computer commands.

The optical sensor may be adapted to generate at least one signal indicating an intensity of illumination for each of the pixels. Thus, as an example, the optical sensor may be adapted to generate at least one electronic signal for each of the pixels, each signal indicating the intensity of illumination for the respective pixel. This signal, in the following, is also referred to as the intensity of the pixel and/or as the pixel intensity. The signal may be an analogue and/or a digital signal. Further, the detector may comprise one or more signal processing devices, such as one or more filters and/or analogue-digital-converters for processing and/or preprocessing the at least one signal.

As further used herein, an intensity distribution generally refers to a plurality or entity of intensity values or items of intensity information for a plurality of local positions at which the respective intensity value is measured by the optical sensor, such as by the pixels of the optical sensor. Thus, as an example, an intensity distribution may comprise a matrix of intensity values or items of intensity information, wherein a position of the intensity values or items of intensity information within the matrix refers to a local position on the optical sensor. The intensity distribution specifically may comprise intensity values as a function of a transversal position of the respective pixel in a plane perpendicular to an optical axis of the optical sensor. Additionally or alternatively, the intensity distribution may comprise intensity values as a function of a pixel coordinate of the pixels of the matrix. Again, additionally or alternatively, the intensity distribution may comprise a distribution of a number # of pixels having a specific intensity as a function of the intensity.

As further used herein, a determination of at least one longitudinal coordinate of the object by using the intensity distribution generally refers to the fact that the intensity distribution is evaluated in order to determine the longitudinal position of the object. As an example, the evaluation device may be adapted to determine the longitudinal coordinate of the object by using a predetermined relationship between the intensity distribution and the longitudinal coordinate. The predetermined relationship may be stored in a data storage of the evaluation device, such as in a lookup table. Additionally or alternatively, empirical evaluation functions may be used for predetermined relationships between the intensity distribution and the longitudinal coordinate.

The intensity distribution generally may approximate an intensity distribution of an illumination by a Gaussian light beam. Other intensity distributions, however, are possible, specifically in case Non-Gaussian light beams are used.

For determining the at least one longitudinal coordinate of the object, the evaluation device may simply use a predetermined relationship between the intensity distribution and the longitudinal coordinate and/or may apply one or more evaluation algorithms. Specifically, the evaluation device may be adapted to determine at least one intensity distribution function approximating the intensity distribution. As used herein, an intensity distribution function generally is a mathematical function, such as a two-dimensional function $f(x)$ or a three-dimensional function $f(x, y)$, which approximates the actual intensity distribution of the at least one optical sensor and/or a part thereof. Thus, the intensity distribution function may be a fit function derived by applying one or more well-known fitting or approximation algorithms, such as a regression analysis like least squares fit or others. These fitting algorithms generally are known to the skilled person. As an example, one or more predetermined fitting functions may be given, with one or more parameters, wherein the parameter is chosen such that a best fit to the intensity distribution is achieved.

As outlined above, the intensity distribution function may approximate the full intensity distribution or a part thereof. Thus, as an example, a region of the matrix may be used and evaluated for determining the intensity distribution function, such as a three-dimensional intensity distribution function $f(x, y)$. Additionally or alternatively, a two-dimensional intensity distribution function $f(x)$ may be used, such as along an axis or line through the matrix. As an example, a center of illumination by the light beam may be determined, such as by determining the at least one pixel having the highest illumination, and a cross-sectional axis may be chosen through the center of illumination. The intensity distribution function may be a function of a coordinate along this cross-sectional axis through the center of illumination, thereby deriving a two-dimensional intensity distribution function. Other evaluation algorithms are feasible.

As outlined above, the evaluation device is adapted to determine the longitudinal coordinate of the object by using a predetermined relationship between a longitudinal coordinate and the intensity distribution function. Additionally or alternatively, specifically in case one or more intensity distribution functions are fitted to the actual intensity distribution, at least one parameter derived from the intensity distribution function may be determined, and the longitudinal coordinate of the object may be determined by using a predetermined relationship between the at least one parameter, such as the at least one fit parameter, and the longitudinal coordinate of the object, such as the distance between the object and the detector.

Further embodiments relate to the nature of the at least one intensity distribution function. Specifically, the intensity distribution function may be a function describing a shape of the at least one light beam, in the following also referred to as a beam shape. Thus, generally, the intensity distribution function may be or may comprise a beam shape function of the light beam. As used herein, a beam shape function generally refers to a mathematical function describing a spatial distribution of an electric field and/or of an intensity of a light beam. As an example, a beam shape function may be a function describing an intensity of a light beam in a plane perpendicular to an axis of propagation of the light beam, wherein, optionally, a position along the axis of propagation may be an additional coordinate. Therein, generally, arbitrary types of coordinate systems may be used for describing the spatial distribution of the electric field and/or the intensity. Preferably, however, a coordinate system is used which comprises position in a plane perpendicular to an optical axis of the detector.

As outlined above, the intensity distribution function comprises a two-dimensional or a three-dimensional mathematical function approximating an intensity information contained within at least part of the pixels of the optical sensor. Thus, as further outlined above, one or more fitting algorithms may be used for determining the at least one intensity distribution function, preferably in at least one plane parallel to the at least one optical sensor. The two-dimensional or three-dimensional mathematical function specifically may be a function of at least one pixel coordinate of the matrix of pixels. Additionally or alternatively, as outlined above, other coordinates may be used, such as one or more coordinates along one or more lines or axes in a plane of the at least one optical sensor, such as along a cross-sectional line through a maximum of intensity of the light beam on the at least one optical sensor. Thus, specifically, the at least one intensity distribution function may be a cross-sectional intensity distribution function describing an intensity distribution through a center of illumination.

When using one or more mathematical functions, a pixel position of the pixels of the matrix specifically may be defined by $(x, y)$, with $x, y$ being pixel coordinates. Additionally or alternatively, circular or spherical coordinates may be used, such as coordinates with $r$ being a distance from a central point or axis. The latter specifically may be useful for circular-symmetric intensity distributions as is typically the case for e.g. Gaussian light beams illuminating a surface perpendicular to an axis of propagation of the light beams (see e.g. equation (2) below). The two-dimensional or three-dimensional mathematical function specifically may comprise one or more functions selected from the group consisting of f(x), f(y), f(x, y). As outlined above, however, the coordinate systems may be used with one or more coordinates x' and/or y', preferably in a plane of the matrix. Thus, as outlined above, a coordinate x' may be chosen on an axis crossing a center of illumination of the matrix by the light beam. Thereby, an intensity distribution function f(x') may be derived, describing or approximating a cross-sectional intensity distribution through the center of illumination.

As outlined above, the intensity distribution function generally may be an arbitrary function which typically occurs when a surface is illuminated by a light beam, such as a Gaussian light beam. Therein, one or more fitting parameters may be used for fitting the function to the actual illumination or intensity distribution. As an example, for Gaussian functions as will be explained in further detail below (see e.g. equation (2) below), the width $w_0$ and/or the longitudinal coordinate z may be appropriate fitting parameters.

The two-dimensional or three-dimensional mathematical function specifically selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function. Combinations of these and/or other intensity distribution functions may be possible.

The above-mentioned intensity distribution may be determined in one plane or in a plurality of planes. Thus, as outlined above, the detector may comprise one optical sensor, such as one optical sensor defining a sensor plane, only. Alternatively, the detector may comprise a plurality of optical sensors, such as a sensor stack comprising a plurality of optical sensors, each optical sensor defining a sensor plane. Consequently, the detector may be adapted to determine the intensity distribution in one plane, such as the sensor plane of the single optical sensor, or, alternatively, to determine the intensity distribution in a plurality of planes, such as in a plurality of parallel planes. As an example, the detector may be adapted to determine at least one intensity distribution per plane, such as for each sensor plane. In case the detector is adapted to determine intensity distributions in a plurality of planes, the planes specifically may be perpendicular to the optical axis of the detector. The planes may be determined by optical sensors, such as by sensor planes of the optical sensors, such as by sensor planes of the optical sensors of a sensor stack. Thereby, specifically by using a sensor stack, the detector may be adapted to determine a plurality of intensity distributions for different longitudinal positions along an optical axis of the detector.

In case a plurality of optical sensors is used, specifically a stack of optical sensors, the optical sensors preferably are fully or partially transparent, as will be outlined in further detail below. Thus, the light beam preferably may be transmitted through the optical sensors of the stack or at least through one or more of the optical sensors of the stack, such that the intensity distributions may be measured for at least two sensor planes of the optical sensors. Other embodiments, however, are feasible.

In case the detector is adapted to determine intensity distributions for a plurality of planes perpendicular to the optical axis, the evaluation device specifically may be adapted to evaluate changes in the intensity distributions or may be adapted to compare the intensity distributions with each other and/or with a common standard. Consequently, the evaluation device, as an example, may be adapted to evaluate changes in the intensity distribution as a function of a longitudinal coordinate along the optical axis. As an example, the intensity distributions may change when the light beam propagates along the optical axis. The evaluation device specifically may be adapted to evaluate a change in the intensity distribution as a function of a longitudinal coordinate along the optical axis for determining the longitudinal coordinate of the object. Thus, as an example, for Gaussian light beams, the width of the light beam changes with propagation, as is evident to the skilled person, and as shown in equation (3) below. By evaluating changes in the intensity distribution, the width of the light beam and changes of the width of the light beam may be determined, thereby allowing for determining a focal point of the light beam and thereby allowing for determining a longitudinal coordinate of the object from which the light beam propagates towards the detector.

In case intensity distributions are determined in a plurality of planes, intensity distribution functions may be derived for one, more than one or even all of the planes. For potential embodiments of deriving intensity distribution functions, specifically beam shape functions, reference may be made to the embodiments given above. Specifically, the evaluation device may be adapted to determine a plurality of intensity distribution functions, such as one or more than one intensity distribution function per intensity distribution, wherein each intensity distribution function approximates the intensity distribution in one of the planes. The evaluation device may further be adapted to derive the longitudinal coordinate of the object from the plurality of intensity distribution functions. Therein, again, a predetermined relationship between the intensity distribution functions and the longitudinal coordinate of the object may be used, such as a simple lookup table. Additionally or alternatively, a dependency of at least one parameter of the intensity distribution functions on the position of the optical sensor along an optical axis and/or a longitudinal position may be determined, such as a change of the beam waist or beam diameter when the light beam travels along the optical axis. Thereof, such as by using equation (3) below, the focal position of the light beam may be derived and, thus, information on the longitudinal coordinate of the object may be gained.

As outlined above, in case a plurality of intensity distribution functions is determined, the intensity distribution function specifically may be beam shape functions. Specifically, the same type of beam shape function may be used and/or may be fitted to each of the intensity distributions. The filling parameters or parameters may contain valuable information on the position of the object.

As outlined above, the evaluation device specifically may be adapted to evaluate the intensity distribution functions. Specifically, the evaluation device may be adapted to derive at least one beam parameter from each intensity distribution function. Thus, as an example, a center of intensity may be derived. Additionally or alternatively, a beam width, a beam waist or beam diameter may be derived, such as a Gaussian beam waist according to equation (3) below. As outlined above and as will be outlined in further detail below, the beam waist may be used for determining a longitudinal coordinate. The evaluation device specifically may be adapted to evaluate a change of the at least one beam parameter as a function of a longitudinal coordinate along the optical axis for determining the longitudinal coordinate of the object. Additionally, as will be outlined in further detail below, a transversal position may be derived, such as at least one transversal coordinate, such as by evaluating at least one parameter derived by evaluating the intensity distribution function, specifically the beam shape functions. Thus, as an example, the above-mentioned center of illumination may provide valuable information on a transversal position of the object, such as by providing at least one transversal coordinate. By tracking the positions of the centers of illumination for a stack of optical sensors, a beam tracing may be performed, thereby allowing for determining a transversal position, such as one or more than one transversal coordinate of the object.

The above-mentioned at least one beam parameter which may be derived from the plurality of beam shape functions, such as in a plurality of planes perpendicular to an optical axis of the detector, generally may be an arbitrary beam parameter or combination of beam parameters. Specifically, the at least one beam parameter may be selected from the group consisting of: a beam diameter; a beam waist; a Gaussian beam parameter. Additionally or alternatively, as outlined above, a center of illumination may be determined.

As outlined above, the evaluation device specifically may be adapted to determine the longitudinal coordinate of the object by using a predetermined relationship between the beam parameters and the longitudinal coordinate. The predetermined relationship may be or may comprise an analytical relationship such as the known propagation properties of a Gaussian light beam, such as given in formulae (2) or (3) below. Additionally or alternatively, other types of predetermined relationships may be used, such as empirical or semi-empirical relationships. Again, additionally or alternatively, the predetermined relationship may be provided as a lookup table, indicating the at least one longitudinal coordinate as a function of the at least one parameter. Various types of evaluation routines are possible and may easily be implemented within the evaluation device.

By evaluating intensity distributions in a plurality of planes, the detector may be adapted to record an image stack, i.e. a stack of intensity values of pixels matrices in a plurality of planes. The image stack may be recorded as a three-dimensional matrix of pixels. By evaluating intensity distribution functions in a plurality of planes, such as by deriving intensity distribution functions in a plurality of planes, various types of image evaluation are feasible. Specifically, a three-dimensional image of a light field of the light beam may be derived and/or recorded. Thus, specifically by using pixelated optical sensors such as pixelated transparent or semitransparent organic optical sensors as outlined in further detail below, the detector may be adapted to record a picture stack at different longitudinal positions along an optical axis, such as at different distances to a lens or lens system of the detector. In case a plurality of images is recorded by using a stack of optical sensors, the recording may take place in a serial fashion or simultaneously.

The picture stack, as outlined above, may be analyzed to obtain 3D-information. In order to analyze the picture stack, the detector and specifically the evaluation device may be adapted to fit beam shape functions to model the illumination of the pixels, such as to model the intensity distributions within the pictures of the picture stack. The beam shape functions may be compared among the pictures of the picture stack in order to obtain information regarding the light beam and, thereby, in order to obtain information on the longitudinal position of the object and, optionally, on a transversal position of the object. As an example and as outlined above, a broadening or focusing of the light beam may be determined, such as by evaluating a beam width or a beam waist as a function of a longitudinal coordinate along an optical axis, such as as a function of distance from the lens. Focusing or defocusing properties of the lens or other elements of a transfer device of the detector may be taken into account, as generally known to the skilled person in the field of optics. Thus, as an example, in case lens properties are known and in case a broadening or focusing of the light beam is determined by evaluating the intensity distribution functions must specifically the beam shape functions, the distance of the object from which the light beam propagates towards the detector may be determined, such as by calculation or by using known all predetermined relationships.

The evaluation of the intensity distribution in one plane for the evaluation of the intensity distributions in a plurality of planes may be performed in various ways. Thus, as outlined above, various types of intensity distribution functions may be used. As an example, the rotational-symmetric intensity distribution functions may be used which are rotationally symmetric about a center of illumination on the plane. Additionally or alternatively, one or more intensity distribution functions having other types of symmetry may be used such as lower degrees of symmetry. Further, one or more point-symmetric and/or mirror-symmetric intensity distribution functions may be used. Further, combinations of two or more intensity distribution functions may be used, such as combinations of one or more Gaussian functions and one or more polynomials. Further, derivatives of rotationally symmetric functions may be used, and/or products of several functions. Further, at least one intensity distribution function may be used which is a linear combination of two or more functions, such as a linear combination of two or more Gaussian functions having different exponents. Other types of intensity distribution functions may be used. Therein, intensities may be evaluated in various ways. An efficient way of analyzing the intensity distributions, also referred to as images, may be an analysis of edges within the intensity distributions. The analysis of edges within intensity distributions may be performed in addition or alternatively to evaluating beam shapes. Still, the analysis of edges may be preferable, since the analysis of edges generally allows for deducing longitudinal coordinates for objects with little or no structure or contrast. Thus, generally, the detector and the evaluation device may be adapted to determine edges within the at least one intensity distribution or within the plurality of intensity distributions in a plurality of planes, also referred to as the image stack. The development of edges and/or a comparison of the edges within the images of the image stack may allow for deriving an item of longitudinal position information of the object.

The evaluation device further may be adapted to compare, for each of the pixels, the signal to at least one threshold in order to determine whether the pixel is an illuminated pixel or not. This at least one threshold may be an individual threshold for each of the pixels or may be a threshold which is a uniform threshold for the whole matrix. In case a plurality of optical sensors is provided, at least one threshold may be provided for each of the optical sensors and/or for a group comprising at least two of the optical sensors, wherein, for two optical sensors, their respective thresholds may be identical or different. Thus, for each of the optical sensors, an individual threshold may be provided.

As will be outlined in further detail below, the threshold may be predetermined and/or fixed. Alternatively, the at least one threshold may be variable. Thus, the at least one threshold may be determined individually for each measurement or groups of measurements. Thus, at least one algorithm may be provided adapted to determine the threshold.

The evaluation device generally may be adapted to determine at least one pixel having the highest illumination out of the pixels by comparing the signals of the pixels. Thus, the detector generally may be adapted to determine one or more pixels and/or an area or region of the matrix having the highest intensity of the illumination by the light beam. As an example, in this way, a center of illumination by the light beam may be determined.

The highest illumination and/or the information about the at least one area or region of highest illumination may be used in various ways. Thus, as outlined above, the at least one above-mentioned threshold may be a variable threshold. As an example, the evaluation device may be adapted to choose the above-mentioned at least one threshold as a fraction of the signal of the at least one pixel having the highest illumination. Thus, the evaluation device may be adapted to choose the threshold by multiplying the signal of the at least one pixel having the highest illumination with a factor of $1/e^2$. As will be outlined in further detail below, this option is particularly preferred in case Gaussian propagation properties are assumed for the at least one light beam, since the threshold $1/e^2$ generally determines the borders of a light spot having a beam radius or beam waist w generated by a Gaussian light beam on the optical sensor.

In a further embodiment of the present invention, which may also be combined with one or more of the above-mentioned embodiments and/or with one or more of the further options disclosed in further detail below, the determining of the intensity distribution may comprise determining a number N of pixels of the optical sensor which are illuminated by the light beam, wherein the determining of the at least one longitudinal coordinate of the object comprises using the number N of pixels which are illuminated by the light beam.

As used herein, the term "determining a number N of pixels of the optical sensor which are illuminated by the light beam" generally refers to a process of quantitatively evaluating the pixels of the optical sensor, thereby generating at least one numerical value which, herein, is denoted by "N". Therein, N generally may refer to a single numerical value, such as a single integer value. This embodiment, as an example, may be implemented by simply subdividing the pixels into illuminated pixels and non-illuminated pixels, wherein N may simply be referred to as the number of pixels in the sub-class of illuminated pixels.

Additionally or alternatively, the pixels may be subdivided into more than two classes or subclasses, such as into subclasses according to one or more of their position, their illumination or degree of illumination. Thus, as an example, the evaluation device may be adapted to determine an intensity distribution over at least part of the pixels which are illuminated by the light beam. In other words, the evaluation device may be adapted to subdivide the totality of pixels or a part thereof, such as the illuminated pixels, into a plurality of classes according to their illumination and/or position. Thus, as an example, the evaluation device may be adapted to subdivide the totality of pixels or a part thereof into subclasses, based e.g. on a picture analysis algorithm such as edge or shape detection or on a separation into regions with similar contrast, saturation, hue, etc. Other algorithms for subdividing the totality of pixels into two or more subclasses are possible.

The evaluation device may be adapted to determine the longitudinal coordinate of the object by using a predetermined relationship between the number N of the pixels which are illuminated by the light beam and the longitudinal coordinate of the object. Thus, generally, the diameter of the light beam, due to propagation properties generally known to the skilled person, changes with propagation, such as with a longitudinal coordinate of the propagation. The relationship between the number of illuminated pixels and the longitudinal coordinate of the object may be an empirically determined relationship and/or may be analytically determined. Thus, as an example, a calibration process may be used for determining the relationship between the number of illuminated pixels and the longitudinal coordinate. Additionally or alternatively, as mentioned above, the predetermined relationship may be based on the assumption of the light beam being a Gaussian light beam. The light beam may be a monochromatic light beam having a precisely one wavelength $\lambda$ or may be a light beam having a plurality of wavelengths or a wavelength spectrum, wherein, as an example, a central wavelength of the spectrum and/or a wavelength of a characteristic peak of the spectrum may be chosen as the wavelength $\lambda$ of the light beam. In case a plurality of optical sensors is used, specific predetermined relationships between the respective number of illuminated pixels of the optical sensors and the longitudinal coordinate may be used. Thus, as an example, for each optical sensor, a predetermined relationship between the number of illuminated pixels and the longitudinal coordinate may be provided. As will be outlined in further detail below, the optical sensors may be arranged in a stack. Further, the optical sensors may have different properties, such as different geometries such as different geometries of the matrix of pixels and/or of the pixels. Further, the optical sensors may have differing sensitivities, such as differing spectral sensitivities. By providing specific predetermined relationships between the respective numbers of illuminated pixels of the optical sensors, these differing properties of the optical sensors may be taken into account.

As an example of an analytically determined relationship, the predetermined relationship, which may be derived by assuming Gaussian properties of the light beam, may be:

$$N \sim \pi \cdot w_0^2 \cdot \left(1 + \left(\frac{z}{z_0}\right)^2\right), \tag{1}$$

wherein z is the longitudinal coordinate,
wherein $w_0$ is a minimum beam radius of the light beam when propagating in space,
wherein $z_0$ is a Rayleigh-length of the light beam with $z_0 = \pi \cdot w_0^2/\lambda$, $\lambda$ being the wavelength of the light beam.

In case N is an integer number, formula (1) may imply the formation of integer numbers, such as by using additional functions like functions finding the closest integer number, such as the closest integer number being smaller or equal or greater or equal than the term on the right hand side of formula (1). Other integer formation functions are feasible.

This relationship may generally be derived from the general equation of an intensity I of a Gaussian light beam traveling along a z-axis of a coordinate system, with r being a coordinate perpendicular to the z-axis and E being the electric field of the light beam:

$$I(r,z) = |E(r,z)|^2 = I_0 \cdot (w_0/w(z))^2 \cdot e^{-2r^2/w(z)^2} \tag{2}$$

The beam radius w of the transversal profile of the Gaussian light beam generally representing a Gaussian curve is defined, for a specific z-value, as a specific distance from the z-axis at which the amplitude E has dropped to a value of $1/e$ (approx. 36%) and at which the intensity I has dropped to $1/e^2$. The minimum beam radius, which, in the Gaussian equation given above (which may also occur at other z-values, such as when performing a z-coordinate transformation), occurs at coordinate z=0, is denoted by $w_0$. Depending on the z-coordinate, the beam radius generally follows the following equation when light beam propagates along the z-axis:

$$w(z) = w_0 \cdot \sqrt{1 + \left(\frac{z}{z_0}\right)^2} \quad (3)$$

With the number N of illuminated pixels being proportional to the illuminated area A of the optical sensor:

$$N \sim A \quad (4)$$

or, in case a plurality of optical sensors i=1, . . . , n is used, with the number $N_i$ of illuminated pixels for each optical sensor being proportional to the illuminated area $A_i$ of the respective optical sensor $$N_i \sim A_i \quad (4')$$

and the general area of a circle having a radius w:

$$A = \pi \cdot w^2, \quad (5)$$

the following relationship between the number of illuminated pixels and the z-coordinate may be derived:

$$N \sim \pi \cdot w_0^2 \cdot \left(1 + \left(\frac{z}{z_0}\right)^2\right) \quad (6)$$

$$N_i \sim \pi \cdot w_0^2 \cdot \left(1 + \left(\frac{z}{z_0}\right)^2\right), \quad (6')$$

respectively, with $z_0 = \pi \cdot w_0^2 / \lambda$, as mentioned above. Thus, with N or $N_i$, respectively, being the number of pixels within a circle being illuminated at an intensity $oI \geq I_0/e^2$, as an example, N or $N_i$ may be determined by simple counting of pixels and/or other methods, such as a histogram analysis. In other words, a well-defined relationship between the z-coordinate and the number of illuminated pixels N or $N_i$, respectively, may be used for determining the longitudinal coordinate z of the object and/or of at least one point of the object, such as at least one longitudinal coordinate of at least one beacon device being one of integrated into the object and/or attached to the object.

As outlined above, the above-mentioned functions such as given in equations (2) or (3) may also be used as a beam shape functions or intensity distribution functions for approximating an intensity distribution in one or more planes, specifically in one or more planes perpendicular to an optical axis of the detector.

The invention, as outlined above, is generally based on determining at least one longitudinal coordinate of the object by using an intensity distribution which may be approximated by one or more intensity distribution functions, such as by using the above-mentioned fitting process of fitting one or more beam shape functions to the intensity distribution and/or by using the above-mentioned process of determining the number N of pixels of the optical sensor which are illuminated by the light beam. In the equations given above, such as in equations (1), (2) or (3), it is assumed that the light beam has a focus at position z=0. It shall be noted however, that a coordinate transformation of the z-coordinate is possible, such as by adding and/or subtracting a specific value. Thus, as an example, the position of the focus typically is dependent on the distance of the object from the detector and/or on other properties of the light beam. Thus, by determining the focus and/or the position of the focus, a position of the object, specifically a longitudinal coordinate of the object, may be determined, such as by using an empirical and/or an analytical relationship between a position of the focus and a longitudinal coordinate of the object and/or the beacon device. Further, imaging properties of the at least one optional transfer device, such as the at least one optional lens, may be taken into account. Thus, as an example, in case beam properties of the light beam being directed from the object towards the detector are known, such as in case emission properties of an illuminating device contained in a beacon device are known, by using appropriate Gaussian transfer matrices representing a propagation from the object to the transfer device, representing imaging of the transfer device and representing beam propagation from the transfer device to the at least one optical sensor, a correlation between a beam waist and a position of the object and/or the beacon device may easily be determined analytically. Additionally or alternatively, a correlation may empirically be determined by appropriate calibration measurements.

As outlined above, the matrix of pixels preferably may be a two-dimensional matrix. However, other embodiments are feasible, such as one-dimensional matrices. More preferably, as outlined above, the matrix of pixels is a rectangular matrix.

The detector may comprise precisely one optical sensor or may comprise a plurality of the optical sensors. In case a plurality of the optical sensors is provided, the optical sensors may arrange in various ways. Thus, as an example, the light beam may be split into two or more beams, each beam being directed towards one or more of the optical sensors. Additionally or alternatively, two or more of the optical sensors may be stacked along an axis, such as along an optical axis of the detector, preferably with their sensitive areas face towards the same direction. Thus, as an example, the detector may comprise a plurality of the optical sensors, wherein the optical sensors are stacked along an optical axis of the detector.

As an example, the detector may comprise n optical sensors, with n>1. Therein, preferably, n is a positive integer. As outlined above, the intensity distribution may be evaluated in the sensor planes of the n optical sensors, such as by deriving intensity distribution functions for each of the sensor planes. Additionally or alternatively, the evaluation device generally may be adapted to determine the number $N_i$ of the pixels which are illuminated by the light beam for each of the optical sensors, wherein i∈{1,n} denotes the respective optical sensor. As used herein, "each" refers to the fact that a number of illuminated pixels is determined for each optical sensor part of a plurality of the optical sensors, notwithstanding the fact that optical sensors may exist which are not illuminated by the light beam and/or which are used for other purposes, and, consequently, for which no number of illuminated pixels is determined.

The evaluation device may be adapted to compare the number $N_i$ of pixels which are illuminated by the light beam for each optical sensor with at least one neighboring optical sensor, thereby resolving an ambiguity in the longitudinal coordinate of the object.

The sensor signals of the optical sensors may be used in various ways. Thus, as an example, the redundancy of the sensor signals may be used for eliminating unknown information regarding the power of the light beam. Thus, the sensor signals may be normalized, such as by setting the strongest sensor signal to value 1 or 100 and providing the remaining sensor signals as fractions of this strongest sensor signal. Thus, generally, the evaluation device may be adapted to normalize sensor signals of the optical sensors for a power of the light beam. Additionally or alternatively, however, as outlined above, a normalization may take place within each optical sensor, such as for setting appropriate thresholds for determining pixels which are illuminated by the light beam and for determining pixels which are not illuminated by the light beam.

The at least one optical sensor generally may be transparent or may be intransparent. Thus, as an example, the optical sensor may be transparent and adapted to transmit at least 10%, preferably at least 20% and, more preferably, at least 50% of the power of the light beam. In case a plurality of the optical sensors is provided, such as in a stacked fashion, preferably, at least one of the optical sensors is transparent.

In case a plurality of the optical sensors is provided, which may be arranged in the stacked fashion and/or in another arrangement, the optical sensors may have identical spectral sensitivities or may provide different spectral sensitivities. Thus, as an example, at least two of the optical sensors may have a differing spectral sensitivity. As used herein, the term spectral sensitivity generally refers to the fact that the sensor signal of the optical sensor, for the same power of the light beam, may vary with the wavelength of the light beam. Thus, generally, at least two of the optical sensors may differ with regard to their spectral properties. This embodiment generally may be achieved by using different types of absorbing materials for the optical sensors, such as different types of dyes or other absorbing materials. Additionally or alternatively, differing spectral properties of the optical sensors may be generated by other means implemented into the optical sensors and/or into the detector, such as by using one or more wavelength-selective elements, such as one or more filters (such as color filters) in front of the optical sensors and/or by using one or more prisms and/or by using one or more dichroitic mirrors. Thus, in case a plurality of optical sensors is provided, at least one of the optical sensors may comprise a wavelength-selective element such as a color filter, having a specific transmission or reflection characteristic, thereby generating differing spectral properties of the optical sensors. Further, as will be outlined in further detail below, in case a plurality of optical sensors is used, these optical sensors may all be organic optical sensors, may all be inorganic optical sensors, may all be hybrid organic inorganic optical sensors or may comprise an arbitrary combination of at least two optical sensors selected from the group consisting of organic optical sensors, inorganic optical sensors and hybrid organic-inorganic optical sensors.

In case a plurality of the optical sensors is used, wherein at least two of the optical sensors differ with regard to their respective spectral sensitivity, the evaluation device generally may be adapted to determine a color of the light beam by comparing sensor signals of the optical sensors having the differing spectral sensitivity. As used herein, the expression "determine a color" generally refers to the step of generating at least one item of spectral information about the light beam. The at least one item of spectral information may be selected from the group consisting of a wavelength, specifically a peak wavelength; color coordinates, such as CIE coordinates.

The determination of the color of the light beam may be performed in various ways which are generally known to the skilled person. Thus, the spectral sensitivities of the optical sensors may span a coordinate system in color space, and the signals provided by the optical sensors may provide a coordinate in this color space, as known to the skilled person for example from the way of determining CIE coordinates.

As an example, the detector may comprise two, three or more optical sensors in a stack. Thereof, at least two, preferably at least three, of the optical sensors may have differing spectral sensitivities. Further, the evaluation device may be adapted to generate at least one item of color information for the light beam by evaluating the signals of the optical sensors having differing spectral sensitivities.

As an example, at least three optical sensors being spectrally sensitive optical sensors may be contained in the stack. Thus, e.g., the spectrally sensitive optical sensors may comprise at least one red sensitive optical sensor, the red sensitive optical sensor having a maximum absorption wavelength $\lambda r$ in a spectral range 600 nm$<\lambda r<$780 nm, wherein the spectrally sensitive optical sensors further comprise at least one green sensitive optical sensor, the green sensitive optical sensor having a maximum absorption wavelength $\lambda g$ in a spectral range 490 nm$<\lambda g<$600 nm, wherein the spectrally sensitive optical sensors further may comprise at least one blue sensitive optical sensor, the blue sensitive optical sensor having a maximum absorption wavelength $\lambda b$ in a spectral range 380 nm$<\lambda b<$490 nm. As an example, the red sensitive optical sensor, the green sensitive optical sensor and the blue sensitive optical sensor, in this order or in a different order, may be the first optical sensors of the optical sensor stack, facing towards the object.

The evaluation device may be adapted to generate at least two color coordinates, preferably at least three color coordinates, wherein each of the color coordinates is determined by dividing a signal of one of the spectrally sensitive optical sensors by a normalization value. As an example, the normalization value may contain a sum of the signals of all spectrally sensitive optical sensors. Additionally or alternatively, the normalization value may contain a detector signal of a white detector.

The at least one item of color information may contain the color coordinates. The at least one item of color information may, as an example, contain CIE coordinates.

In addition to the preferred at least two, more preferably at least three, spectrally sensitive optical sensors, the stack further may comprise at least one white detector, wherein the white detector may be adapted to absorb light in an absorption range of all spectrally sensitive detectors. Thus, as an example, the white detector may have an absorption spectrum absorbing light all over the visible spectral range.

The spectrally sensitive optical sensors each may comprise at least one dye, the dye being adapted to absorb light in one or more of the visible spectral range, the ultraviolet spectral range and the infrared spectral range, with a non-uniform absorption spectrum. As an example, the dyes each may have an absorption spectrum having at least one absorption peak. The absorption peak, as a solid, as a film or as sensitizer on a scaffold material (e.g. $TiO_2$), may have a width, such as a full width at half maximum (FWHM) which may be broad, such as by using dyes absorbing all over one or more of the visible, the infrared or the ultraviolet spectral range, or may be narrow, such as by using dyes having an FWHM of no more than 300 nm, preferably of no more than 200 nm, more preferably of no more than 80 nm, of no more than 60 nm or of no more than 40 nm. The absorption peaks of the dyes may be spaced apart by at least 60 nm, preferably at least 80 nm and, more preferably, by at least 100 nm. Other embodiments are feasible.

In case the detector comprises a plurality of optical sensors, as outlined above, the optical sensors preferably may be arranged in a stack. In case a plurality of optical sensors is provided, the optical sensors may be identical, or at least two of the optical sensors may differ with regard to at least one property, such as with regard to a geometric property, a property of device setup or, as outlined above, spectral sensitivity.

As an example, as outlined above, the plurality of optical sensors may provide differing spectral sensitivities, such as an optical sensor with sensitivity in the red spectral range (R), an optical sensor with spectral sensitivity in the green spectral range (G) and an optical sensor with spectral sensitivity in the blue spectral range (B). As outlined above, the differing spectral sensitivities may be provided by various means, such as by providing absorbing materials having differing spectral sensitivities and/or by providing one or more wavelength-selective elements. Thus, in a stack of optical sensors and/or in another arrangement of a plurality of optical sensors, various combinations of optical sensors having differing spectral sensitivities may be provided. As an example, an RGB stack may be provided, in the given order or in a different order. Additionally or alternatively, two optical sensors having different spectral sensitivities may be sufficient to derive color information, such as by evaluating a ratio of sensor signals of optical sensors having differing spectral sensitivities.

Further, in case a plurality of optical sensors is provided, the plurality of optical sensors may differ with regard to device setup and/or with regard to the materials used in the optical sensors. Specifically, the optical sensors may differ with regard to their organic or inorganic in nature. Thus, the plurality of optical sensors and, more specifically, the stack, may comprise one or more organic optical sensors, one or more inorganic optical sensors, one or more hybrid organic-inorganic optical sensors or an arbitrary combination of at least two of these optical sensors. Thus, as an example, the stack may consist of organic optical sensors only, may consist of inorganic optical sensors only or may consist of hybrid organic-inorganic optical sensors, only. Additionally or alternatively, the stack may comprise at least one organic optical sensor and at least one inorganic optical sensor or may comprise at least one organic optical sensor and at least one hybrid organic-inorganic optical sensor or may comprise at least one organic optical sensor and at least one hybrid organic-inorganic optical sensor. Preferably, the stack may comprise at least one organic optical sensor and, further, preferably on a side of the stack furthest away from the object, at least one inorganic optical sensor. Thus, as an example, as will be outlined in further detail below, the stack may comprise at least one organic optical sensor, such as at least one DSC or sDSC, and, further, at least one inorganic sensor such as a CCD or CMOS sensor chip more preferably on a side of the stack furthest away from the object.

Further, in case a plurality of optical sensors is provided, the optical sensors may differ with regard to their transparency. Thus, as an example, all optical sensors may fully or partially be transparent. Alternatively, all optical sensors may fully or partially be intransparent (also referred to as opaque). Further, specifically in case the plurality of optical sensors is arranged as a stack, a combination of at least one at least partially transparent optical sensor and at least one at least partially intransparent optical sensor may be used. Thus, the stack may comprise one or more transparent optical sensors and, additionally, preferably on a side of the stack furthest away from the object, at least one intransparent optical sensor. Thus, as outlined above, one or more at least partially transparent optical sensors may be provided by using one or more transparent organic optical sensors such as one or more transparent DSCs or sDSCs. Additionally or alternatively, at least partially transparent optical sensors may be provided by using inorganic sensors, such as very thin inorganic optical sensors or inorganic optical sensors having a bandgap which is designed such that at least a part of the incident light beam is transmitted. Intransparent optical sensors may be provided by using intransparent electrodes and/or intransparent absorbing materials, such as organic and/or inorganic materials. As an example, an organic optical sensor may be provided having a thick metal electrode, such as a metal electrode having a thickness of more than 50 nm, preferably more than 100 nm. Additionally or alternatively, and inorganic optical sensor may be provided having an intransparent semiconductor material. As an example, typical CCD or CMOS camera chips provide intransparent properties. As an example, the stack may comprise one or more at least partially transparent DSCs or sDSCs and, on a side furthest away from the object, an intransparent CMOS or CCD chip. Other embodiments are feasible.

As outlined above, the detector may further comprise at least one transfer device. The transfer device preferably may be positioned in a light path in between the object and the detector. As used herein, a transfer device generally is an arbitrary optical element adapted to guide the light beam onto the optical sensor. The guiding may take place with unmodified properties of the light beam or may take place with imaging or modifying properties. Thus, generally, the transfer device might have imaging properties and/or beam-shaping properties, i.e. might change a beam waist and/or a widening angle of the light beam and/or a shape of the cross-section of the light beam when the light beam passes the transfer device. The transfer device, as an example, may comprise one or more elements selected from the group consisting of a lens and a mirror. The mirror may be selected from the group consisting of a planar mirror, a convex mirror and a concave mirror. Additionally or alternatively, one or more prisms may be comprised. Additionally or alternatively, one or more wavelength-selective elements may be comprised, such as one or more filters, specifically color filters, and/or one or more dichroitic mirrors. Again, additionally or alternatively, the transfer device may comprise one or more diaphragms, such as one or more pinhole diaphragms and/or iris diaphragms.

The transfer device can for example comprise one or a plurality of mirrors and/or beam splitters and/or beam deflecting elements in order to influence a direction of the electromagnetic radiation. Alternatively or additionally, the transfer device can comprise one or a plurality of imaging elements which can have the effect of a converging lens and/or a diverging lens. By way of example, the optional transfer device can have one or a plurality of lenses and/or one or a plurality of convex and/or concave mirrors. Once again alternatively or additionally, the transfer device can have at least one wavelength-selective element, for example at least one optical filter. Once again alternatively or additionally, the transfer device can be designed to impress a predefined beam profile on the electromagnetic radiation, for example, at the location of the sensor region and in particular the sensor area. The above-mentioned optional embodiments of the optional transfer device can, in principle, be realized individually or in any desired combination. The at least one transfer device, as an example, may be positioned in front of the detector, i.e. on a side of the detector facing towards the object.

In addition to the at least one longitudinal coordinate of the object, at least one transversal coordinate of the object may be determined. Thus, generally, the evaluation device may further be adapted to determine at least one transversal coordinate of the object by determining a position of the light beam on the matrix of pixels. Additionally or alternatively, such as by tracking a center of illumination through a stack of optical sensors, a beam path of the light beam may be followed, thereby deriving at least one information regarding a transversal position of the object.

As an example for determining a center of illumination, the evaluation device may be adapted to determine a center of illumination of the at least one matrix by the light beam, wherein the at least one transversal coordinate of the object is determined by evaluating at least one coordinate of the center of illumination. Thus, the coordinate of the center of illumination may be a pixel coordinate of the center of illumination. As an example, the matrix may comprise rows and columns of pixels, wherein the row number of the light beam and/or the center of the light beam within the matrix may provide an x-coordinate, and wherein the column number of the light beam and/or the center of the light beam within the matrix may provide a y-coordinate.

By providing one or more transversal coordinates, such as x- and/or y-coordinates, the evaluation device is adapted to provide at least one three-dimensional position of the object. Additionally or alternatively, as outlined above, the evaluation device may be adapted to capture a three-dimensional image of a scene. Specifically, the evaluation device may be adapted to provide at least one three-dimensional image of a scene captured by the detector.

Further options of the present invention refer to potential embodiments of the at least one optical sensor. Generally, an arbitrary optical sensor device having a matrix of pixels used, such as an optical sensor device selected from the group consisting of: an inorganic semiconductor sensor device such as a CCD chip and/or a CMOS chip; an organic semiconductor sensor device. In the latter case, as an example, the optical sensor may, for example, comprise at least one organic photovoltaic device having a matrix of pixels. As used herein, an organic photovoltaic device generally refers to a device having at least one organic photosensitive element and/or at least one organic layer. Therein, generally, any type of organic photovoltaic device may be used, such as organic solar cells and/or an arbitrary device having at least one organic photosensitive layer. As an example, an organic solar cell and/or a dye-sensitized organic solar cell may be comprised. Further, a hybrid device may be used, such as inorganic-organic photovoltaic devices. The detector may comprise one or more organic photovoltaic devices and/or may comprise one or more inorganic photovoltaic devices and/or may comprise a combination consisting of one or more organic photovoltaic devices and one or more inorganic photovoltaic devices.

The optical sensor specifically may comprise at least one dye-sensitized solar cell having at least one patterned electrode. For potential embodiments of dye-sensitized solar cells, reference may be made to WO 2012/110924 A1 and to U.S. provisional applications Nos. 61/739,173 and 61/749, 964. The device setups of the dye-sensitized solar cells disclosed therein, specifically of the optical sensors disclosed therein, may generally also be applied to the present invention, with the proviso that at least one of the electrodes of these dye-sensitized solar cells is patterned in order to provide a plurality of pixels. Thus, as an example, one or both of the first and second electrodes of the dye-sensitized solar cells disclosed in the named documents may be patterned. As an example, the first electrode may be patterned to provide a plurality of parallel horizontal stripes, and the second electrode may be patterned to provide a plurality of parallel vertical stripes, or vice versa. Thus, at each crossing point of a stripe of the first electrode and a stripe of the second electrode, a pixel is provided which, by electrically contacting the respective stripes of the electrodes and measuring an electrical current and/or voltage, may be read out.

The optical sensor specifically may comprise at least one first electrode, at least one n-semiconducting metal oxide, at least one dye, at least one p-semiconducting organic material, preferably a solid p-semiconducting organic material, and at least one second electrode, with the at least one n-semiconducting metal oxide, the at least one dye and the at least one p-semiconducting organic material being embedded in between the first electrode and the second electrode.

As mentioned above and as will be outlined in further detail below, generally, for potential embodiments of materials or layer combinations which may be used for the first electrode, the at least one n-semiconducting metal oxide, the at least one dye, the at least one p-semiconducting organic material and the at least one second electrode, reference may be made to the above-mentioned WO 2012/110924 A1 as well as to U.S. provisional applications 61/739,173, filed on Dec. 19, 2012, and 61/749,964, filed on Jan. 8, 2013. Still, other embodiments are feasible. Thus, as an example, the n-semiconducting metal oxide may comprise a nanoporous layer of a metal oxide and a dense layer of a metal oxide. The metal oxide preferably may be or may comprise titanium dioxide. For potential dyes, reference may be made to the dyes mentioned in the above-mentioned documents, such as to the dye ID 504. Further, with regard to potential p-semiconducting organic materials, as an example, spiro-MeOTAD may be used, as disclosed in one or more of the above-mentioned documents. Similarly, for potential electrode materials, both transparent and intransparent, reference may be made to these documents. As outlined above, other embodiments are feasible.

Both the first electrode and the second electrode may be transparent. However, other electrode setups may be possible.

As outlined above, preferably, at least one of the first electrode and the second electrode may be a patterned electrode. Thus, as an example, one or both of the first electrode and the second electrode may comprise a plurality of electrode stripes, such as horizontal electrode stripes and/or vertical electrode stripes. As an example for pixelated optical sensors which may also be used in the context of the present invention, reference may be made to EP patent application No. 13171898.3, the full content of which is herewith included by reference. Still, other pixelated optical sensors may be used.

As an example, as outlined above, the first electrode may comprise a plurality of electrode stripes and the second electrode may comprise a plurality of electrode stripes, wherein the electrode stripes of the first electrode are oriented perpendicular to the electrode stripes of the second electrode. As outlined above, at each crossing point of electrode stripes of the first electrode and an electrode stripe of the second electrode, a pixel is formed which may be read out independently.

The detector may further comprise appropriate reading electronics, such as a reading electronics adapted to contact one of the electrode stripes of the first electrode and to contact one of the electrode stripes of the second electrode and to measure a current through the stripes and/or to measure a voltage at the respective stripes. In order to read out the pixels, a sequential reading scheme may be chosen and/or a multiplexing scheme. Thus, as an example, all pixels within one row may be read out simultaneously, before switching to the next row of the matrix, thereby sequentially reading out all pixel rows. Alternatively, a row multiplexing be chosen, reading out all pixels of one column spontaneously, before switching to the next column. However, other readout schemes are possible, such as readout schemes using a plurality of transistors. Generally, passive matrix and/or active matrix readout schemes may be used. As an example of read-out schemes which may be used, reference may be made to US 2007/0080925 A1. Other readout schemes are feasible.

For potential electrode materials, reference may be made to WO 2012/110924 A1 and to U.S. provisional applications Nos. 61/739,173 and 61/749,964. Other embodiments are possible. Specifically, at least one of the first electrode and the second electrode may comprise an electrically conductive polymer. Specifically, a transparent electrically conductive polymer may be used. For potential embodiments of electrically conductive polymers, reference may be made to the named documents.

It shall be noted, however, that any other type of optical sensors, preferably transparent optical sensors, having a plurality of pixels, may be used for the present invention.

In a further aspect of the present invention, a detector system for determining a position of at least one object is disclosed. The detector system comprises at least one detector according to the present invention, such as at least one detector as disclosed in one or more of the embodiments described above and/or as disclosed in one or more of the embodiments disclosed in further detail below.

The detector system further comprises at least one beacon device adapted to direct at least one light beam towards the detector. As used herein and as will be disclosed in further detail below, a beacon device generally refers to an arbitrary device adapted to direct at least one light beam towards the detector. The beacon device may fully or partially be embodied as an active beacon device, comprising at least one illumination source for generating the light beam. Additionally or alternatively, the beacon device may fully or partially be embodied as a passive beacon device comprising at least one reflective element adapted to reflect a primary light beam generated independently from the beacon device towards the detector.

The beacon device may be at least one of attachable to the object, holdable by the object and integratable into the object. Thus, the beacon device may be attached to the object by an arbitrary attachment means, such as one or more connecting elements. Additionally or alternatively, the object may be adapted to hold the beacon device, such as by one or more appropriate holding means. Additionally or alternatively, again, the beacon device may fully or partially be integrated into the object and, thus, may form part of the object or even may form the object.

Generally, with regard to potential embodiments of the beacon device, reference may be made to one or more of U.S. provisional applications 61/739,173, filed on Dec. 19, 2012, and 61/749,964, filed on Jan. 8, 2013. Still, other embodiments are feasible.

As outlined above, the beacon device may fully or partially be embodied as an active beacon device and may comprise at least one illumination source. Thus, as an example, the beacon device may comprise a generally arbitrary illumination source, such as an illumination source selected from the group consisting of a light-emitting diode (LED), a light bulb, an incandescent lamp and a fluorescent lamp. Other embodiments are feasible.

Additionally or alternatively, as outlined above, the beacon device may fully or partially be embodied as a passive beacon device and may comprise at least one reflective device adapted to reflect a primary light beam generated by an illumination source independent from the object. Thus, in addition or alternatively to generating the light beam, the beacon device may be adapted to reflect a primary light beam towards the detector.

The detector system may comprise one, two, three or more beacon devices. Thus, generally, in case the object is a rigid object which, at least on a microscope scale, thus not change its shape, preferably, at least two beacon devices may be used. In case the object is fully or partially flexible or is adapted to fully or partially change its shape, preferably, three or more beacon devices may be used. Generally, the number of beacon devices may be adapted to the degree of flexibility of the object. Preferably, the detector system comprises at least three beacon devices.

The object generally may be a living or non-living object. The detector system even may comprise the at least one object, the object thereby forming part of the detector system. Preferably, however, the object may move independently from the detector, in at least one spatial dimension.

The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

In a further aspect of the present invention, a human-machine interface for exchanging at least one item of information between a user and a machine is disclosed. The human-machine interface comprises at least one detector system according to the present invention, such as to one or more of the embodiments disclosed above and/or according to one or more of the embodiments disclosed in further detail below. The beacon devices are adapted to be at least one of directly or indirectly attached to the user and held by the user. The human-machine interface is designed to determine at least one position of the user by means of the detector system. The human-machine interface further is designed to assign to the position at least one item of information.

In a further aspect of the present invention, an entertainment device for carrying out at least one entertainment function is disclosed. The entertainment device comprises at least one human-machine interface according to the present invention. The entertainment device further is designed to enable at least one item of information to be input by a player by means of the human-machine interface. The entertainment device further is designed to vary the entertainment function in accordance with the information.

In a further aspect of the present invention, a tracking system for tracking a position of at least one movable object is disclosed. The tracking system comprises at least one detector system according to the present invention, such as to one or more of the embodiments disclosed above and/or according to one or more of the embodiments disclosed in further detail below. The tracking system further comprises at least one track controller, wherein the track controller is adapted to track a series of positions of the object at specific points in time.

In a further aspect of the present invention, a method for determining a position of at least one object is disclosed. The method comprises the following steps, which may be performed in the given order or in a different order. Further, two or more or even all of the method steps may be performed simultaneously and/or overlapping in time. Further, one, two or more or even all of the method steps may be performed repeatedly. The method may further comprise additional method steps. The method comprises the following method steps:

- at least one detection step, wherein at least one light beam traveling from the object to a detector is detected by at least one optical sensor of the detector, the at least one optical sensor having a matrix of pixels; and
- at least one evaluation step, wherein an intensity distribution of pixels of the optical sensor is determined which are illuminated by the light beam, wherein at least one longitudinal coordinate of the object is determined by using the intensity distribution.

The method preferably may be performed by using at least one detector according to the present invention, such as according to one or more of the embodiments disclosed above and/or according to one or more of the embodiments disclosed in further detail below. Thus, for preferred optional embodiments of the method, reference may be made to the disclosure of the detector or vice a versa. The method may further be performed by using the detector system, the human-machine interface, the entertainment device or the tracking system according to the present invention. Other embodiments are feasible.

The method specifically may be performed in such a way that the optical sensor generates at least one signal indicating an intensity of illumination for each of the pixels. The signal or a signal or information derived thereof may also be referred to as an intensity value are an intensity information. The plurality of signals, intensity values or the entity of intensity information may also be referred to as an image. In case a plurality of optical sensors is used, a stack of images or a three-dimensional image may be generated.

Thus, for each of the pixels, an analog and/or digital intensity signal may be generated. The plurality of In case a digital intensity signal is generated directly or e.g. after analog-digital conversion, the digital signal for each pixel may be a one-bit signal or, preferably, may be a signal having an information depth of more than one bit, such as 4 bit, 8 bit, 16 bit or a different number of bits.

As outlined above, the longitudinal coordinate of the object may be determined by using a predetermined relationship between the intensity distribution and the longitudinal coordinate.

The intensity distribution specifically may comprise one or more of:
- an intensity as a function of a transversal position of the respective pixel in a plane perpendicular to an optical axis of the optical sensor;
- an intensity as a function of a pixel coordinate;
- a distribution of a number # of pixels having a specific intensity as a function of the intensity.

The intensity distribution specifically may approximate an intensity distribution of an illumination by a Gaussian light beam.

The method specifically may be performed such that at least one intensity distribution function approximating the intensity distribution is determined. The longitudinal coordinate of the object may be determined by using a predetermined relationship between a longitudinal coordinate and the intensity distribution function and/or at least one parameter derived from the intensity distribution function. The intensity distribution function specifically may be a beam shape function of the light beam. The intensity distribution specifically may comprise a mathematical function, specifically a two-dimensional or a three-dimensional mathematical function, approximating an intensity information contained within at least part of the pixels of the optical sensor. The mathematical function specifically may comprise a function of at least one pixel coordinate of the matrix of pixels. A pixel position of the pixels of the matrix may be defined by $(x, y)$, with $x, y$ being pixel coordinates, wherein the two-dimensional or three-dimensional mathematical function may comprise one or more functions selected from the group consisting of $f(x), f(y), f(x, y)$. Therein, $f(x)$ or $f(y)$ are considered two-dimensional functions, wherein $f(x, y)$ is considered a three-dimensional function. The two-dimensional or three-dimensional mathematical function specifically may comprise one or more mathematical functions selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function; or at least one derivative, at least one linear combination or at least one product comprising one or more of the listed functions. Further, combinations of two or more mathematical functions are possible. Thus, as outlined above, the two-dimensional or three-dimensional mathematical function may comprise a combination such as at least one product, at least one linear combination or at least one derivative of two or more mathematical functions, such as two or more of the above-listed mathematical functions.

In case the mathematical function comprises a product of two or more functions, as an example, the product may take the form $f(x, y)=p(x) \cdot q(y)$. Therein, $p(x)$ and $q(y)$ are mathematical functions, e.g. mathematical functions independently selected from the group consisting of: Gaussian functions, Hermite-Gaussian functions, Bessel functions. Other functions are possible. Further, $f(x, y)$ generally may be a rotationally symmetric function, such as $f(x, y)=f(x^2, y^2)$ and/or $f(x, y)=f(x^2+y^2)$. This rotationally symmetric function generally may be considered a special case of a product of two functions. It shall be noted, however, that these examples are given for illustrative purposes only and that many other functions are feasible.

As outlined above, the at least one intensity distribution may be determined. Specifically, a plurality of intensity distributions may be determined in a plurality of planes, wherein preferably at least one intensity distribution for each of the planes are determined, wherein the planes preferably are perpendicular to an optical axis of the detector, and wherein preferably the plurality of planes are offset from one another along the optical axis. For this purpose, specifically, the detector may comprise a plurality of optical sensors, specifically a stack of optical sensors. A change in the intensity distribution may be determined as a function of a longitudinal coordinate along the optical axis for determining the longitudinal coordinate of the object. A plurality of intensity distribution functions may be determined, each intensity distribution function approximating the intensity distribution in one of the planes, wherein further the longitudinal coordinate of the object may be from the plurality of intensity distribution functions. Each of the intensity distribution functions may be a beam shape function of the light beam in the respective plane. At least one beam parameter may be derived from each intensity distribution function. A change of the at least one beam parameter may be determined as a function of a longitudinal coordinate along the optical axis for determining the longitudinal coordinate of the object. The at least one beam parameter specifically may be selected from the group consisting of: a beam diameter; a beam waist; a Gaussian beam parameter. The longitudinal coordinate of the object specifically may be determined by using a predetermined relationship between the beam parameters and the longitudinal coordinate.

In the evaluation step, for each of the pixels, the signal of the respective pixel may be compared to at least one threshold in order to determine whether the pixel is an illuminated pixel or not.

As outlined above, the threshold may be a predetermined threshold or may be a variable threshold which may be determined according to at least one predetermined algorithm.

In the evaluation step, at least one pixel having the highest illumination out of the pixels is determined by comparing the signals of the pixels. Thus, one or more of the pixels may be determined which have the highest illumination out of the pixels of the matrix.

The knowledge about the one or more pixels having the highest illumination may be used in various ways. Thus, as an example, this information may be used for determining the above-mentioned threshold. As an example, the threshold may be chosen as a fraction of the signal of the at least one pixel having the highest illumination. As outlined above, as an example, the threshold may be chosen by multiplying the signal of the at least one pixel having the highest illumination with a factor of $1/e^2$.

As outlined above, the determining of the intensity distribution may comprise determining a number N of pixels of the optical sensor which are illuminated by the light beam, wherein the determining of the at least one longitudinal coordinate of the object comprises using the number N of pixels which are illuminated by the light beam. The longitudinal coordinate of the object specifically may be determined by using a predetermined relationship between the number N of pixels which are illuminated by the light beam and the longitudinal coordinate.

The longitudinal coordinate of the object may be determined by using a predetermined relationship between the number N of pixels which are illuminated by the light beam and the longitudinal coordinate. As outlined above, the predetermined relationship may be an empirical relationship and/or an analytical relationship. As an example, the predetermined relationship may be based on the assumption of the light beam being a Gaussian light beam. Thus, as explained above with respect to the detector, the predetermined relationship may be:

$$N \sim \pi \cdot w_0^2 \cdot \left(1 + \left(\frac{z}{z_0}\right)^2\right),$$

wherein z is the longitudinal coordinate,
wherein $w_0$ is a minimum beam radius of the light beam when propagating in space,
wherein $z_0$ is a Rayleigh-length of the light beam with $z_0 = \pi \cdot w_0^2/\lambda$, $\lambda$ being the wavelength of the light beam.

Again, preferably, the matrix of pixels may be a two-dimensional matrix. More preferably, the matrix of pixels may be a rectangular matrix.

As for the detector, the detector may comprise one optical sensor or, preferably, a plurality of the optical sensors. The optical sensors may be stacked along an optical axis of the detector.

The detector may comprise n optical sensors. Therein, the number $N_i$ of pixels which are illuminated by the light beam may be determined for each of the optical sensors, wherein $i \in \{1, n\}$ denotes the respective optical sensor.

The number $N_i$ of pixels which are illuminated by the light beam for each optical sensor may be compared with at least one neighboring optical sensor, thereby resolving an ambiguity in the longitudinal coordinate of the object. Further, additionally or alternatively, the sensor signals of the optical sensors may be normalized for a power of the light beam.

In a further aspect of the present invention, a use of the detector according to the present invention, such as to one or more of the embodiments disclosed above and/or according to one or more of the embodiments disclosed in further detail below, is disclosed, for a purpose of use, selected from the group consisting of: a position measurement in traffic technology; an entertainment application; a security application; a safety application; a human-machine interface application; a tracking application; a photography application, such as an application for digital photography for arts, documentation or technical purposes; a use in combination with at least one time-of-flight detector.

Thus, generally, the detector according to the present invention may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application; a use in combination with at least one time-of-flight detector. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing technology.

Thus, as for the optical detectors and devices disclosed in WO 2012/110924 A1 or in U.S. provisional applications 61/739,173, filed on Dec. 19, 2012, 61/749,964, filed on Jan. 8, 2013, and 61/867,169, filed on Aug. 19, 2013, and international patent application PCT/IB2013/061095, filed on Dec. 18, 2013, the detector, the detector system, the human-machine interface, the entertainment device, the tracking system or the camera according to the present invention (in the following simply referred to as "the devices according to the present invention" may be used for a plurality of application purposes, such as one or more of the purposes disclosed in further detail in the following.

Thus, firstly, the devices according to the present invention may be used in mobile phones, tablet computers, laptops, smart panels or other stationary or mobile computer or communication applications, Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analog electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, rear cross traffic alert, and other automotive and traffic applications. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury.

In these or other applications, generally, the devices according to the present invention may be used as standalone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established stereovision systems such as LIDAR. Given the low space demand, the devices according to the present invention such as cameras may be placed at virtually any place in a vehicle, such as on a window screen, on a front hood, on bumpers, on lights, on mirrors or other places the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. These applications are specifically valuable e.g. in medical treatments and long-distance diagnosis and telemedicine.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used in to monitor the filling level of tanks, silos etc.

Further, the devices according to the present invention may be used in the polls, airplanes, ships, spacecraft and other traffic applications, Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices.

The devices according to the present invention generally may be used in passive applications. Passive applications include guidance for ships in harbors or in dangerous areas, and for aircraft at landing or starting. Wherein, fixed, known active targets may be used for precise guidance. The same can be used for vehicles driving in dangerous but well defined routes, such as mining vehicles.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more the devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention generally may be used in the field of building, construction and cartography. Thus, generally, one or more devices according to the present invention may be used in order to measure and/or monitor environmental areas, e.g. countryside or buildings. Therein, one or more the devices according to the present invention may be combined with other methods and devices or can be used solely in order to monitor progress and accuracy of building projects, changing objects, houses, etc. the devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges.

As outlined above, the devices according to the present invention may further be used in manufacturing, quality control or identification applications, such as in product identification or size identification (such as for finding an optimal place or package, for reducing waste etc.). Further, the devices according to the present invention may be used in logisitics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

The detector or the camera including the detector, having the at least one optical sensor, specifically the above-mentioned FP sensor, may further be combined with one or more additional sensors. Thus, at least one camera having the at least one optical sensor, specifically the at least one above-mentioned FiP sensor, may be combined with at least one further camera, which may be a conventional camera and/or e.g. a stereo camera. Further, one, two or more cameras having the at least one optical sensor, specifically the at least one above-mentioned FiP sensor, may be combined with one, two or more digital cameras. As an example, one or two or more two-dimensional digital cameras may be used for calculating the depth from stereo information and from the depth information gained by the detector according to the present invention.

Specifically in the field of automotive technology, in case a camera fails, the detector according to the present invention may still be present for measuring a longitudinal coordinate of an object, such as for measuring a distance of an object in the field of view. Thus, by using the detector according to the present invention in the field of automotive technology, a failsafe function may be implemented. Specifically for automotive applications, the detector according to the present invention provides the advantage of data reduction. Thus, as compared to camera data of conventional digital cameras, data obtained by using the detector according to the present invention, i.e. a detector having the at least one optical sensor, specifically the at least one HP sensor, may provide data having a significantly lower volume. Specifically in the field of automotive technology, a reduced amount of data is favorable, since automotive data networks generally provide lower capabilities in terms of data transmission rate.

The detector according to the present invention may further comprise one or more light sources. Thus, the detector may comprise one or more light sources for illuminating the at least one object, such that e.g. illuminated light is reflected by the object. The light source may be a continuous light source or maybe discontinuously emitting light source such as a pulsed light source. The light source may be a uniform light source or may be a nonuniform light source or a patterned light source. Thus, as an example, in order for the detector to measure the at least one longitudinal coordinate, such as to measure the depth of at least one object, a contrast in the illumination or in the scene captured by the detector is advantageous. In case no contrast is present by natural illumination, the detector may be adapted, via the at least one optional light source, to fully or partially illuminate the scene and/or at least one object within the scene, preferably with patterned light. Thus, as an example, the light source may project a pattern into a scene, onto a wall or onto at least one object, in order to create an increased contrast within an image captured by the detector.

The at least one optional light source may generally emit light in one or more of the visible spectral range, the infrared spectral range or the ultraviolet spectral range. Preferably, the at least one light source emits light at least in the infrared spectral range.

The detector may also be adapted to automatically illuminate the scene. Thus, the detector, such as the evaluation device, may be adapted to automatically control the illumination of the scene captured by the detector or a part thereof. Thus, as an example, the detector may be adapted to recognize in case large areas provide low contrast, thereby making it difficult to measure the longitudinal coordinates, such as depth, within these areas. In these cases, as an example, the detector may be adapted to automatically illuminate these areas with patterned light, such as by projecting one or more patterns into these areas.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat; an article of clothing; a hat; a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As used herein, a detector for determining a position of at least one object generally is a device adapted for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams traveling from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

As used herein, an optical sensor generally is a device which is designed to generate at least one longitudinal sensor signal in a manner dependent on an illumination of the optical sensor by the light beam. Preferably, as outlined above and as will be outlined in further detail below, the detector according to the present invention may comprise a plurality of optical sensors, preferably as a sensor stack.

The at least one optical sensor may comprise one or more photo detectors, preferably one or more organic photodetectors and, most preferably, one or more dye-sensitized organic solar cells (DSCs, also referred to as dye solar cells), such as one or more solid dye-sensitized organic solar cells (sDSCs). Thus, preferably, the detector may comprise one or more DSCs (such as one or more sDSCs) acting as the at least one optical sensor, preferably a stack of a plurality of DSCs (preferably a stack of a plurality of sDSCs) acting as the at least one optical sensor. Additionally or alternatively, the detector may comprise other types of optical sensors, as outlined in further detail above.

As outlined above, the detector according to the present invention specifically may comprise a plurality of the optical sensors, which are also referred to as pixelated sensors or pixelated optical sensors. Specifically, the detector may comprise a stack of the optical sensors, such as a stack of transparent optical sensors.

Thus, the detector may comprise at least one stack of the optical sensors, and the detector may be adapted to acquire a three-dimensional image of a scene within a field of view of the detector. The optical sensors of the stack may have identical spectral properties, such as identical or uniform absorption spectra. Alternatively, the optical sensors of the stack may have differing spectral properties. Thus, the stack may comprise at least one first optical sensor having a first spectral sensitivity and at least one second optical sensor having a second spectral sensitivity, wherein the first spectral sensitivity and the second spectral sensitivity are different. The stack specifically may comprise optical sensors having differing spectral properties in an alternating sequence. The detector may be adapted to acquire a multi-color three-dimensional image, preferably a full-color three-dimensional image, by evaluating sensor signals of the optical sensors having differing spectral properties.

Thus, generally, the pixelated sensors, specifically the transparent pixelated sensors, may be used to record images at different distances to the detector, such as at different distances to the at least one optional transfer device and, more specifically, to at least one lens of the detector. If more than one pixelated sensor is used, several images at different distances to the detector may be recorded simultaneously. Preferably the distances to the lens are as such, that different parts of the images are in focus. Thus, the images can be used in image-processing techniques known as focus stacking, z-stacking, focal plane merging. One application of these techniques is obtaining images with greater depth of field, which is especially helpful in imaging techniques with typically very shallow depth of field such as macro photography or optical microscopy. Another application is to obtain distance information using algorithms, convolution based algorithms such as depth from focus or depth from defocus. Another application is to optimize the images to obtain a greater artistic or scientific merit.

The detector having the plurality of pixelated sensors also may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of pixelated sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

Once the light propagation inside the detector, such as behind a lens of the detector, is modeled and/or recorded, this knowledge of light propagation provides a large number of advantages. Thus, the light-field may be recorded in terms of beam parameters for one or more light beams of a scene captured by the detector. As an example, for each light beam recorded, two or more beam parameters may be recorded, such as one or more Gaussian beam parameters, e.g. a beam waist, a minimum beam waist as a focal point, a Rayleigh length, or other beam parameters. Several representations of light beams may be used and beam parameters may be chosen accordingly.

This knowledge of light propagation, as an example, allows for slightly modifying the observer position after recording an image stack using image processing techniques. In a single image, an object may be hidden behind another object and is not visible. However, if the light scattered by the hidden object reaches the lens and through the lens one or more of the sensors, the object may be made visible, by changing the distance to the lens and/or the image plane relative to the optical axis, or even using non-planar image planes. The change of the observer position may be compared to looking at a hologram, in which changing the observer position slightly changes the image.

The knowledge of light propagation inside the detector, such as by modeling the light propagation behind the lens, may further allow for storing the image information in a more compact way as compared to conventional technology of storing each image recorded by each individual optical sensor. The memory demand for storing all images of each optical sensor typically scales with the number of sensors times the number of pixels. The memory demand of the light propagation scales with the number of modeled light beams times the number of parameters per light beam. Typical model functions for light beams may be Gaussians, Lorentzians, Bessel functions, especially spherical Bessel functions, other functions typically used for describing diffraction effects in physics, or typical spread functions used in depth from defocus techniques such as point spread functions, line spread functions or edge spread functions.

The use of several pixelated sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

As outlined above, the detector according to the present invention may further allow for color detection. For color detection in stacks of several pixelated sensors, the single stacks may have pixels that have different absorption properties, equal or similar to the so-called Bayer pattern, and color information may be obtained by interpolation techniques. A further method is to use sensors of alternating color, wherein different sensors in the stack may record different colors. In a Bayer pattern, color may be interpolated between same-color pixels. In a stack of sensors, the image information such as color and brightness, etc., can also be obtained by interpolation techniques.

The evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Thus, as an example, the evaluation device may comprise one or more measurement devices for measuring electrical currents through and/or electrical voltages of the pixels. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SRI, or analog interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RE connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally refers to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

As outlined above, preferably, specifically in case a plurality of optical sensors is provided, at least one of the optical sensors is a transparent optical sensor. Thus, in case a stack of the optical sensors is provided, preferably all optical sensors of the plurality and/or the stack or all optical sensors of the plurality and/or the stack but one optical sensor are transparent. As an example, in case a stack of optical sensors is provided, wherein the optical sensors are arranged along the optical axis of the detector, preferably all optical sensors but the last optical sensor furthest away from the object may be transparent optical sensors. The last optical sensor, i.e. the optical sensor on the side of the stack facing away from the object, may be a transparent optical sensor or an intransparent optical sensor. Exemplary embodiments will be given below.

As outlined above, the optical sensor preferably comprises an organic photodetector such as an organic solar cell and/or an sDSC. In order to provide a transparent optical sensor, the optical sensor may have two transparent electrodes. Thus, at least one first electrode and/or the at least one second electrode of the optical sensor preferably may fully or partially be transparent. In order to provide a transparent electrode, a transparent conductive oxide may be used (TCO), such as indium-doped tin oxide (ITO) and/or fluorine-doped tin oxide (FTO). Additionally or alternatively, metal layers may be used, such as thin layers of one or more metal selected from the group consisting of Al, Ag, Au and Pt, such as metal layers having a thickness of below 50 nm, preferably below 40 nm. In order to support connectivity, additionally or alternatively, conductive organic materials may be used, such as conductive polymers. Thus, as an example, one or more of the electrodes of the at least one optical sensor may comprise one or more transparent conductive polymers. As an example, one or more conductive polymer films having a surface conductivity of at least 0.00001 S/cm, at least 0.001 S/cm or at least 0.01 S/cm may be used, preferably of at least 0.1 S/cm or, more preferably, of at least 1 S/cm or even at least 10 S/cm or at least 100 S/cm. As an example, the at least one conductive polymer may be selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT:PSS); a polyaniline (PANI); a polythiophene. Preferably, the conductive polymer provides an electric resistivity of 0.1-20 k$\Omega$ between the partial electrodes, preferably an electric resistivity of 0.5-5.0 k$\Omega$ and, more preferably, an electric resistivity of 1.0-3.0 k$\Omega$. Generally, as used herein, a conductive material may be a material which has a specific electrical resistance of less than $10^4$, less than $10^3$, less than $10^2$, or of less than 10 $\Omega$m. Preferably, the conductive material has a specific electrical resistance of less than $10^{-1}$, less than $10^{-2}$, less than $10^{-3}$, less than $10^{-5}$, or less than $10^{-6}$ $\Omega$m. Most preferably, the specific electrical resistance of the conductive material is less than $5\times10^{-7}$ $\Omega$m or is less than $1\times10^{-7}$ $\Omega$m, particularly in the range of the specific electrical resistance of aluminum.

Generally, the optical sensor may comprise an arbitrary optical sensor having a plurality of pixels arranged in a matrix. The optical sensor, as outlined above and for reasons of example only, may comprise at least one semiconductor detector, in particular an organic semiconductor detector comprising at least one organic material, preferably an organic solar cell and particularly preferably a dye solar cell or dye-sensitized solar cell, in particular a solid dye solar cell or a solid dye-sensitized solar cell. Preferably, the optical sensor is or comprises a DSC or sDSC. Thus, preferably, the optical sensor comprises at least one first electrode, at least one n-semiconducting metal oxide, at least one dye, at least one p-semiconducting organic material, preferably a solid p-semiconducting organic material, and at least one second electrode. In a preferred embodiment, the optical sensor comprises at least one DSC or, more preferably, at least one sDSC. As outlined above, preferably, the at least one optical sensor is a transparent optical sensor or comprises at least one transparent optical sensor. Thus, preferably, both the first electrode and the second electrode are transparent or, in case a plurality of optical sensors is provided, at least one of the optical sensors is designed such that both the first electrode and the second electrode are transparent. As outlined above, in case a stack of optical sensors is provided, preferably all optical sensors of the stack are transparent but the last optical sensor of the stack furthest away from the object. The last optical sensor may be transparent or intransparent. In the latter case, the last optical sensor may be designed such that its electrode facing towards the object is transparent, whereas its electrode facing away from the object may be intransparent.

As outlined above, the detector preferably has a plurality of optical sensors. More preferably, the plurality of optical sensors is stacked, such as along the optical axis of the detector. Thus, the optical sensors may form an optical sensor stack. The optical sensor stack preferably may be oriented such that the sensor regions of the optical sensors are oriented perpendicular to the optical axis. Thus, as an example, sensor areas or sensor surfaces of the single optical sensors may be oriented in parallel, wherein slight angular tolerances might be tolerable, such as angular tolerances of no more than 10°, preferably of no more than 5°.

In case stacked optical sensors are provided, the at least one transversal optical sensor preferably fully or partially may be located on a side of the stacked optical sensors facing towards the object. The at least one optional transversal optical sensor may as well be part of the sensor stack. Generally, any other arrangement is feasible. The optical sensors preferably are arranged such that the at least one light beam traveling from the object towards the detector illuminates all optical sensors, preferably sequentially. For the purpose of normalizing the sensor signals of the optical sensors, use may be made of the fact that, in case the single longitudinal sensor signals are generated by one and the same light beam, differences in the single longitudinal sensor signals are generally only due to differences in the cross-sections of the light beam at the location of the respective sensor regions of the single optical sensors. Thus, by comparing the single longitudinal sensor signals, information on a beam cross-section may be generated even if the overall power of the light beam is unknown.

Further, the above-mentioned stacking of the optical sensors and the generation of a plurality of longitudinal sensor signals by these stacked optical sensors may be used by the evaluation device in order to resolve an ambiguity in a known relationship between a beam cross-section of the light beam and the longitudinal coordinate of the beacon device. Thus, even if the beam properties of the light beam propagating from the beacon device to the detector are known fully or partially, it is known that, in many beams, the beam cross-section narrows before reaching a focal point and, afterwards, widens again. Such is the case e.g. for Gaussian light beams. Thus, before and after a focal point in which the light beam has the narrowest beam cross-section, positions along the axis of propagation of the light beam occur in which the light beam has the same cross-section. Thus, as an example, at a distance z0 before and after the focal point, the cross-section of the light beam is identical. Thus, in case only one optical sensor is used, a specific cross-section of the light beam might be determined, in case the overall power or intensity of the light beam is known. By using this information, the distance z0 of the respective optical sensor from the focal point might be determined. However, in order to determine whether the respective optical sensor is located before or behind the focal point, additional information may be required, such as a history of movement of the object and/or the detector and/or information on whether the detector is located before or behind the focal point. In typical situations, this additional information may not be available. Therefore, by using a plurality of optical sensors, additional information may be gained in order to resolve the above-mentioned ambiguity. Thus, in case the evaluation device, by evaluating the longitudinal sensor signals, recognizes that the beam cross-section of the light beam on a first optical sensor is larger than the beam cross-section of the light beam on a second optical sensor, wherein the second optical sensor is located behind the first optical sensor, the evaluation device may determine that the light beam is still narrowing and that the location of the first optical sensor is situated before the focal point of the light beam. Contrarily, in case the beam cross-section of the light beam on the first optical sensor is smaller than the beam cross-section of the light beam on the second optical sensor, the evaluation device may determine that the light beam is widening and that the location of the second optical sensor is situated behind the focal point. Thus, generally, the evaluation device may be adapted to recognize whether the light beam widens or narrows, by comparing the longitudinal sensor signals of different longitudinal sensors.

The optical sensor stack preferably may comprise at least three optical sensors, more preferably at least four optical sensors, even more preferably at least five optical sensors or even at least six optical sensors. By tracking the longitudinal sensor signals of the optical sensors, even a beam profile of the light beam might be evaluated.

As used herein and as used in the following, the diameter of the light beam or, equivalently, a beam waist or twice the beam waist of the light beam might be used to characterize the beam cross-section of the light beam at a specific location. As outlined above, a known relationship might be used between the longitudinal position of the object and/or the respective beacon device, i.e. the beacon device emitting and/or reflecting the light beam, and the beam cross-section in order to determine the longitudinal coordinate of the beacon device by evaluating the at least one longitudinal sensor signal. As an example, as outlined above, a Gaussian relationship might be used, assuming that the light beam propagates at least approximately in a Gaussian manner. For this purpose, the light beam might be shaped appropriately, such as by using an illumination source generating a light beam having known propagation properties, such as a known Gaussian profile. For this purpose, the illumination source itself may generate the light beam having the known properties, which, for example, is the case for many types of lasers, as the skilled person knows. Additionally or alternatively, the illumination source and/or the detector may have one or more transfer devices, such as one or more beam-shaping elements, such as one or more lenses and/or one or more diaphragms, in order to provide a light beam having known properties, as the skilled person will recognize. Thus, as an example, one or more transfer devices may be provided, such as one or more transfer devices having known beam-shaping properties. Additionally or alternatively, the illumination source and/or the detector, such as the at least one optional transfer device, may have one or more wavelength-selective elements, such as one or more filters, such as one or more filter elements for filtering out wavelengths outside an excitation maximum of the at least one transversal optical sensor and/or the at least one optical sensor.

Thus, generally, the evaluation device may be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

As outlined above, the at least one optical sensor or pixelated sensor of the detector, as an example, may be or may comprise at least one organic optical sensor. As an example, the at least one optical sensor may be or may comprise at least one organic solar cell, such as at least one dye-sensitized solar cell (DSC), preferably at least one solid DSC or sDSC. Specifically, the at least one optical sensor may be or may comprise at least one optical sensor capable of showing an effect of the sensor signal being dependent on a photon density or flux of photons. In FiP sensors, given the same total power p of illumination, the sensor signal i is generally dependent on a flux F of photons, i.e. the number of photons per unit area. In other words, the at least one optical sensor may comprise at least one optical sensor which is defined as a FiP sensor, i.e. as an optical sensor capable of providing a sensor signal, the sensor having at least one sensor region, such as a plurality of sensor regions like e.g. pixels, wherein the sensor signal, given the same total power of illumination of the sensor region by the light beam, is dependent on a geometry of the illumination, in particular on a beam cross section of the illumination on the sensor area. This effect including potential embodiments of optical sensors exhibiting this effect (such as sDSCs) is disclosed in further detail in WO 2012/110924 A1, in U.S. provisional applications 61/739,173, filed on Dec. 19, 2012, 61/749,964, filed on Jan. 8, 2013, and 61/867,169, filed on Aug. 19, 2013, and international patent application PCT/IB2013/061095, filed on Dec. 18, 2013. The embodiments of optical sensors exhibiting the FiP effect as disclosed in these prior art documents, which all are included herewith by reference, may also be used as optical sensors in the detector according to the present invention, besides the fact that the optical sensors or at least one of the optical sensors are pixelated. Thus, the optical sensors as used in one or more of the above-mentioned prior art documents, in a pixelated fashion, may also be used in the context of the present invention. A pixelation may simply be achieved by an appropriate patterning of the first and/or second electrodes of these optical sensors. Thus, each of the pixels of the pixelated optical sensors exhibiting the above-mentioned FiP-effect may, by itself, form a FiP sensor.

Thus, the detector according to the present invention specifically may fully or partially be embodied as a pixelated FiP camera, i.e. as a camera in which the at least one optical sensor or, in case a plurality of optical sensors is provided, at least one of the optical sensors, are embodied as pixelated FiP sensors. In pixeled FiP-cameras, pictures may be recorded in a similar way as disclosed above in the setup of the light-field camera. Thus, the detector may comprise a stack of optical sensors, each optical sensor being embodied as a pixelated FiP sensor. Pictures may be recorded at different distances from the lens. A depth can be calculated from these pictures using approaches such as depth-from-focus and/or depth-from-defocus.

The FiP measurement typically necessitates two or more FiP sensors such as organic solar cells exhibiting the FiP effect. The photon density on the different cells may vary as such, that a current ratio of at least 1/100 is obtained between a cell close to focus and a cell out of focus. If the ratio is closer to 1, the measurement may be imprecise.

The at least one evaluation device may specifically be embodied to compare signals generated by pixels of different optical sensors, the pixels being located on a line parallel to an optical axis of the detector. A light cone of the light beam might cover a single pixel in the focus region. In the out-of-focus region, only a small part of the light cone will cover the pixel. Thus, in a stack of pixelated FiP sensors, the signal of the pixel of the sensor being out of focus will generally be much smaller than the signal of the pixel of the sensor being in focus. Consequently, the signal ratio will improve. For a calculation of the distance between the object and the detector, more than two optical sensors may be used in order to further increase the precision.

Thus, generally, the at least one optical sensor may comprise at least one stack of optical sensors, each optical sensor having at least one sensor region and being capable of providing at least one sensor signal, wherein the sensor signal, given the same total power of illumination of the sensor region by the light beam, is dependent on a geometry of the illumination, in particular on a beam cross section of the illumination on the sensor area, wherein the evaluation device may be adapted to compare at least one sensor signal generated by at least one pixel of a first one of the optical sensors with at least one sensor signal generated by at least one pixel of a second one of the optical sensors, specifically for determining a distance between the object and the detector and/or a z-coordinate of the object. The evaluation device may further be adapted for evaluating the sensor signals of the pixels. Thus, one or more evaluation algorithms may be used. Additionally or alternatively, other means of evaluation may be used, such as by using one or more lookup tables, such as one or more lookup tables comprising FiP sensor signal values or ratios thereof and corresponding z-coordinates of the object and/or corresponding distances between the object and the detector. An analysis of several FiP-signals, taking into account the distance to the lens and/or a distance between the optical sensors may also result in information regarding the light beam, such as the spread of the light beam and, thus, the conventional FiP-distance.

As outlined above, the present invention further relates to a human-machine interface for exchanging at least one item of information between a user and a machine. The human-machine interface as proposed may make use of the fact that the above-mentioned detector in one or more of the embodiments mentioned above or as mentioned in further detail below may be used by one or more users for providing information and/or commands to a machine. Thus, preferably, the human-machine interface may be used for inputting control commands.

Generally, as used herein, the at least one position of the user may imply one or more items of information on a position of the user as a whole and/or one of or more body parts of the user. Thus, preferably, the position of the user may imply one or more items of information on a position of the user as provided by the evaluation device of the detector. The user, a body part of the user or a plurality of body parts of the user may be regarded as one or more objects the position of which may be detected by the at least one detector device. Therein, precisely one detector may be provided, or a combination of a plurality of detectors may be provided. As an example, a plurality of detectors may be provided for determining positions of a plurality of body parts of the user and/or for determining a position of at least one body part of the user.

The detector according to the present invention, comprising the at least one optical sensor and the at least one evaluation device, may further be combined with one or more other types of sensors or detectors. Thus, the detector comprising the at least one optical sensor having the matrix of pixels (in the following also simply referred to as the pixelated optical sensor and/or the pixelated sensor) and the at least one evaluation device may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

Specifically, the detector according to the present invention may further comprise at least one time-of-flight (ToF) detector adapted for detecting at least one distance between the at least one object and the detector by performing at least one time-of-flight measurement. As used herein, a time-of-flight measurement generally refers to a measurement based on a time a signal needs for propagating between two objects or from one object to a second object and back. In the present case, the signal specifically may be one or more of an acoustic signal or an electromagnetic signal such as a light signal. A time-of-flight detector consequently refers to a detector adapted for performing a time-of-flight measurement. Time-of-flight measurements are well-known in various fields of technology such as in commercially available distance measurement devices or in commercially available flow meters, such as ultrasonic flow meters. Time-of-flight detectors even may be embodied as time-of-flight cameras. These types of cameras are commercially available as range-imaging camera systems, capable of resolving distances between objects based on the known speed of light.

Presently available ToF detectors generally are based on the use of a pulsed signal, optionally in combination with one or more light sensors such as CMOS-sensors. A sensor signal produced by the light sensor may be integrated. The integration may start at two different points in time. The distance may be calculated from the relative signal intensity between the two integration results.

Further, as outlined above, ToF cameras are known and may generally be used, also in the context of the present invention. These ToF cameras may contain pixelated light sensors. However, since each pixel generally has to allow for performing two integrations, the pixel construction generally is more complex and the resolutions of commercially available ToF cameras is rather low (typically 200×200 pixels). Distances below ~40 cm and above several meters typically are difficult or impossible to detect. Furthermore, the periodicity of the pulses leads to ambiguous distances, as only the relative shift of the pulses within one period is measured.

ToF detectors, as standalone devices, typically suffer from a variety of shortcomings and technical challenges. Thus, in general, ToF detectors and, more specifically, ToF cameras suffer from rain and other transparent objects in the light path, since the pulses might be reflected too early, objects behind the raindrop are hidden, or in partial reflections the integration will lead to erroneous results. Further, in order to avoid errors in the measurements and in order to allow for a clear distinction of the pulses, low light conditions are preferred for ToF-measurements. Bright light such as bright sunlight can make a ToF-measurement impossible. Further, the energy consumption of typical ToF cameras is rather high, since pulses must be bright enough to be back-reflected and still be detectable by the camera. The brightness of the pulses, however, may be harmful for eyes or other sensors or may cause measurement errors when two or more ToF measurements interfere with each other. In summary, current ToF detectors and, specifically, current ToF-cameras suffer from several disadvantages such as low resolution, ambiguities in the distance measurement, limited range of use, limited light conditions, sensitivity towards transparent objects in the light path, sensitivity towards weather conditions and high energy consumption. These technical challenges generally lower the aptitude of present ToF cameras for daily applications such as for safety applications in cars, cameras for daily use or human-machine-interfaces, specifically for use in gaming applications.

In combination with the detector according to the present invention, having the at least one optical sensor comprising the matrix of pixels and as well as the above-mentioned principle of evaluating the number of illuminated pixels, the advantages and capabilities of both systems may be combined in a fruitful way. Thus, the detector may provide advantages at bright light conditions, while the ToF detector generally provides better results at low-light conditions. A combined device, i.e. a detector according to the present invention further including at least one ToF detector, therefore provides increased tolerance with regard to light conditions as compared to both single systems. This is especially important for safety applications, such as in cars or other vehicles.

Specifically, the detector may be designed to use at least one ToF measurement for correcting at least one measurement performed by using the detector according to the present invention and vice versa. Further, the ambiguity of a ToF measurement may be resolved by using the detector. A measurement using the pixelated detector specifically may be performed whenever an analysis of ToF measurements results in a likelihood of ambiguity. Additionally or alternatively, measurements using the pixelated detector may be performed continuously in order to extend the working range of the ToF detector into regions which are usually excluded due to the ambiguity of ToF measurements. Additionally or alternatively, the pixelated detector may cover a broader or an additional range to allow for a broader distance measurement region. The pixelated detector, specifically the pixelated camera, may further be used for determining one or more important regions for measurements to reduce energy consumption or to protect eyes. Thus the pixelated detector may be adapted for detecting one or more regions of interest. Additionally or alternatively, the pixelated detector may be used for determining a rough depth map of one or more objects within a scene captured by the detector, wherein the rough depth map may be refined in important regions by one or more ToF measurements. Further, the pixelated detector may be used to adjust the ToF detector, such as the ToF camera, to the required distance region. Thereby, a pulse length and/or a frequency of the ToF measurements may be pre-set, such as for removing or reducing the likelihood of ambiguities in the ToF measurements. Thus, generally, the pixelated detector may be used for providing an autofocus for the ToF detector, such as for the ToF camera.

As outlined above, a rough depth map may be recorded by the pixelated detector, such as the pixelated camera. Further, the rough depth map, containing depth information or z-information regarding one or more objects within a scene captured by the detector, may be refined by using one or more ToF measurements. The ToF measurements specifically may be performed only in important regions. Additionally or alternatively, the rough depth map may be used to adjust the ToF detector, specifically the ToF camera.

Further, the use of the pixelated detector in combination with the at least one ToF detector may solve the above-mentioned problem of the sensitivity of ToF detectors towards the nature of the object to be detected or towards obstacles or media within the light path between the detector and the object to be detected, such as the sensitivity towards rain or weather conditions. A combined pixelated/ToF measurement may be used to extract the important information from ToF signals, or measure complex objects with several transparent or semi-transparent layers. Thus, objects made of glass, crystals, liquid structures, phase transitions, liquid motions, etc. may be observed. Further, the combination of a pixelated detector and at least one ToF detector will still work in rainy weather, and the overall detector will generally be less dependent on weather conditions. As an example, measurement results provided by the pixelated detector may be used to remove the errors provoked by rain from ToF measurement results, which specifically renders this combination useful for safety applications such as in cars or other vehicles.

The implementation of at least one ToF detector into the detector according to the present invention may be realized in various ways. Thus, the at least one pixelated detector and the at least one ToF detector may be arranged in a sequence, within the same light path. As an example, at least one transparent pixelated detector may be placed in front of at least one ToF detector. Additionally or alternatively, separate light paths or split light paths for the pixelated detector and the ToF detector may be used. Therein, as an example, light paths may be separated by one or more beam-splitting elements, such as one or more of the beam splitting elements listed above or listed in further detail below. As an example, a separation of beam paths by wavelength-selective elements may be performed. Thus, e.g., the ToF detector may make use of infrared light, whereas the pixelated detector may make use of light of a different wavelength. In this example, the infrared light for the ToF detector may be separated off by using a wavelength-selective beam splitting element such as a hot mirror. Additionally or alternatively, light beams used for the measurement using the pixelated detector and light beams used for the ToF measurement may be separated by one or more beam-splitting elements, such as one or more semitransparent mirrors, beam-splitter cubes, polarization beam splitters or combinations thereof. Further, the at least one pixelated detector and the at least one ToF detector may be placed next to each other in the same device, using distinct optical pathways. Various other setups are feasible.

The at least one optional ToF detector may be combined with basically any of the embodiments of the detector according to the present invention. Specifically, the at least one ToF detector which may be a single ToF detector or a ToF camera, may be combined with a single optical sensor or with a plurality of optical sensors such as a sensor stack. Further, the detector may also comprise one or more imaging devices such as one or more inorganic imaging devices like CCD chips and/or CMOS chips, preferably one or more full-color CCD chips or full-color CMOS chips. Additionally or alternatively, the detector may further comprise one or more thermographic cameras.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit; a stick that may be held by hand; a bat; a club; a racket; a cane; a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The optional transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The optional transfer device can also, as explained in even greater detail below, be wholly or partly a constituent part of at least one optional illumination source, for example by the illumination source being designed to provide a light beam having defined optical properties, for example having a defined or precisely known beam profile, for example at least one Gaussian beam, in particular at least one laser beam having a known beam profile.

For potential embodiments of the optional illumination source, reference may be made to WO 2012/110924 A1.

Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source independently from each other and generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers. Most preferably, the at least one illumination source is adapted to emit light in the visible spectral range, preferably in the range of 500 nm to 780 nm, most preferably at 650 nm to 750 nm or at 690 nm to 700 nm.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

The evaluation device can comprise in particular at least one data processing device, in particular an electronic data processing device, which can be designed to generate the at least one item of information on the position of the object. Thus, the evaluation device may be designed to use the number of illuminated pixels of the optical sensor or of each optical sensor as input variables and to generate the at least one item of information on the position of the object by processing these input variables. The processing can be done in parallel, subsequently or even in a combined manner. The evaluation device may use an arbitrary process for generating these items of information, such as by calculation and/or using at least one stored and/or known relationship. The relationship can be a predetermined analytical relationship or can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation.

By way of example, the evaluation device can be designed in terms of programming for the purpose of determining the items of information. The evaluation device can comprise in particular at least one computer, for example at least one microcomputer. Furthermore, the evaluation device can comprise one or a plurality of volatile or nonvolatile data memories. As an alternative or in addition to a data processing device, in particular at least one computer, the evaluation device can comprise one or a plurality of further electronic components which are designed for determining the items of information, for example an electronic table and in particular at least one look-up table and/or at least one application-specific integrated circuit (ASIC).

Overall, in the context of the present invention, the following embodiments are regarded as preferred:

Embodiment 1

A detector for determining a position of at least one object, the detector comprising:
  at least one optical sensor, the optical sensor being adapted to detect a light beam traveling from the object towards the detector, the optical sensor having at least one matrix of pixels; and
  at least one evaluation device, the evaluation device being adapted for determining an intensity distribution of pixels of the optical sensor which are illuminated by the light beam, the evaluation device further being adapted for determining at least one longitudinal coordinate of the object by using the intensity distribution.

Embodiment 2

The detector according to the preceding embodiment, wherein the evaluation device is adapted to determine the longitudinal coordinate of the object by using a predetermined relationship between the intensity distribution and the longitudinal coordinate.

Embodiment 3

The detector according to any one of the preceding embodiments, wherein the intensity distribution comprises one or more of:
  an intensity as a function of a transversal position of the respective pixel in a plane perpendicular to an optical axis of the optical sensor;
  an intensity as a function of a pixel coordinate;
  a distribution of a number # of pixels having a specific intensity as a function of the intensity.

Embodiment 4

The detector according to any one of the preceding embodiments, wherein the intensity distribution approximates an intensity distribution of an illumination by a Gaussian light beam.

Embodiment 5

The detector according to any one of the preceding embodiments, wherein the evaluation device is adapted to determine at least one intensity distribution function approximating the intensity distribution.

Embodiment 6

The detector according to the preceding embodiment, wherein the evaluation device is adapted to determine the longitudinal coordinate of the object by using a predetermined relationship between a longitudinal coordinate and the intensity distribution function and/or at least one parameter derived from the intensity distribution function.

Embodiment 7

The detector according to any one of the two preceding embodiments, wherein the intensity distribution function is a beam shape function of the fight beam.

Embodiment 8

The detector according to any one of the three preceding embodiments, wherein the intensity distribution function comprises a two-dimensional or a three-dimensional mathematical function approximating an intensity information contained within at least part of the pixels of the optical sensor.

Embodiment 9

The detector according to the preceding embodiment, wherein the two-dimensional or three-dimensional mathematical function comprises a function of at least one pixel coordinate of the matrix of pixels.

Embodiment 10

The detector according to any one of the two preceding embodiments, wherein a pixel position of the pixels of the matrix is defined by (x, y), with x, y being pixel coordinates, wherein the two-dimensional or three-dimensional mathematical function comprises one or more functions selected from the group consisting of f(x), f(y), f(x, y).

Embodiment 11

The detector according to any one of the three preceding embodiments, wherein the two-dimensional or three-dimensional mathematical function is selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function.

Embodiment 12

The detector according to any one of the preceding embodiments, wherein the detector is adapted to determine intensity distributions in a plurality of planes, preferably adapted to determine intensity distribution for each of the planes, wherein the planes preferably are perpendicular to an optical axis of the detector, and wherein preferably the plurality of planes are offset from one another along the optical axis.

Embodiment 13

The detector according to the preceding embodiment, wherein the detector comprises a plurality of optical sensors, specifically a stack of optical sensors.

Embodiment 14

The detector according to any one of the two preceding embodiments, wherein the evaluation device is adapted to evaluate a change in the intensity distribution as a function of a longitudinal coordinate along the optical axis for determining the longitudinal coordinate of the object.

Embodiment 15

The detector according to any one of the three preceding embodiments, wherein the evaluation device is adapted to determine a plurality of intensity distribution functions, each intensity distribution function approximating the intensity distribution in one of the planes, wherein the evaluation device is further adapted to derive the longitudinal coordinate of the object from the plurality of intensity distribution functions.

Embodiment 16

The detector according to the preceding embodiment, wherein each of the intensity distribution functions is a beam shape function of the light beam in the respective plane.

Embodiment 17

The detector according to any one of the two preceding embodiments, wherein the evaluation device is adapted to derive at least one beam parameter from each intensity distribution function.

Embodiment 18

The detector according to the preceding embodiment, wherein the evaluation device is adapted to evaluate a change of the at least one beam parameter as a function of a longitudinal coordinate along the optical axis for determining the longitudinal coordinate of the object.

Embodiment 19

The detector according to any one of the two preceding embodiments, wherein the at least one beam parameter is selected from the group consisting of: a beam diameter; a beam waist; a Gaussian beam parameter.

Embodiment 20

The detector according to any one of the three preceding embodiments, wherein the evaluation device is adapted to determine the longitudinal coordinate of the object by using a predetermined relationship between the beam parameters and the longitudinal coordinate.

Embodiment 20

The detector according to any one of the preceding embodiments, wherein the optical sensor is adapted to generate at least one signal indicating an intensity of illumination for each of the pixels.

Embodiment 21

The detector according to any one of the nine preceding embodiments, wherein the evaluation device is adapted to compare, for each of the pixels, the signal to at least one threshold in order to determine whether the pixel is an illuminated pixel or not.

Embodiment 22

The detector according to the preceding embodiment, wherein the evaluation device is adapted to determine at least one pixel having the highest illumination out of the pixels by comparing the signals of the pixels.

Embodiment 23

The detector according to the preceding embodiment, wherein the evaluation device is further adapted to choose the threshold as a fraction of the signal of the at least one pixel having the highest illumination.

Embodiment 24

The detector according to the preceding embodiment, wherein the evaluation device is adapted to choose the threshold by multiplying the signal of the at least one pixel having the highest illumination with a factor of $1/e^2$.

Embodiment 25

The detector according to any one of the preceding embodiments, wherein the determining of the intensity distribution comprises determining a number N of pixels of the optical sensor which are illuminated by the light beam, wherein the determining of the at least one longitudinal coordinate of the object comprises using the number N of pixels which are illuminated by the light beam.

Embodiment 26

The detector according to the preceding embodiment, wherein the evaluation device is adapted to determine the longitudinal coordinate of the object by using a predetermined relationship between the number N of pixels which are illuminated by the light beam and the longitudinal coordinate.

Embodiment 27

The detector according to the preceding embodiment, wherein the predetermined relationship is based on the assumption of the light beam being a Gaussian light beam.

Embodiment 28

The detector according to any one of the two preceding embodiments, wherein the predetermined relationship is $$N \sim \pi \cdot w_0^2 \cdot \left(1 + \left(\frac{z}{z_0}\right)^2\right),$$

wherein z is the longitudinal coordinate,
wherein $w_0$ is a minimum beam radius of the light beam when propagating in space,
wherein $z_0$ is a Rayleigh-length of the light beam with $z_0 = \pi \cdot w_0^2 / \lambda$, $\lambda$ being the wavelength of the light beam.

Embodiment 29

The detector according to any one of the preceding embodiments, wherein the matrix of pixels is a two-dimensional matrix.

Embodiment 30

The detector according to any one of the preceding embodiments, wherein the matrix of pixels is a rectangular matrix.

Embodiment 31

The detector according to any one of the preceding embodiments, wherein the detector comprises a plurality of the optical sensors.

Embodiment 32

The detector according to the preceding embodiment, wherein the optical sensors are stacked along an optical axis of the detector.

Embodiment 33

The detector according to any one of the two preceding embodiments, wherein the detector comprises n optical sensors, wherein n preferably is a positive integer, wherein the evaluation device is adapted to determine a number $N_i$ of pixels which are illuminated by the light beam for each of the optical sensors, wherein $i \in \{1, n\}$ denotes the respective optical sensor.

Embodiment 34

The detector according to any one of the three preceding embodiments, wherein the evaluation device is adapted to compare the number $N_i$ of pixels which are illuminated by the light beam for each optical sensor with at least one neighboring optical sensor, thereby resolving an ambiguity in the longitudinal coordinate of the object.

Embodiment 36

The detector according to any one of the four preceding embodiments, wherein the evaluation device is adapted to normalize sensor signals of the optical sensors for a power of the light beam.

Embodiment 37

The detector according to any one of the five preceding embodiments, wherein at least one of the optical sensors is transparent.

Embodiment 38

The detector according to any one of the six preceding embodiments, wherein at least two of the optical sensors have a differing spectral sensitivity, wherein the evaluation device is adapted to determine a color of the light beam by comparing sensor signals of the optical sensors having the differing spectral sensitivity.

Embodiment 39

The detector according to any one of the preceding embodiments, wherein the evaluation device is further adapted to determine at least one transversal coordinate of the object by determining a position of the light beam on the matrix of pixels.

Embodiment 40

The detector according to the preceding embodiment, wherein the evaluation device is adapted to determine a center of illumination of the matrix by the light beam, wherein the at least one transversal coordinate of the object is determined by evaluating at least one coordinate of the center of illumination.

Embodiment 41

The detector according to the preceding embodiment, wherein the coordinate of the center of illumination is a pixel coordinate of the center of illumination.

Embodiment 42

The detector according to any one of the three preceding embodiments, wherein the evaluation device is adapted to provide at least one three-dimensional position of the object.

Embodiment 43

The detector according to any one of the three preceding embodiments, wherein the evaluation device is adapted to provide at least one three-dimensional image of a scene captured by the detector.

Embodiment 44

The detector according to any one of the preceding embodiments, wherein the detector further comprises at least one transfer device, the transfer device being adapted to guide the light beam onto the optical sensor.

Embodiment 45

The detector according to the preceding embodiment, wherein the transfer device has imaging properties.

Embodiment 46

The detector according to any one of the two preceding embodiments, wherein the transfer device comprises at least one element selected from the group consisting of a lens, a mirror, a prism, a wavelength-selective element; a diaphragm.

Embodiment 47

The detector according to any one of the preceding embodiments, wherein the optical sensor comprises at least one organic photovoltaic device.

Embodiment 48

The detector according to any one of the preceding embodiments, wherein the optical sensor comprises at least one dye-sensitized solar cell having at least one patterned electrode.

Embodiment 49

The detector according to any one of the preceding embodiments, wherein the optical sensor comprises at least one first electrode, at least one second electrode and at least one light-sensitive layer embedded in between the first electrode and the second electrode.

Embodiment 50

The detector according to the preceding embodiment, wherein the first electrode comprises a plurality of first electrode stripes and wherein the second electrode comprises a plurality of second electrode stripes, wherein the first electrode stripes are oriented perpendicular to the second electrode stripes.

Embodiment 51

The detector according to any one of the preceding embodiments, wherein the optical sensor comprises at least one first electrode, at least one n-semiconducting metal oxide, at least one dye, at least one p-semiconducting organic material, preferably a solid p-semiconducting organic material, and at least one second electrode, with the at least one n-semiconducting metal oxide, the at least one dye and the at least one p-semiconducting organic material being embedded in between the first electrode and the second electrode.

Embodiment 52

The detector according to the preceding embodiment, wherein both the first electrode and the second electrode are transparent.

Embodiment 53

The detector according to any one of the two preceding embodiments, wherein at least one of the first electrode and the second electrode is the patterned electrode.

Embodiment 54

The detector according to any one of the three preceding embodiments, wherein the first electrode comprises a plurality of first electrode stripes and wherein the second electrode comprises a plurality of second electrode stripes, wherein the first electrode stripes are oriented perpendicular to the second electrode stripes.

Embodiment 55

The detector according to any one of the four preceding embodiments, wherein at least one of the first electrode and the second electrode comprise an electrically conductive polymer.

Embodiment 56

The detector according to any one of the preceding embodiments, wherein the detector comprises at least one stack of the optical sensors, wherein the detector is adapted to acquire a three-dimensional image of a scene within a field of view of the detector.

Embodiment 57

The detector according to the preceding embodiment, wherein the optical sensors of the stack have differing spectral properties.

Embodiment 58

The detector according to the preceding embodiment, wherein the stack comprises at least one first optical sensor having a first spectral sensitivity and at least one second optical sensor having a second spectral sensitivity, wherein the first spectral sensitivity and the second spectral sensitivity are different.

Embodiment 59

The detector according to any one of the two preceding embodiments, wherein the stack comprises optical sensors having differing spectral properties in an alternating sequence.

Embodiment 60

The detector according to any one of the three preceding embodiments, wherein the detector is adapted to acquire a multicolor three-dimensional image, preferably a full-color three-dimensional image, by evaluating sensor signals of the optical sensors having differing spectral properties.

Embodiment 61

The detector according to any one of the preceding embodiments, wherein the detector further comprises at least one time-of-flight detector adapted for detecting at least one distance between the at least one object and the detector by performing at least one time-of-flight measurement.

Embodiment 62

The detector according to any one of the preceding embodiments, wherein the at least one optical sensor comprises at least one optical sensor having at least one sensor region and being capable of providing at least one sensor signal, wherein the sensor signal, given the same total power of illumination of the sensor region by the light beam, is dependent on a geometry of the illumination, in particular on a beam cross section of the illumination on the sensor area.

Embodiment 63

The detector according to any one of the preceding embodiments, wherein the at least one optical sensor comprises at least one stack of optical sensors, each optical sensor having at least one sensor region and being capable of providing at least one sensor signal, wherein the sensor signal, given the same total power of illumination of the sensor region by the light beam, is dependent on a geometry of the illumination, in particular on a beam cross section of the illumination on the sensor area, wherein the evaluation device is adapted to compare at least one sensor signal generated by at least one pixel of a first one of the optical sensors with at least one sensor signal generated by at least one pixel of a second one of the optical sensors.

Embodiment 64

A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 65

The detector system according to the preceding embodiment, wherein the beacon device comprises at least one illumination source.

Embodiment 66

The detector system according to any one of the two preceding embodiments, wherein the beacon device comprises at least one reflective device adapted to reflect a primary light beam generated by an illumination source independent from the object.

Embodiment 67

The detector system according to any one of the three preceding embodiments, wherein the detector system comprises at least two beacon devices, preferably at least three beacon devices.

Embodiment 68

The detector system according to any one of the four preceding embodiments, wherein the detector system further comprises the at least one object.

Embodiment 69

The detector system according to the preceding embodiment, wherein the object is a rigid object.

Embodiment 70

The detector system according to any one of the two preceding embodiments, wherein the object is selected from the group consisting of: an article of sports equipment, preferably an article selected from the group consisting of a racket, a club, a bat; an article of clothing; a hat; a shoe.

Embodiment 71

A human-machine interface for exchanging at least one item of information between a user and a machine, wherein the human-machine interface comprises at least one detector system according to any one of the preceding embodiments referring to a detector system, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 72

An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 73

A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 74

A camera for imaging at least one object, the camera comprising at least one detector according to any one of the preceding embodiments referring to a detector.

Embodiment 75

A method for determining a position of at least one object, the method comprising the following steps:
- at least one detection step, wherein at least one light beam traveling from the object to a detector is detected by at least one optical sensor of the detector, the at least one optical sensor having at least one matrix of pixels; and
- at least one evaluation step, wherein an intensity distribution of pixels of the optical sensor is determined which are illuminated by the light beam, wherein at least one longitudinal coordinate of the object is determined by using the intensity distribution.

Embodiment 76

The method according to the preceding embodiment, wherein the longitudinal coordinate of the object is determined by using a predetermined relationship between the intensity distribution and the longitudinal coordinate.

Embodiment 77

The method according to any one of the preceding embodiments referring to a method, wherein the intensity distribution comprises one or more of:
- an intensity as a function of a transversal position of the respective pixel in a plane perpendicular to an optical axis of the optical sensor;
- an intensity as a function of a pixel coordinate;
- a distribution of a number # of pixels having a specific intensity as a function of the intensity.

Embodiment 78

The method according to any one of the preceding embodiments referring to a method, wherein the intensity distribution approximates an intensity distribution of an illumination by a Gaussian light beam.

Embodiment 79

The method according to any one of the preceding embodiments referring to a method, wherein at least one intensity distribution function approximating the intensity distribution is determined.

Embodiment 80

The method according to the preceding embodiment, wherein the longitudinal coordinate of the object is determined by using a predetermined relationship between a longitudinal coordinate and the intensity distribution function and/or at least one parameter derived from the intensity distribution function.

Embodiment 81

The method according to any one of the two preceding embodiments, wherein the intensity distribution function is a beam shape function of the light beam.

Embodiment 82

The method according to any one of the three preceding embodiments, wherein the intensity distribution comprises a two-dimensional or a three-dimensional mathematical function approximating an intensity information contained within at least part of the pixels of the optical sensor.

Embodiment 83

The method according to the preceding embodiment, wherein the two-dimensional or three-dimensional mathematical function comprises a function of at least one pixel coordinate of the matrix of pixels.

Embodiment 84

The method according to any one of the two preceding embodiments, wherein a pixel position of the pixels of the matrix is defined by (x, y), with x, y being pixel coordinates, wherein the two-dimensional or three-dimensional mathematical function comprises one or more functions selected from the group consisting of f(x), f(y), f(x, y).

Embodiment 85

The method according to any one of the three preceding embodiments, wherein the two-dimensional or three-dimensional mathematical function comprises at least one mathematical function selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function; or at least one derivative, at least one linear combination or at least one product comprising one or more of the listed functions.

Embodiment 86

The method according to any one of the preceding embodiments referring to a method, wherein intensity distributions are determined in a plurality of planes, wherein preferably at least one intensity distribution for each of the planes is determined, wherein the planes preferably are perpendicular to an optical axis of the detector, and wherein preferably the plurality of planes are offset from one another along the optical axis.

Embodiment 87

The method according to the preceding embodiment, wherein the detector comprises a plurality of optical sensors, specifically a stack of optical sensors.

Embodiment 88

The method according to any one of the two preceding embodiments, wherein a change in the intensity distribution is determined as a function of a longitudinal coordinate along the optical axis for determining the longitudinal coordinate of the object.

Embodiment 89

The method according to any one of the three preceding embodiments, wherein a plurality of intensity distribution functions is determined, each intensity distribution function approximating the intensity distribution in one of the planes, wherein further the longitudinal coordinate of the object is derived from the plurality of intensity distribution functions.

Embodiment 90

The method according to the preceding embodiment, wherein each of the intensity distribution functions is a beam shape function of the light beam in the respective plane.

Embodiment 91

The method according to any one of the two preceding embodiments, wherein at least one beam parameter is derived from each intensity distribution function.

Embodiment 92

The method according to the preceding embodiment, wherein a change of the at least one beam parameter is determined as a function of a longitudinal coordinate along the optical axis for determining the longitudinal coordinate of the object.

Embodiment 93

The method according to any one of the two preceding embodiments, wherein the at least one beam parameter is selected from the group consisting of: a beam diameter; a beam waist; a Gaussian beam parameter.

Embodiment 94

The method according to any one of the three preceding embodiments, wherein the longitudinal coordinate of the object is determined by using a predetermined relationship between the beam parameters and the longitudinal coordinate.

Embodiment 95

The method according to any one of the preceding embodiments referring to a method, wherein the optical sensor generates at least one signal indicating an intensity of illumination for each of the pixels.

Embodiment 96

The method according to the preceding embodiment, wherein, in the evaluation step, for each of the pixels, the signal is compared to at least one threshold in order to determine whether the pixel is an illuminated pixel or not.

Embodiment 97

The method according to the preceding embodiment, wherein, in the evaluation step, at least one pixel having the highest illumination out of the pixels is determined by comparing the signals of the pixels.

Embodiment 98

The method according to the preceding embodiment, wherein the threshold is chosen as a fraction of the signal of the at least one pixel having the highest illumination.

Embodiment 99

The method according to the preceding embodiment, wherein the threshold is chosen by multiplying the signal of the at least one pixel having the highest illumination with a factor of $1/e^2$.

Embodiment 100

The method according to any one of the preceding embodiments referring to a method, wherein the determining of the intensity distribution comprises determining a number N of pixels of the optical sensor which are illuminated by the light beam, wherein the determining of the at least one longitudinal coordinate of the object comprises using the number N of pixels which are illuminated by the light beam.

Embodiment 101

The method according to the preceding embodiment, wherein the longitudinal coordinate of the object is determined by using a predetermined relationship between the number N of pixels which are illuminated by the light beam and the longitudinal coordinate.

Embodiment 102

The method according to the preceding embodiment, wherein the predetermined relationship is based on the assumption of the light beam being a Gaussian light beam.

Embodiment 103

The method according to any one of the two preceding embodiments, wherein the predetermined relationship is $$N \sim \pi \cdot w_0^2 \cdot \left(1 + \left(\frac{z}{z_0}\right)^2\right),$$

wherein z is the longitudinal coordinate,
wherein $w_0$ is a minimum beam radius of the light beam when propagating in space,
wherein $z_0$ is a Rayleigh-length of the light beam with $z_0 = \pi \cdot w_0^2/\lambda$, $\lambda$ being the wavelength of the light beam.

Embodiment 104

The method according to any one of the preceding method embodiments, wherein the matrix of pixels is a two-dimensional matrix.

Embodiment 105

The method according to any one of the preceding method embodiments, wherein the matrix of pixels is a rectangular matrix.

Embodiment 106

The method according to any one of the preceding method embodiments, wherein the detector comprises a plurality of the optical sensors.

Embodiment 107

The method according to the preceding embodiment, wherein the optical sensors are stacked along an optical axis of the detector.

Embodiment 108

The method according to any one of the two preceding embodiments, wherein the detector comprises n optical sensors, wherein the number $N_i$ of pixels which are illuminated by the light beam is determined for each of the optical sensors, wherein $i \in \{1, n\}$ denotes the respective optical sensor.

Embodiment 109

The method according to any one of the three preceding embodiments, wherein the number $N_i$ of pixels which are illuminated by the light beam for each optical sensor is compared with at least one neighboring optical sensor, thereby resolving an ambiguity in the longitudinal coordinate of the object.

Embodiment 110

The method according to any one of the four preceding embodiments, wherein the sensor signals of the optical sensors are normalized for a power of the light beam.

Embodiment 111

A use of the detector according to any one of the preceding embodiments relating to a detector, for a purpose of use, selected from the group consisting of: a position measurement in traffic technology; an entertainment application; a security application; a safety application; a human-machine interface application; a tracking application; a photography application; a use in combination with at least one time-of-flight detector.

BRIEF DESCRIPTION OF THE FIGURES

Further optional details and features of the invention are evident from the description of preferred exemplary embodiments which follows in conjunction with the dependent claims. In this context, the particular features may be implemented alone or with several in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 4A to 4C show various views of an optical sensor which may be used in the detector according to the present invention;

EXEMPLARY EMBODIMENTS

Figure 1:
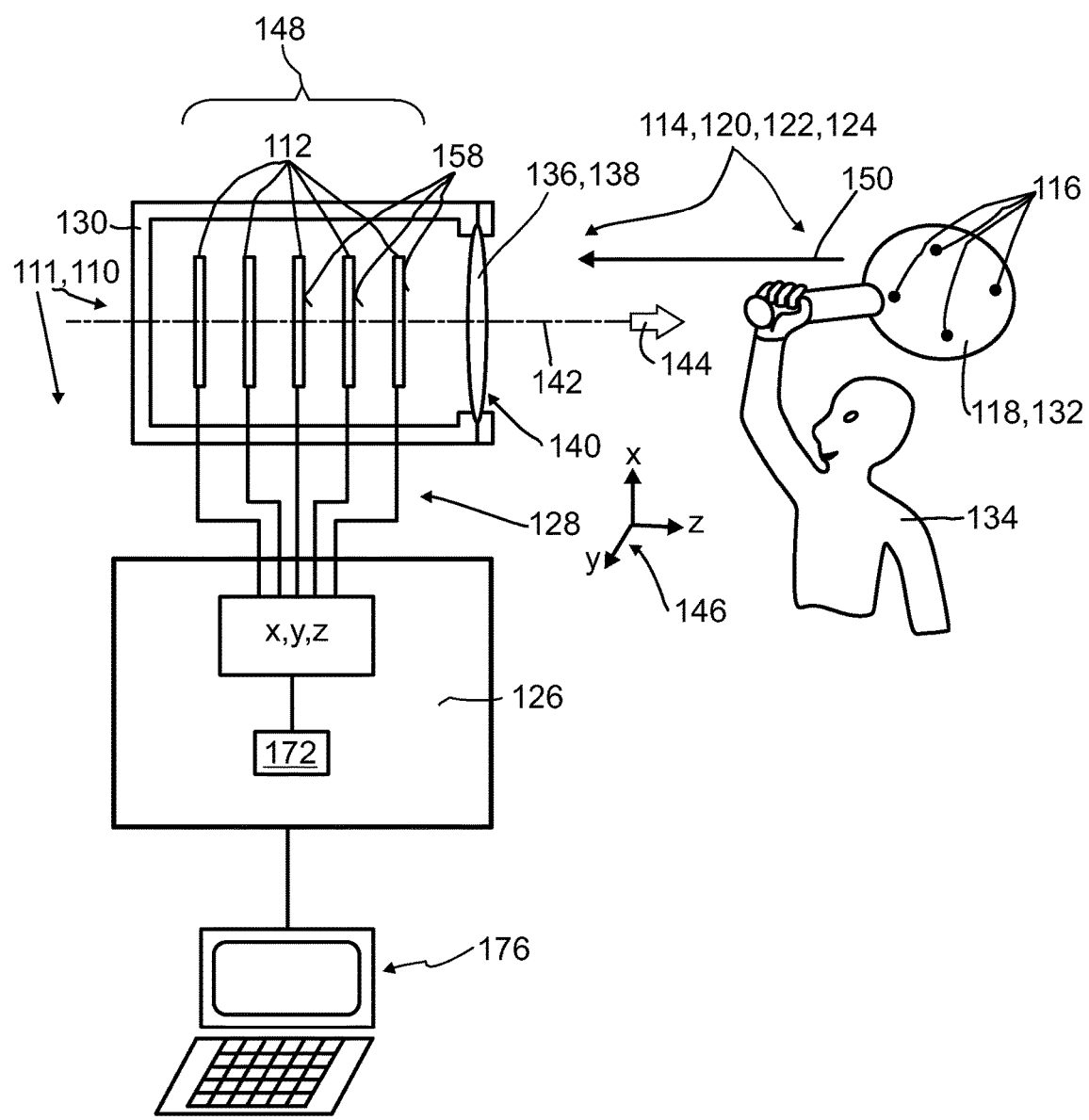
FIG. 1 shows an exemplary embodiment of a detector, a detector system, a human-machine interface, an entertainment device and a tracking system according to the present invention.

FIG. 1 shows, in a highly schematic illustration, an exemplary embodiment of a detector 110, having a plurality of optical sensors 112. The detector 110 specifically may be embodied as a camera 111 or may be part of a camera 111. The camera 111 may be made for imaging, specifically for 3D imaging, and may be made for acquiring standstill images and/or image sequences such as digital video clips. Other embodiments are feasible. FIG. 1 further shows an embodiment of a detector system 114, which, besides the at least one detector 110, comprises one or more beacon devices 116, which, in this exemplary embodiment, are attached and/or integrated into an object 118, the position of which shall be detected by using the detector 110. FIG. 1 further shows an exemplary embodiment of a human-machine interface 120, which comprises the at least one detector system 114, and, further, an entertainment device 122, which comprises the human-machine interface 120. The figure further shows an embodiment of a tracking system 124 for tracking a position of the object 118, which comprises the detector system 114. The components of the devices and systems shall be explained in further detail in the following.

The detector 110, besides the one or more optical sensors 112, comprises at least one evaluation device 126. The evaluation device 126 may be connected to the optical sensors 112 by one or more connectors 128 and/or one or more interfaces. Further, the connector 128 may comprise one or more drivers and/or one or more measurement devices for generating sensor signals, as will be explained with regard to FIGS. 2A and 2B below. Further, instead of using the at least one optional connector 128, the evaluation device 126 may fully or partially be integrated into the optical sensors 112 and/or into a housing 130 of the detector 110. Additionally or alternatively, the evaluation device 126 may fully or partially be designed as a separate device.

In this exemplary embodiment, the object 118, the position of which may be detected, may be designed as an article of sports equipment and/or may form a control element 132, the position of which may be manipulated by a user 134. As an example, the object 118 may be or may comprise a bat, a record, a club or any other article of sports equipment and/or fake sports equipment. Other types of objects 118 are possible. Further, the user 134 himself or herself may be considered as the object 118, the position of which shall be detected.

As outlined above, the detector 110 comprises the plurality of optical sensors 112. The optical sensors 112 may be located inside the housing 130 of the detector 110. Further, at least one transfer device 136 may be comprised, such as one or more optical systems, preferably comprising one or more lenses 138. An opening 140 inside the housing 130, which, preferably, is located concentrically with regard to an optical axis 142 of the detector 110, preferably defines a direction of view 144 of the detector 110. A coordinate system 146 may be defined, in which a direction parallel or antiparallel to the optical axis 142 is defined as a longitudinal direction, whereas directions perpendicular to the optical axis 142 may be defined as transversal directions. In the coordinate system 146, symbolically depicted in FIG. 1, a longitudinal direction is denoted by z, and transversal directions are denoted by x and y, respectively. Other types of coordinate systems 146 are feasible.

The detector 110 may comprise one or more of the optical sensors 112. Preferably, as depicted in FIG. 1, a plurality of optical sensors 112 is comprised, which, more preferably, are stacked along the optical axis 142, in order to form a sensor stack 148. In the embodiment shown in FIG. 1, five optical sensors 112 are depicted. It shall be noted, however, that embodiments having a different number of optical sensors 112 are feasible.

The optical sensors 112 or, at least, the optical sensors 112 besides the optical sensor 112 facing away from the object 118, preferably are transparent to light beams 150 traveling from the object 118 and/or one or more of the beacon devices 116 towards the detector 110, such that the at least one light beam 150 sequentially passes the optical sensors 112.

The detector 110 is adapted for determining a position of the at least one object 118. For this purpose, as will be explained with respect to FIG. 2A and the exemplary embodiment of one of the optical sensors 112 depicted therein, each of the optical sensors 112 comprises a matrix 152 of pixels 154. The detector 110, specifically the evaluation device 126, are adapted for determining an intensity distribution of the pixels 154 of the at least one optical sensor 112 which are illuminated by the light beam 150. The intensity distribution, as an example, may be a distribution of intensity values captured by the pixels 154 during illumination by the light beam 150 or a distribution of numerical values derived thereof.

Figure 2A:
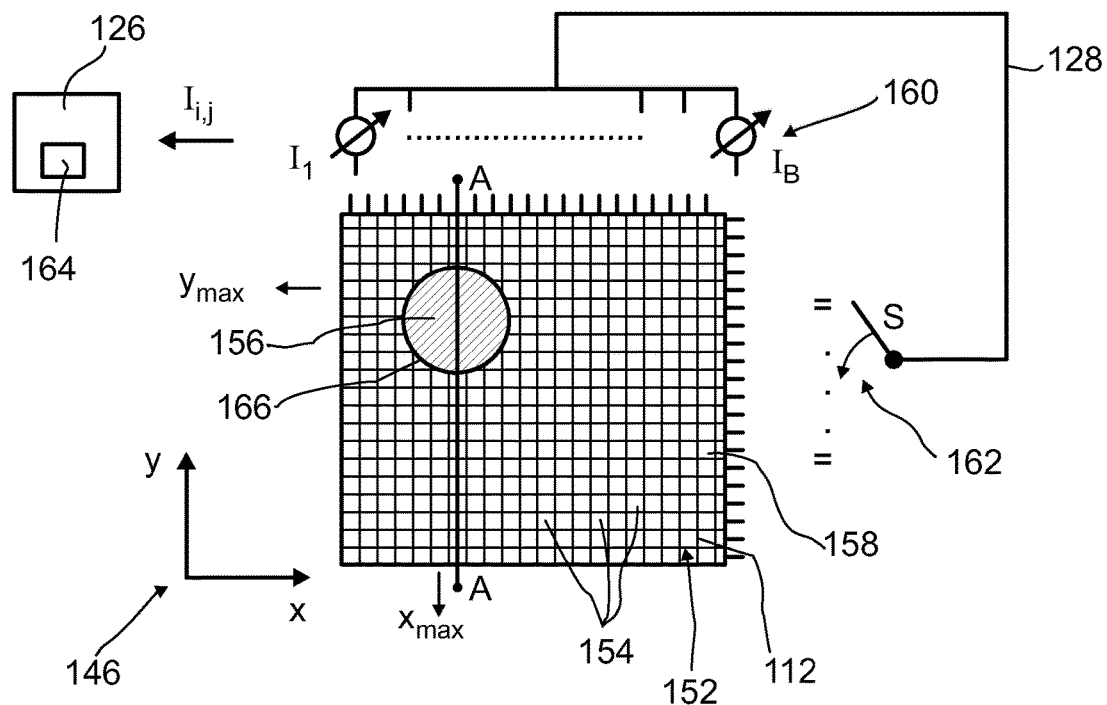
FIG. 2A shows an exemplary embodiment of a detector according to the present invention.

In this exemplary embodiment, the matrix 152 is a rectangular matrix, in which the pixels 154 are arranged in rows in an x-dimension and columns in a y-dimension, as symbolically depicted by the coordinate system 146 depicted in FIG. 2A. The plane of the matrix 152 may be perpendicular to the optical axis 142 of the detector 110 and, thus, may be perpendicular to the longitudinal coordinate z. However, other embodiments are feasible, such as embodiments having non-planar optical sensors 112 and/or embodiments having non-rectangular matrices of pixels 154.

The detector 110 is adapted to determine a position of the object 118, and the optical sensor 112 is adapted to detect the light beam 150 traveling from the object 118 towards the detector 110, specifically from one or more of the beacon devices 116. For this purpose, the evaluation device 126 is adapted to determine at least one longitudinal coordinate of the object 118 by using the intensity distribution of the pixels 154, as will be outlined in further detail below.

The light beam 150, directly and/or after being modified by the transfer device 136, such as being focused by the lens 138, creates a light spot 156 on a sensor surface 158 of the optical sensor 112 or of each of the optical sensors 112. Each of the pixels 154 may be adapted to generate an individual signal, also referred to as an intensity value, as a sensor signal or as a pixel signal, which represents an intensity of illumination of the respective pixel. The entity or totality of sensor signals of the pixels 154 or of values derived thereof may be regarded as an intensity distribution of the pixels.

Thus, as an example, in FIG. 2A, a multiplexing measuring scheme is depicted which may be used for generating sensor signals for each of the pixels 154. Thus, each of the columns of the matrix 152 may be connected to a respective current measurement device 160. A switch 162 may be provided for contacting each of the rows of the matrix 152. Thus, a multiplexing measurement scheme may be implemented in which the rows of the matrix 152 are contacted sequentially. Thus, in a first step, the uppermost row of the matrix 152 may be contacted by switch 162, thereby allowing for measuring electrical currents through each of the pixels of the uppermost row of the matrix 152. The currents may be provided in an analogue format and/or may be transformed into a digital format, such as by providing one or more analogue-digital-converters. Thus, measurement values for each of the pixels of the uppermost pixel row of matrix 152 may be generated, such as by providing 4-bit grayscale values, 8-bit grayscale values or other information formats. The respective information values representing the sensor signals of the pixels 154 may be provided to the evaluation device 126, which may comprise one or more volatile and/or non-volatile data memories 164. Subsequently, by switching switch 162 to contact the second row of the matrix 152, sensor signals for each bit of the second row are generated, followed by sensor values of the subsequent rows. After finishing one measurement of the complete matrix 152, the routine may start anew, such as by contacting the first row of the matrix 152 again. Thus, by using this multiplexing scheme or other multiplexing schemes, sensor signals for each of the pixels 154 may be generated. Since the multiplexing may be performed at a high repetition rate, it may be assumed that neither the intensity of the light beam 150 nor the position of the light spot 156 changes significantly during one multiplexing cycle. However, it shall be noted that, specifically for fast moving objects 118, other schemes for generating sensor values may be used, such as measurement schemes creating sensor values for each pixel 154 of the matrix 152 simultaneously.

As outlined above, preferably, the matrix 152 preferably contains at least 10 pixel rows and at least 10 pixel columns. Thus, as an example, at least 20 pixel rows and at least 20 pixel columns may be present, preferably at least 50 pixel rows and 50 pixel columns and, more preferably, at least 100 pixel rows and 100 pixel columns. Thus, specifically, standard formats may be used, such as VGA and/or SVGA.

The sensor signals provided by the pixels 154 may be used to determine the position of the object 118. Thus, firstly, as outlined in FIG. 2A, the sensor signals of the pixels 154 may be compared, in order to determine the one or more pixels having the highest intensity of illumination by the light beam 150. This center of illumination, such as the center of the light spot 156, may be used for determining coordinates $x_{max}$ and $y_{max}$, representing transversal coordinates of the light spot 156. By using known imaging equations, such as the well-known lens equation, a transversal coordinate of the object 118 and/or the respective beacon device 116 emitting the light beam 150 in the coordinate system 146 may be determined from the coordinates $x_{max}$, $y_{max}$. Thus, by determining a transversal position of the light spot 156 on the sensor surface 158 of the optical sensor 112, a transversal position of the object 118 and/or a part of the object 118 may be determined.

Further, as outlined above and as will be explained in further detail below, the detector 110 is adapted to determine a longitudinal coordinate of the object 118 and/or of the at least one beacon device 116, by using the intensity distribution. For this purpose, various algorithms may be used which will be explained by examples in further detail below. Thus, generally, the evaluation device 126 may be adapted to determine the longitudinal coordinate of the object 118 by using a predetermined relationship between the intensity distribution and the longitudinal coordinate. Specifically, the evaluation device 126 may be adapted to determine at least one intensity distribution function approximating the intensity distribution. Thus, the evaluation device 126 may be adapted to determine the longitudinal coordinate of the object 118 by using a predetermined relationship between a longitudinal coordinate and the intensity distribution function and/or at least one parameter derived from the intensity distribution function. The intensity distribution function, as an example, may be a beam shape function of the light beam 150, as will be explained with regard to FIGS. 8 to 13 below. The intensity distribution function specifically may comprise a two-dimensional or a three-dimensional mathematical function approximating an intensity information contained within at least part of the pixels 154 of the optical sensor 112.

Additionally or alternatively, as will be outlined with respect to FIGS. 2A and 2B below, the evaluation device 126 may be adapted to determine the intensity distribution, wherein determining the intensity distribution comprises determining a number N of pixels of the optical sensor 112 which are illuminated by the light beam 150. The determining of the at least one longitudinal coordinate of the object 118 may comprise using the number N of pixels which are illuminated by the light beam 150, such as by using a predetermined relationship between the number N of pixels which are illuminated by the light beam 150 and the longitudinal coordinate. These options may be combined in various ways.

Specifically, for the purpose of determining the longitudinal coordinate, a diameter and/or equivalent diameter of the light spot 156 may be evaluated, as will be explained in the following. The diameter and/or equivalent diameter may be determined in various ways, such as by using the above-mentioned way of determining an intensity distribution function and/or by using the above-mentioned way of determining the number N of pixels of the optical sensor 112 which are illuminated by the light beam 150. Even a combination of both options is feasible.

As outlined above, in an example, the evaluation device 126 may be adapted to determine a number N of pixels 152 which are illuminated by the light beam 150. For this purpose, a threshold method may be used, in which the sensor signals of each of the pixels 154 are compared to one or more thresholds determining whether the respective pixel 154 is illuminated or not. The one or more thresholds may determine a borderline 166 of the light spot 156, as depicted in FIG. 2A. As an example, assuming a Gaussian illumination with a typical Gaussian intensity profile, the borderline 166 may be chosen as a line at which the intensity of the light spot 156 has dropped from a central intensity $I_0$ (which is the intensity at pixel coordinates $x_{max}, y_{max}$) to $1/e^2 \cdot I_0$.

Figure 2B:
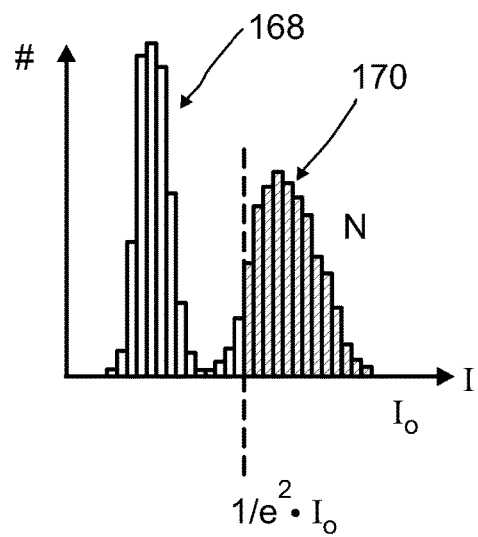
FIG. 2B shows an exemplary embodiment of determining a number N of pixels of an optical sensor of the detector according to FIG. 2A.

The threshold method may easily be implemented, as an example, by using a histogram analysis of the sensor values of one image (such as of one scan of a multiplexing scheme and/or of one image of pixels simultaneously taken), as symbolically depicted in FIG. 2B. It shall be noted that the histogram analysis in FIG. 2B does not fully correspond to the image as depicted in FIG. 2A. In FIG. 2B, on a horizontal axis, the sensor signals of the pixels 154 acquired in one image, denoted by "I" (non withstanding the fact that other sensor signals than currents may be used, such as bit values or grayscale values), are given. On the vertical axis, denoted by "#", the counts for each of the sensor signals are given, i.e. the number of pixels 154 providing the respective sensor signal I. Thus, as an example, grayscale values may be given on the horizontal axis, and the number of pixels showing the respective grayscale values in one image may be given on the vertical axis. The highest sensor signal noted within this image is marked as $I_0$. By providing an appropriate threshold $1/e^2 \cdot I_0$ (and/or the closest integer value to this threshold, such as the next integer value above $1/e^2 \cdot I_0$ and/or the next integer value below $1/e^2 \cdot I_0$—within the present invention, these options shall be enclosed), as symbolically depicted in FIG. 2B, the pixel counts in this histogram analysis may be divided into counts for non-illuminated pixels 154 (denoted by reference number 168 in FIG. 2B and marked by white bars), i.e. the sensor signals of pixels 154 outside the borderline 166 in FIG. 2A, and counts for illuminated pixels (denoted by reference number 170 in FIG. 2B and marked by filled bars), i.e. pixels 154 within the borderline 166 in FIG. 2A. Thus, by using this threshold method and/or other threshold methods, illuminated pixels and non-illuminated pixels may be distinguished, such as by using an appropriate histogram analysis.

This distinguishing of illuminated and non-illuminated pixels allows for counting the number N of the pixels 154 which are illuminated by the light beam 150. Thus, an integration over the illuminated pixels 170 in FIG. 2B and their respective counts leads to the number N of illuminated pixels. Other methods for determining the number N of illuminated pixels may be used additionally or alternatively.

As given in equation (4) or, for a plurality of optical sensors 112, in equation (4') above, the number N of illuminated pixels is proportional to the area of the light spot 156. Thus, since the diameter of any type of light beam 150 varies with propagation, by evaluating the number N of illuminated pixels, a longitudinal coordinate of the object 118 or, specifically, of one or more beacon devices 116 emitting the respective light beam 150 may be determined. As an example, by assuming Gaussian properties of the light beam 150, equations (6) and/or (6') given above may be used. As an example, the light beam 150 itself may have Gaussian properties. Additionally or alternatively, the at least one transfer device 136 with the at least one optional lens 138 may be used for beam-shaping wherein, still, the spatial information on the longitudinal position of the object 118 or, specifically, the respective beacon device 116, is contained in the propagation properties of the shaped light beam 150.

In case the detector 110 has a narrow viewing angle, the distance between the object 118 and the detector 110 may be considered a distance in the z-dimension, only. However, since, by using the matrix 152 and e.g. the algorithm given above, transversal coordinates x and/or y may be determined in addition, the full traveling distance of the light beam 150 may easily be calculated, taking into account an offset of the respective beacon device 116 from the optical axis 152. Specifically, for objects which are located off-axis, reference may be made to the explanations regarding FIG. 5 below.

As outlined above, preferably, a plurality of the optical sensors 112 is provided, such as by providing the sensor stack 148. The redundancy of the optical sensors 112 may be used in various ways.

Figure 3A:
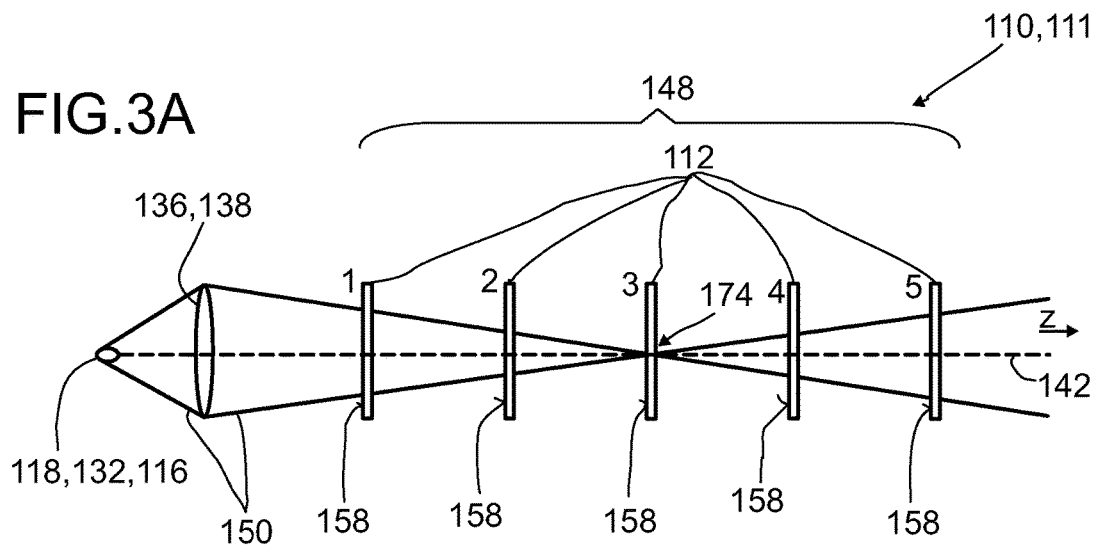
FIGS. 3A and 3B show typical propagation properties of a Gaussian beam.
Figure 3B:
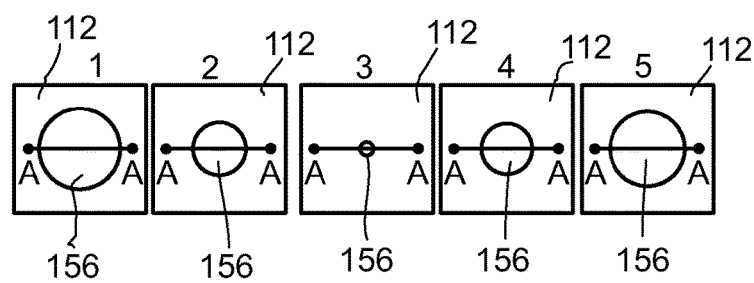

Thus, as outlined above, by determining the number N of illuminated pixels for one of the optical sensors 112, a beam waste may be determined. However, as may easily be derived from one or more of equations (3), (6) or (6') given above, the longitudinal coordinate z derived thereby is ambiguous with respect to the focal point. Thus, by simply determining one beam waste and/or one number N of illuminated pixels, uncertainty may arise whether the respective image was taken at a specific distance z before or after a focal point of the Gaussian light beam 150. This ambiguousness may be resolved in various ways. Thus, firstly, a movement of the detector 110 and/or the object 118 may be tracked, such as by using a series of images and/or a track controller 172 of the tracking system 124. Thus, a history of movements of the object 118 may be tracked, providing additional spatial information of the object 118 may allow for determining whether the respective optical sensor 112 is positioned before or after a focal point of the light beam 150. Additionally or alternatively, however, as will be explained with respect to FIGS. 3A and 3B, a redundancy of information provided by the optical sensor stack 148 may be used for resolving this ambiguousness of the longitudinal coordinate. Thus, in FIG. 3A, a side view of a simplified beam path of the light beam 150, traveling from one or more of the beacon devices 116 towards the detector 110, is depicted. As can be seen, due to Gaussian beam propagation properties, the light beam 150 within the sensor stack 148 narrows, up to a focal point 174, which, in this exemplary embodiment, occurs close to the middle one of the optical sensors 112. Other embodiments of the beam path are feasible. In FIG. 3B, views of the sensor surfaces 158 of the optical sensors and the respective light spots 156 for each of the optical sensors 112 of the setup in FIG. 3A are given. The optical sensors 112 are numbered by numbers 1 through 5, as in FIG. 3A. As can be seen, the light spot 156 in the middle optical sensor 112, close to the focal point 174, is smallest, whereas the diameter of the light spots 156 to the right and to the left of this middle sensor (sensor number 3) widens. As can be seen by comparing the diameter of the light spots 156 of the optical sensors 1 and 5 or 2 and 4, the diameter is ambiguous. However, by comparing a specific diameter with diameters of light spots of neighboring optical sensors, it may be determined whether the light beam widens or narrows, i.e. whether the respective optical sensor 112 is positioned before or after the focal point 174. Thus, the above-mentioned ambiguousness may be resolved, and a z-coordinate may be determined, such as in the coordinate system 146 and/or in another coordinate system.

The optical sensors 112 of the sensor stack 148, as outlined above, preferably are transparent to the light beam 150. For the last optical sensor 112 of the sensor stack 148, facing away from the object 118, such as the optical sensor 112 named "5" in FIG. 3A, a transparency not necessarily has to be present. Thus, this last optical sensor 112 may also be intransparent.

Figure 3C:
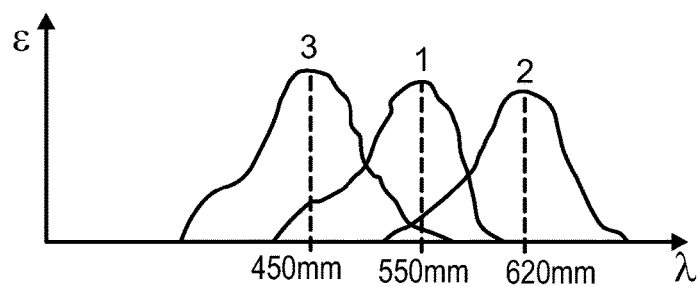
FIG. 3C shows spectral sensitivities of three optical sensor devices.

As further outlined above, providing a plurality of the optical sensors 112, such as in a stacked fashion, may, additionally or alternatively, also be used for other purposes. Thus, the optical sensors 112 may provide different spectral sensitivities, in order to provide at least one information on a color of the light beam 150. Thus, in FIG. 3C, extinction coefficients of three of the optical sensors 112 are given as a function of the wavelength λ. These extinction coefficients or any other measure indicating a spectrum of absorption of the respective optical sensors 112, may be adjusted by providing appropriate absorptive materials, such as appropriate dyes, within the optical sensors 112. As an example, in case the optical sensors 112 comprise dye-sensitized solar cells (DSCs, specifically sDSCs), an appropriate dye may be chosen. As an example, in FIG. 3C, different spectral sensitivities (such as normalized sensitivities) $\epsilon$ are given for optical sensors 1, 2 and 3, as an example, as a function of the wavelength λ. Assuming that the total power of the light beam remains identical for all light spots 156 on the sensor surfaces 158, or, with known attenuation of the light beam 150 after passing a specific optical sensor 112, a ratio of the sensor signals of the respective optical sensors 112 having different absorption properties may be used for determining a color of the light beam 150. As an example, for each of the optical sensors 112, a total sensor signal may be determined by adding the sensor signals of each of the pixels 154. Alternatively, a respective representative sensor signal for each of the optical sensors 112 may be determined, such as a peak value or maximum value of the sensor signals. Again, alternatively, the sensor signals of the pixels 154 within the light spots 156 may be integrated, thereby generating a representative sensor signal for each of the optical sensors 112. In the exemplary embodiment depicted in FIG. 3C, an information on a green component of the light beam 150, e.g., may be determined by dividing the sensor signal of the third optical sensor 112 (sensor number 3) by a sum of the sensor signals of optical sensors 1, 2 and 3. Similarly, a yellow component of the light beam 150 may be determined by dividing the sensor signal of the first optical sensor by a sum of the sensor signals of optical sensors 1, 2 and 3. Again, similarly, a red component of the light beam 150 may be determined by dividing the sensor signal of the second optical sensor 112 by a sum of the sensor signals of optical sensors 1, 2 and 3. Other embodiments and/or algorithms for determining colors are feasible. Thus, as an example, the absorption spectra of three of the optical sensors 112 may be similar to the absorption materials used as a basis of the above-mentioned CIE coordinate system, thereby directly allowing for determining CIE coordinates of the light beam 150. It shall be noted that the determination of the color of the light beam 150 is independent from the above-described determination of the longitudinal coordinate of the object 118, since the above-mentioned algorithm is simply based on a counting of illuminated and non-illuminated pixels, independent from the color of the light beam 150. Thus, e.g. in the threshold method and histogram analysis described with regard to FIGS. 2A and 2B above, an internal normalization of the intensity of the light beam and/or the color of the light beam may take place, since, as outlined above, the threshold may be chosen as a function and/or fraction of a maximum intensity and/or of a maximum sensor signal. Thus, the determination of the longitudinal coordinate by using the above-mentioned pixel count is independent from the fact that the respective optical sensors 112 within the sensor stack 148 may have different spectral absorption properties.

As outlined above, the determination of a position of the object 118 and/or a part thereof by using the detector 110 may be used for providing a human-machine interface 120, in order to provide at least one item of information to a machine 176. In the embodiment schematically depicted in FIG. 1, the machine 176 may be a computer and/or may comprise a computer. Other embodiments are feasible. The evaluation device 126 even may fully or partially be integrated into the machine 176, such as into the computer. The same holds true for the track controller 172, which may also fully or partially form part of the computer of the machine 176.

Similarly, as outlined above, the human-machine interface 120 may form part of an entertainment device 122. The machine 176, specifically the computer, may also form part of the entertainment device 122. Thus, by means of the user 134 functioning as the object 118 and/or by means of the user 134 handling a control device 132 functioning as the object 118, the user 134 may input at least one item of information, such as at least one control command, into the computer, thereby varying the entertainment function, such as controlling the course of a computer game.

As outlined above, the one optical sensor 112 and/or one or more of the optical sensors 112 preferably may fully or partially be transparent with regard to the light beam 150. In FIGS. 4A to 4C, an exemplary setup of a transparent optical sensor 112 is depicted in various views. Therein, FIG. 4A shows a top view, FIG. 4B shows a cross-sectional view along line A-A in FIG. 4A, and FIG. 4C shows a cross-sectional view along line B-B in FIG. 4A.

The optical sensor 112 may comprise a transparent substrate 178, such as a glass substrate and/or a plastic substrate. For potential details of the substrate 178, reference may be made to documents WO 2012/110924 A1 and U.S. provisional applications Nos. 61/739,173 and/or 61/749,964. However, other embodiments are feasible. The illumination by the light beam 150 may take place through the substrate 178 and/or from an opposite side. Thus, the bottom side of the substrate 178 in FIG. 4B may form the sensor surface 158. Alternatively, an illumination from the opposing surface may take place.

On top of the substrate 178, a first electrode 180 is deposited, which, in this embodiment, may comprise a plurality of first electrode stripes 182. Preferably, the first electrode 180 is fully or partially transparent. Thus, as an example, the first electrode 180 may fully or partially be made of a transparent conductive oxide, such as fluorine-doped tin oxide (FTO) and/or indium-doped tin oxide (ITO). For further details of the first electrode 180, reference may be made to WO 2012/110924 A1 and/or one or more of U.S. provisional applications Nos. 61/739,173 and/or 61/749, 964. However, other embodiments are feasible. A patterning of the first electrode stripes 182 may take place by appropriate patterning techniques which are generally known to the skilled person in the field of display technology, e.g. etching and/or lithographic techniques. Thus, as an example, a large-area coating by the material of the first electrode 180 on the substrate 178 may be provided, wherein the areas of the first electrode stripes 182 may be covered by photoresist and wherein the uncovered regions may be etched by an appropriate etching means, as known to the skilled person in the technical field of display manufacturing, such as LCD manufacturing.

On top of the first electrode 180, one or more light-sensitive layers 184, such as a light-sensitive layer setup comprising one, two, three or more layers, are deposited. As an example, the light-sensitive layers 184 may comprise a layer setup of a dye-sensitized solar cell (DSC), more specifically of a solid dye-sensitized solar cell (sDSC), such as disclosed in WO 2012/110924 A1 and/or one or more of the U.S. provisional applications 61/739,173 and/or 61/749, 964. Thus, the light-sensitive layers 184 may comprise one or more layers of an n-semiconducting metal oxide, preferably a nanoporous metal oxide, such as $TiO_2$, which may directly or indirectly be deposited on top of the first electrode 180. Further, the n-semiconducting metal oxide may fully or partially be sensitized with one or more dyes, such as one or more organic dyes, preferably one or more of the dyes disclosed in WO 2012/110924 A1 and/or one or more of U.S. provisional applications Nos. 61/739,173 and/or 61/749,964. Other embodiments are feasible.

On top of the dye-sensitized n-semiconducting metal oxide, one or more layers of a p-semiconducting and/or conducting material may be deposited. Thus, preferably, one or more solid p-semiconducting organic materials may be used which may directly or indirectly be deposited on top of the n-semiconducting metal oxide. As an example, reference may be made to one or more of the p-semiconducting materials as disclosed in WO 2012/110924 A1 and/or as disclosed in one or more of U.S. provisional application Nos. 61/739,173 and/or 61/749,964. As a preferred example, Spiro-MeOTAD may be used.

It shall be noted that the named light-sensitive layers 184, which preferably may comprise one or more organic light-sensitive layers 184, may also be provided in a different layer setup. Thus, basically, any type of light-sensitive material, such as an organic, inorganic or hybrid layer setup, may be used, which is adapted to provide an electric signal in accordance with an illumination of the layer setup.

As can be seen specifically in the top view of FIG. 4A, the one or more light-sensitive layers 184 preferably are patterned such that one or more contact areas 186 for contacting the first electrode stripes 182 remain uncovered by the light-sensitive layer 184. This patterning may be performed in various ways. Thus, a large-area coating of the light-sensitive layers 184 may be applied, and the contact areas 186 may, subsequently, be uncovered, such as by laser ablation and/or mechanical ablation. Additionally or alternatively, however, the one or more light-sensitive layers 184 may fully or partially be applied to the setup in a patterned way, such as by using appropriate printing techniques. Combinations of the named techniques are feasible.

On top of the at least one light-sensitive layer 184, at least one second electrode 188 is deposited. Again, this at least one second electrode 188 preferably may comprise a plurality of electrode stripes, which, in this embodiment, are denoted by reference number 190 (second electrode stripes). As can be seen specifically in the top view of FIG. 4A, the second electrode stripes 190 preferably are oriented essentially perpendicular to the first electrode stripes 182, such as at an angle of 90°±20°, preferably 90°±10° and more preferably 90°±5°. It shall be noted, however, that other electrode geometries for the first electrode 180 and the second electrode 188 are feasible.

As can be seen in the top view of FIG. 4A, each of the second electrode stripes 190 comprises at least one contact area 192 which allows for an electrical contacting of the second electrode stripes 190.

As further may be derived from the top view in FIG. 4A, the layer setup of the optical sensor 112 provides a plurality of areas in which the second electrode stripes 190 cross the first electrode stripes 182. Each of these areas, by itself, forms an individual optical sensor, which is also referred to as a pixel 154 and which may be contacted electrically by electrically contacting the appropriate contact areas 186, 192 of the respective electrode stripes 182, 190. Thus, by measuring an electrical current through these individual optical sensors, each of the pixels 154 may provide an individual optical signal, as explained above. In this embodiment, the pixels 154 may be arranged in a rectangular setup, forming a rectangular matrix 152. It shall be noted, however, that other setups are feasible, such as non-rectangular matrix setups. Thus, as an example, honeycomb structures or other geometric setups may be realized.

In addition to the layer setup shown in FIGS. 4A to 4C, the optical sensor 112 may comprise one or more encapsulation elements, such as one or more encapsulation layers and/or one or more cover elements, such as glass lids and/or plastic lids. The latter, for example, may be glued on top of the layer setup shown e.g. in FIGS. 4B and 4C, preferably by leaving open the contact areas 186, 192.

The second electrode stripes 190 preferably may comprise one or more metal layers, such as one or more layers of a metal selected from the group consisting of: Al, Ag, Au, Pt, Cu. Additionally or alternatively, combinations of two or more metals may be used, such as metal alloys. As an example, one or more metal alloys selected from the group of NiCr, AlNiCr, MoNb and AlNd may be used. Still, other embodiments are feasible. Preferably, as for the first electrode stripes 182, the second electrode stripes 190 may fully or partially be transparent. This transparency may be realized in various ways. Thus, as an example, thin metal layers may be used, such as metal layers having a thickness of below 50 nm, such as a thickness of ≤30 nm or ≤20 nm. At these layer thicknesses, the typical metals still are transparent. Additionally or alternatively, however, non-metallic conductive materials may be used, such as conductive polymers. As an example, PEDOT:PSS and/or PAM may be used. For further potential details of the setup of the second electrode 188, reference may be made to WO 2012/110924 A1, U.S. 61/739,173 and/or 61/749,964, as mentioned above.

The second electrode stripes 190 may be applied to the layer setup by using typical application techniques. Thus, as an example, one or more metal layers may be deposited by using physical vapor deposition (such as evaporation and/or sputtering). Conductive non-metallic materials, such as conductive polymers, may e.g. be applied by using typical coating techniques, such as spin-coating and/or printing. Other techniques are feasible. The patterning of the second electrode stripes 190 may be performed in various ways. Thus, when using evaporation techniques and/or vacuum deposition techniques, a mask technique may be used, such as evaporation through shadow masks. Additionally or alternatively, printing may be performed in a patterned way. Thus, as an example, screen-printing and/or inkjet-printing may be used for patterning conductive polymers. Again, additionally or alternatively, one or more separating patterns may be provided on the layer setup and/or on the substrate 178, such as photoresist patterns, which sub-divide the second electrode 188 into the second electrode stripes 190.

It shall further be noted that the layer setup of the first electrode 180, the one or more light-sensitive layers 184 and the second electrode 188 may as well be inverted. Thus, as an example, the layer setup of the DSC, specifically the sDSC, may be inverted, as compared to the layer setup described above. Further, additionally or alternatively, the setup of the electrodes 180, 188 may be inverted, thus providing the second electrode 188 on the substrate 178, providing the one or more light-sensitive layers 184 directly or indirectly on top of this second electrode, and providing the first electrode 180 on top of this at least one light-sensitive layer 184. Various variations of the setup are feasible. Further, it shall be noted that one or more of electrodes 180, 188 may as well be intransparent. Thus, as explained above, a detector 110 having only one optical sensor 112 is feasible. In this case, the optical sensor 112 not necessarily has to be transparent. Thus, as an example, the second electrode 188 may be intransparent, such as by using thick metal layers, in case light is transmitted into the optical sensor 112 via sensor surface 158. In case light is transmitted into the optical sensor 112 from the other side, the first electrode 180 may be an intransparent electrode. Further, in case a sensor stack 148 is used, as e.g. in the setup of FIG. 1, the last optical sensor 112 of the sensor stack 148, facing away from the object 118, not necessarily has to be transparent. Thus, an intransparent optical sensor 112 may be used.

Figure 5:
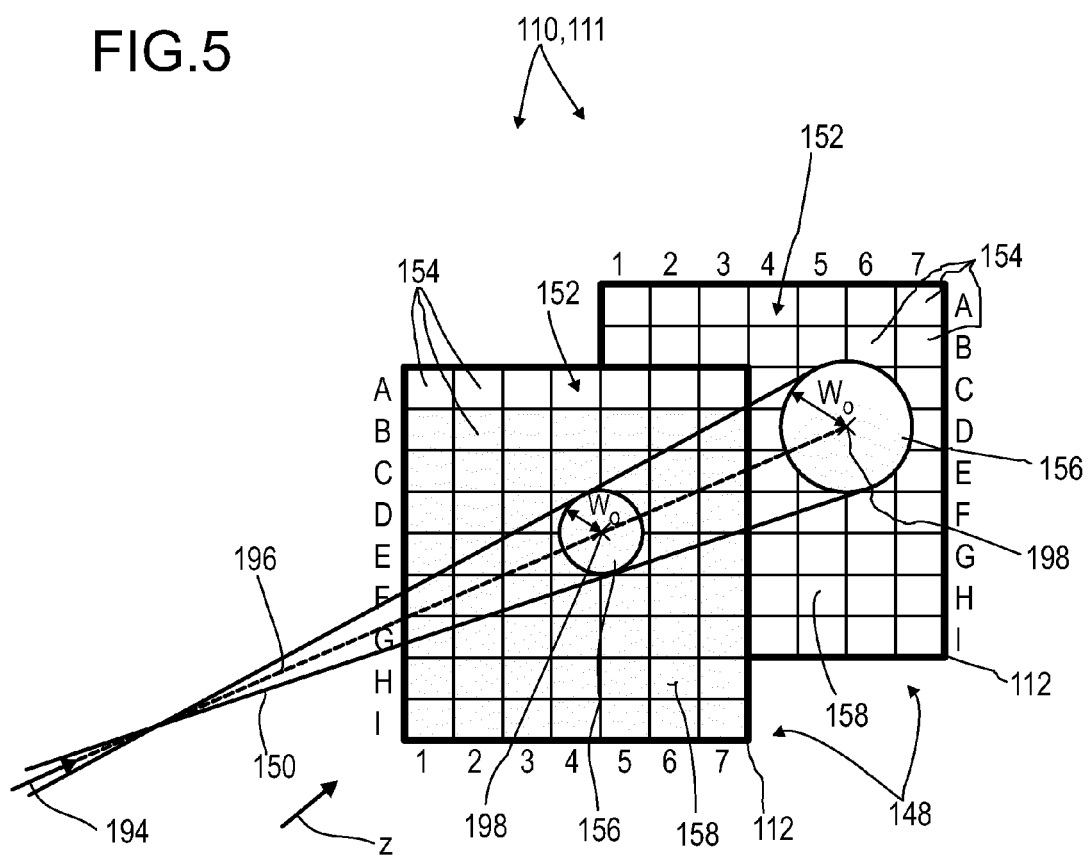
FIG. 5 shows another embodiment of a detector, a camera and of determining a position of an object.

In FIG. 5, in addition to the explanations given above with regard to FIGS. 2A to 3B, a further embodiment of a detector 110 and of a camera 111 are shown in a partial perspective view, which, in the following, will be used for further explaining an embodiment for determining the position of at least one object 118 (not shown in this figure) emitting a light beam 150. The detector 110 and/or the camera 111 may be part of a detector system 114, a human-machine interface 120, an entertainment device 122 or a tracking system 124 and may comprise additional components which are not depicted in FIG. 5. Thus, as an example, the evaluation device 126 is not depicted. With regard to potential embodiments of the evaluation device 126 and/or with regard to further details, reference may be made to the embodiments shown above.

As can be seen, in this preferred embodiment, the detector 110, again, comprises a plurality of optical sensors 112, which, again, are arranged in a sensor stack 148. For potential embodiments of the optical sensors 112 and the sensor stack 148, reference may be made to the embodiments disclosed above.

The sensor stack 148 comprises at least two optical sensors 112, wherein, in this embodiment, only two optical sensors 112 are shown, one optical sensor 112 facing towards the object 118, of the last optical sensor 112 in FIG. 5) and one optical sensor 112 facing away from the object 118 (right optical sensor 112). Preferably, at least one of the optical sensors 112 is at least partially transparent with regard to the light beam 150, such that at least part of the light beam 150, in an unattenuated fashion or in an attenuated fashion, with unchanged spectral properties or modified spectral properties, may pass through the optical sensor 112. Thus, in FIG. 5, the left optical sensor 112 may fully or partially be transparent, whereas the right optical sensor 112 may be intransparent or transparent.

The light beam 150 may propagate in a direction of propagation 194, along an axis of propagation 196, which may be parallel or nonparallel to the z-axis which, preferably, is oriented orthogonally to the sensor surfaces 158 of the optical sensors 112.

As outlined above with regard to FIGS. 2A and 2B, and as outlined above with regard to FIGS. 3A and 3B, light spots 156 created by the light beam 150 on the optical sensors 112 may be evaluated. Thus, as outlined above, for one or more of the light spots 156, a center 198 may be determined, at least within the boundaries of resolution given by the pixels 154. As an example, in FIG. 5, the optical sensors 112 contain matrices 152 of pixels 154, wherein each pixel is characterized by its row (symbolically denoted by row identifier A to I in FIG. 5) and its column (symbolically denoted by column identifier 1 to 7 in FIG. 5). Other embodiments of identifying pixel coordinates are feasible, such as by using numbers both as row identifiers and as column identifiers. Thus, in the exemplary embodiment shown in FIG. 5, the center 198 of the light spot 156 for the left optical sensor 112 may be identified to be located in between rows D and E and in between columns 4 and 5, whereas the center 198 of the light spot 156 on the right optical sensor 112 may be identified to be located in row D and column 6. Thus, by connecting the centers 198, the axis of propagation 196 of the light beam 150 may easily be determined. Consequently, the direction of the object 118 with regard to the detector 110 may be determined. Thus, since the center 198 of the light spot 156 on the right optical sensor 112 is shifted towards the right (i.e. towards higher column numbers), it may be determined that the object 118 is located off centered from the z-Axis towards the right.

Further, as outlined above, by evaluating beam waist $w_0$, a longitudinal coordinate of the object 118 may be determined. Thus, as an example, the beam waist may be dependent on the longitudinal coordinate according to one or more of the above-mentioned relationships, specifically according to a Gaussian relationship. In case the direction of propagation 194 is non-parallel to the optical axis or z-coordinate, as depicted in FIG. 5, the longitudinal coordinate of the object 118 may be a coordinate along the axis of propagation 196. Since, e.g. by comparing the coordinates of the centers 198, the axis of propagation 196 may easily be determined, and angular relationship between the z-axis and the axis of propagation 196 is known, and, thus, a coordinate transformation is easily possible. Thus, generally, by evaluating the pixel counts of one or more optical sensors 112, the position of the object 118 may be determined. Further, since each of the optical sensors 112 may be used for generating an image of the object 118 and since the longitudinal coordinate of the object 118 and/or of one or more points of the object 118 are known, a three-dimensional image of the object 118 may be generated.

As outlined above, counting the number N of pixels of the optical sensor 112 which are illuminated by the light beam 150 is one option of evaluating the intensity distribution of the pixels 154. Additionally or alternatively, the evaluation device 126 may be adapted to determine at least one intensity distribution function approximating the intensity distribution, as will be explained with respect to FIGS. 8 to 13. Thus, the evaluation device 126 may be adapted to determine the longitudinal coordinate of the object 118 by using a predetermined relationship between a longitudinal coordinate and the intensity distribution function and/or at least one parameter derived from the intensity distribution function. The intensity distribution function, as an example, may be a beam shape function of the light beam 150, as will be explained with regard to FIGS. 8 to 13 below. The intensity distribution function specifically may comprise a two-dimensional or a three-dimensional mathematical function approximating an intensity information contained within at least part of the pixels 154 of the optical sensor 112.

Thus, FIGS. 8 through 13 show exemplary embodiments of determining intensity distribution functions of the intensity distribution of the pixels 154 of the matrix 152. In these embodiments, as an example, two-dimensional functions are determined by using appropriate fitting algorithms. Therein, in FIGS. 8 through 13, intensity distributions are given by indicating an intensity value I on a vertical axis, given in arbitrary units, as a function of an identifier p of the respective pixel on the horizontal axis. As an example, pixels 154 along line A-A in FIG. 2A, such as a line through the center of the light spot 156, may be depicted and identified by their vertical coordinate p. Similarly, the evaluation may be performed for each of the optical sensors 112 in FIGS. 3A and 3B, as indicated by horizontal lines A-A in the images of FIG. 3B.

FIGS. 8 through 13 show exemplary embodiments of intensity distributions generated by a single optical sensor 112, wherein the intensities of the single pixels 154 are shown as bars. It shall be noted, however, that, instead of evaluating intensity distributions along a line A-A, other types of evaluations are feasible, such as three-dimensional evaluations evaluating all pixels 154 within the matrix 152, such as by using three-dimensional intensity distribution functions. Further, instead of evaluating a single matrix 152 of a single optical sensor 112 or a part thereof, two or more optical sensors 112 may be evaluated, such as the optical sensors 112 of the sensor stack 148.

As outlined above, in FIGS. 8 through 13, the intensities of the pixels 154 are shown as bars. The evaluation device 126 may be adapted to determine intensity distribution functions, which are shown in these figures as solid lines. As outlined above, the determination of the intensity distribution functions may be performed by using one or more fitting algorithms, thereby e.g. fitting one or more predetermined fitting functions to the actual intensity distributions. As an example, as outlined above, one or more mathematical functions may be used, such as one or more mathematical function selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function; at least one derivative, at least one linear combination or at least one product comprising one or more of the before-mentioned functions. Thus, a single mathematical function or a combination of two or more identical or similar or non-identical mathematical functions may be used as fitting functions and may be fitted to the actual intensity distributions, thereby generating the intensity distribution functions, such as by adapting one or more parameters of these fitting functions.

Figure 8:
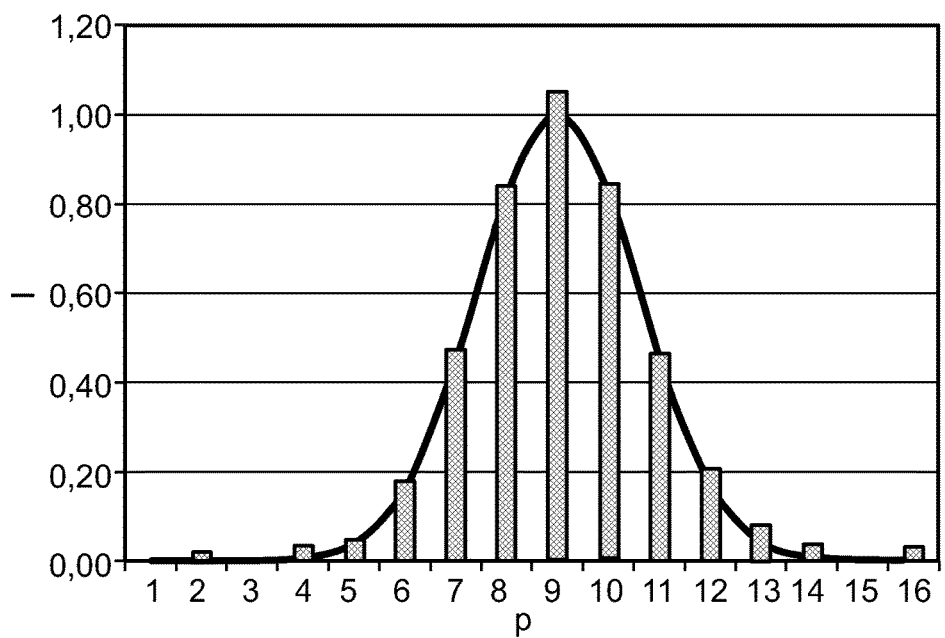
FIG. 8 shows a cut through a Gaussian beam measured by 16 pixels.
Figure 9:
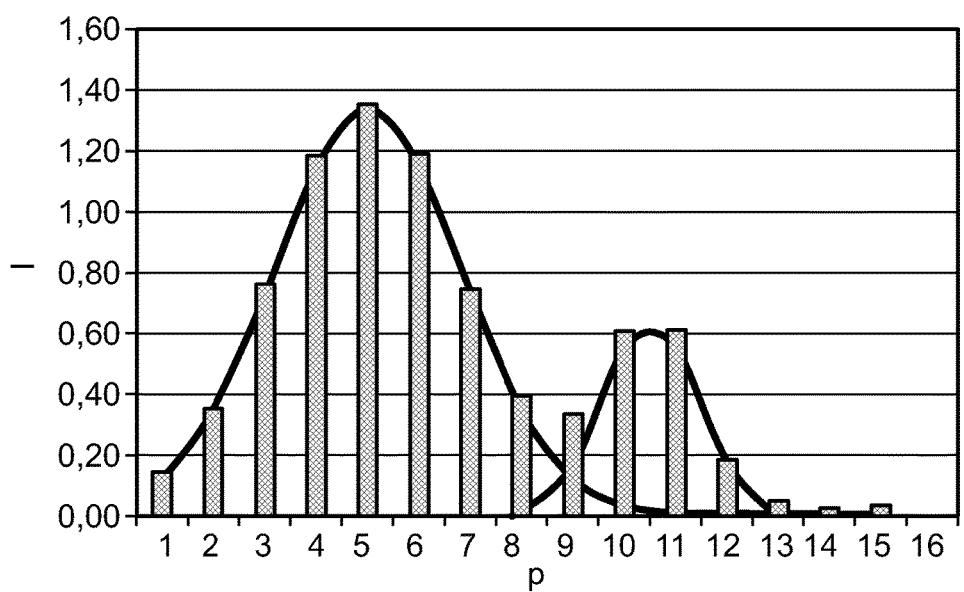
FIG. 9 shows a cut though two Gaussian beams measured by 16 pixels.

Thus, as an example, FIG. 8 shows a cut through a Gaussian beam measured by 16 pixels. The fitted Gaussian function which represents the intensity distribution function is plotted as a solid line. FIG. 9 demonstrates that the evaluation may even be performed in case two or more light beams 150 are present, generating two or more light spots 156. Thus, in FIG. 9, a cut through two Gaussian beams measured by 16 pixels is shown. The fitted Gaussian functions representing two intensity distribution functions are plotted as solid lines in FIG. 9.

Further evaluation of the intensity distributions may be performed as for the case of counting illuminated pixels demonstrated above. Thus, one or more parameters may be determined from the fitted mathematical functions. Thus, as demonstrated by formulae (2) and (3) above, one or more beam waists w may be determined from the fitted Gaussian function in FIG. 8 or for each of the fitted Gaussian functions in FIG. 9. The beam waist may be used as a measure for the diameter or equivalent diameter of the light spot 156. Additionally or alternatively, other parameters may be derived.

By using one or more of the parameters derived, the at least one longitudinal coordinate of the object 118 may be determined, as explained with respect to FIG. 2A, 2B, 3A-3C or 5 above. Thus, as an example, the longitudinal coordinate of the object 118 may be determined by using equation (3) above. Further, as outlined above, a sensor stack 148 may be used. The evaluation shown in FIG. 8 or 9 or any other type of determining an intensity distribution function may be applied to two or more or even all of the optical sensors 112 of the sensor stack 148. Thus, as an example, the evaluation shown in FIG. 8 or 9 may be performed for each of the optical sensors 112 of the stack, thereby deriving a beam diameter or a measure indicating the beam diameter for each of the optical sensors 112. Thereby, three-dimensional images may be generated and evaluated, and, as outlined above with respect to FIGS. 3A and 3B, ambiguities may be resolved. Further, besides a single color evaluation, multicolor evaluation as explained with respect to FIG. 3C may be performed.

Figure 10:
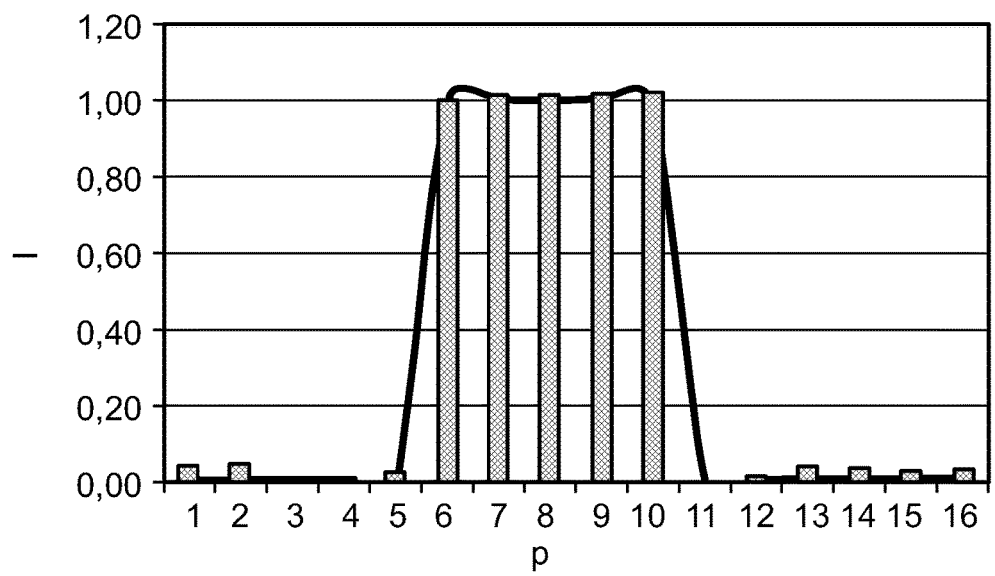
FIG. 10 shows a cut through a square-shaped object measured by 16 pixels.
Figure 11:
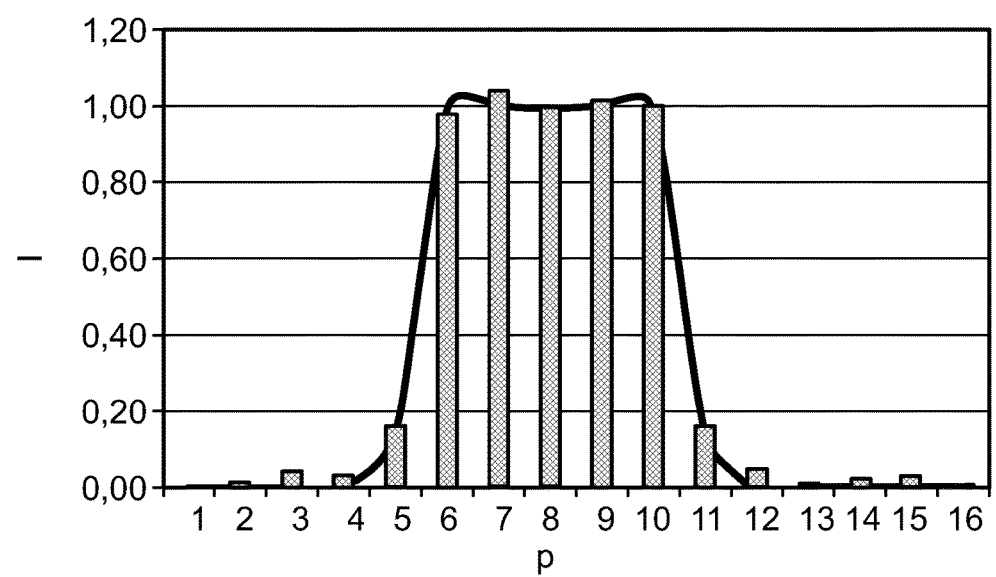
FIG. 11 shows an intensity distribution of the square-shaped object of FIG. 10, when the square-shaped object is slightly out of focus.
Figure 12:
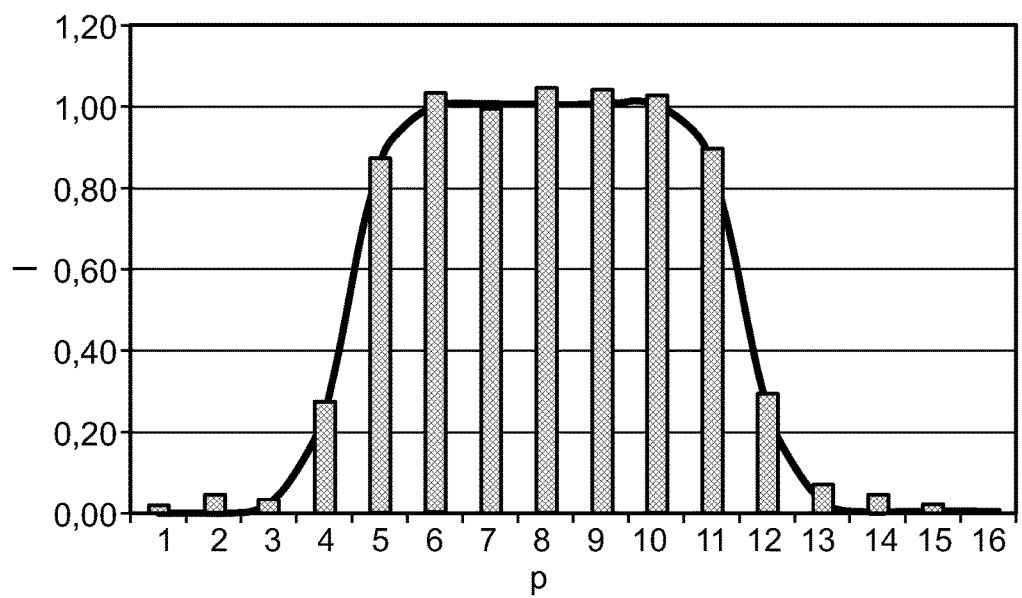
FIG. 12 shows an intensity distribution of the square-shaped object of FIG. 10, when the square-shaped object is out of focus, and its edges are becoming blurred.
Figure 13:
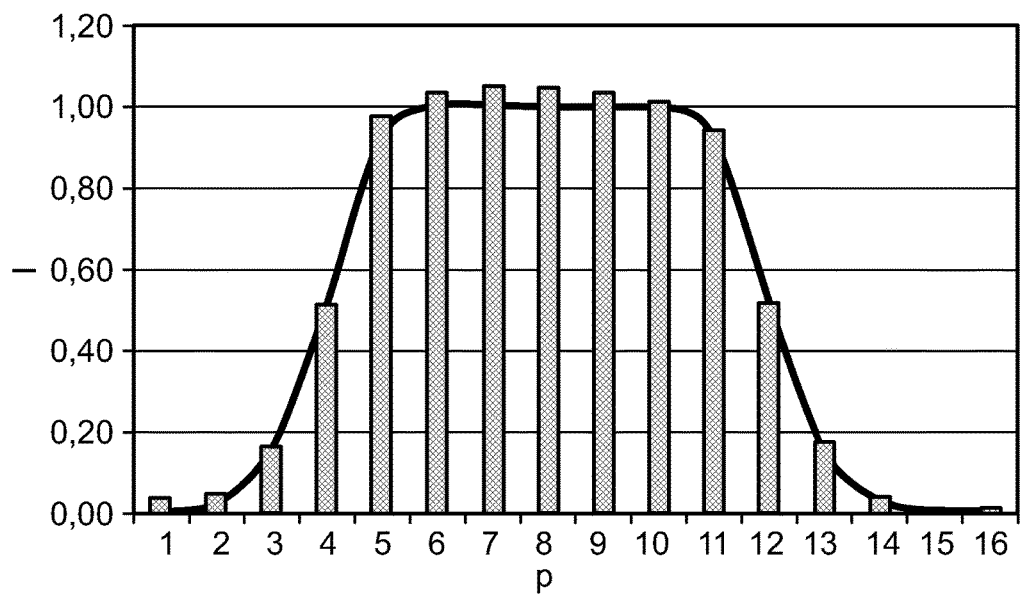
FIG. 13 shows an intensity distribution of the square-shaped object of FIG. 10, when the square-shaped object is further out of focus, inducing a further blurring of the edges and an overall blurred shape of the intensity distribution.

In FIGS. 10 through 13, exemplary embodiments are shown which demonstrate that the evaluation is not restricted to Gaussian intensity distributions and Gaussian intensity distribution functions. Thus, FIG. 10 shows a cut through a square-shaped object measured by 16 pixels. Again, the measured pixel currents, indicating the intensity distribution, are plotted as bars. The intensity distribution function fitted to the intensity distribution, implementing a beam shape function or a fitted edge shape function, is given as a solid line. In this embodiment of FIG. 10, as an example, the square-shaped object 118, e.g. imaged by the transfer device 136 onto the optical sensor 112, is in focus, thereby generating sharp edges. In FIGS. 11 through 13, the object 118 is moving out of focus, thereby generating blurred edges. Thus, FIG. 11 shows the intensity distribution of the square-shaped object 118 of FIG. 10, slightly out of focus. In FIG. 12, the square-shaped object 118 is out of focus, and edges are becoming blurred. In FIG. 13, the square-shaped object 118 is further out of focus, inducing a further blurring of the edges and an overall blurred shape of the intensity distribution. As an example, FIGS. 10 through 13 may be images generated by the different optical sensors 112 of the sensor stack 148, with the optical sensors 112 having differing distances from a focal plane. Additionally or alternatively, the images of FIGS. 10 through 13 may be generated by moving the object 118 along the optical axis 142, thereby varying the intensity distributions. Since the imaging properties of the transfer device 136 are generally well known and since beam propagation properties and imaging may be calculated by standard optical methods, the position of the object 118 or at least one longitudinal coordinate of the object 118 may be determined by evaluating the intensity distribution functions, as the skilled person will know, similar to using equation (3) given above for Gaussian light beams.

Figure 6:
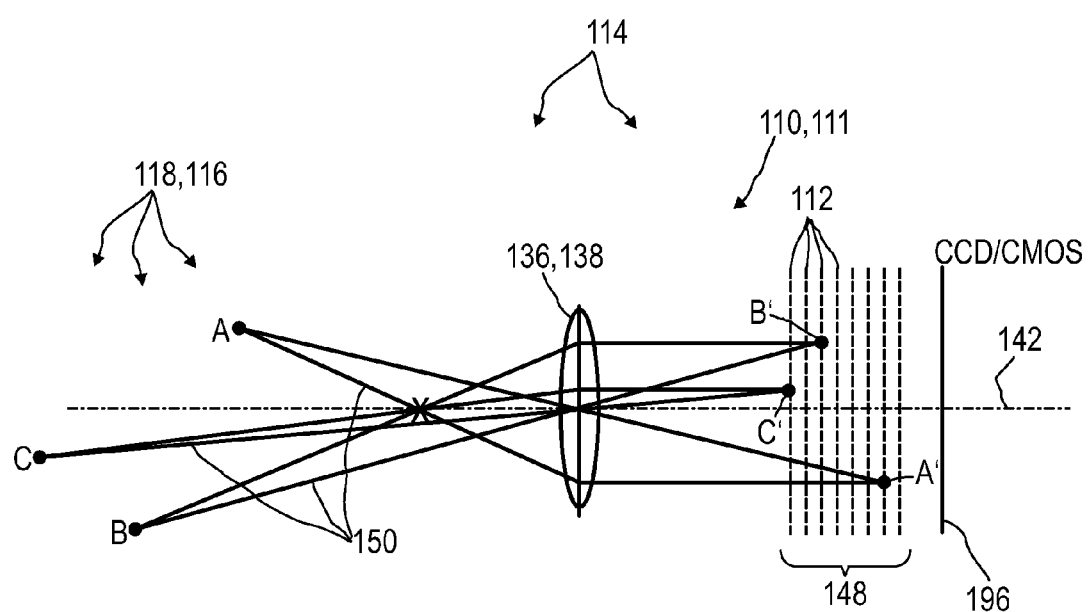
FIG. 6 shows an embodiment of the detector to be used as a light-field camera.

In FIG. 6, a schematic setup of a detector 110 according to the present invention to be used as a light-field camera is shown. Basically, the setup shown in FIG. 6 may correspond to the embodiment shown in FIG. 1 or any other of the embodiments shown herein. The detector 110 comprises a sensor stack 148 of optical sensors 112, also referred to as pixelated sensors, which specifically may be transparent. As an example, pixelated organic optical sensors may be used, such as organic solar cells, specifically sDSCs. In addition, the detector 110 may comprise at least one transfer device 136 such as at least one lens 138 or lens system, adapted for imaging objects 118. Additionally, in this embodiment or other embodiments, the detector 110 may comprise at least one imaging device 196, such as a CCD and/or a CMOS imaging device.

As outlined above, the detector 110 in the embodiment shown herein is suited to act as a light-field camera. Thus, light-beams 150 propagating from various objects 118 or beacon devices 116, symbolically denoted by A, B and C in FIG. 6, are focused by the transfer device 136 into corresponding images, denoted by A', B' and C' in FIG. 6. By using the stack 148 of optical sensors 112, a three-dimensional image may be captured. Thus, specifically in case the optical sensors 112 are FiP-sensors, i.e. sensors for which the sensor signals are dependent on the photon density, the focal points for each of the light beams 150 may be determined by evaluating sensor signals of neighboring optical sensors 112. Thus, by evaluating the sensor signals of the stack 148, beam parameters of the various light beams 150 may be determined, such as a focal position, spreading parameters or other parameters. Thus, as an example, each light beam 150 and/or one or more light beams 150 of interest may be determined in terms of their beam parameters and may be represented by a parameter representation and/or vector representation. Thus, since the optical qualities and properties of the transfer device 136 are generally known, as soon as the beam parameters of the light beams 150 are determined by using the stack 148, a scene captured by the optical detector 110, containing one or more objects 118, may be represented by a simplified set of beam parameters. For further details of the light-field camera shown in FIG. 6, reference may be made to the description of the various possibilities given above.

Further, as outlined above, the optical sensors 112 of the stack 148 of optical sensors may have identical or different wavelength sensitivities. Thus, the stack 148 may, besides the optional imaging device 196, comprise two types of optical sensors 112, such as in an alternating fashion. Therein, a first type and a second type of optical sensors 112 may be provided in the stack 148. The optical sensors 112 of the first type and the second type specifically may be arranged in an alternating fashion along the optical axis 142. The optical sensors 112 of the first type may have a first spectral sensitivity, such as a first absorption spectrum, such as a first absorption spectrum defined by a first dye, and the optical sensors 112 of the second type may have a second spectral sensitivity different from the first spectral sensitivity, such as a second absorption spectrum, such as a second absorption spectrum defined by a second dye. By evaluating sensor signals of these two or more types of optical sensors 112, color information may be obtained. Thus, in addition to the beam parameters which may be derived, the two or more types of optical sensors 112 may allow for deriving additional color information, such as for deriving a full-color three-dimensional image. Thus, as an example, color information may be derived by comparing the sensor signals of the optical sensors 112 of different color with values stored in a look-up table. Thus, the setup of FIG. 6 may be embodied as a monochrome, a full-color or multicolor light-field camera.

Figure 7:
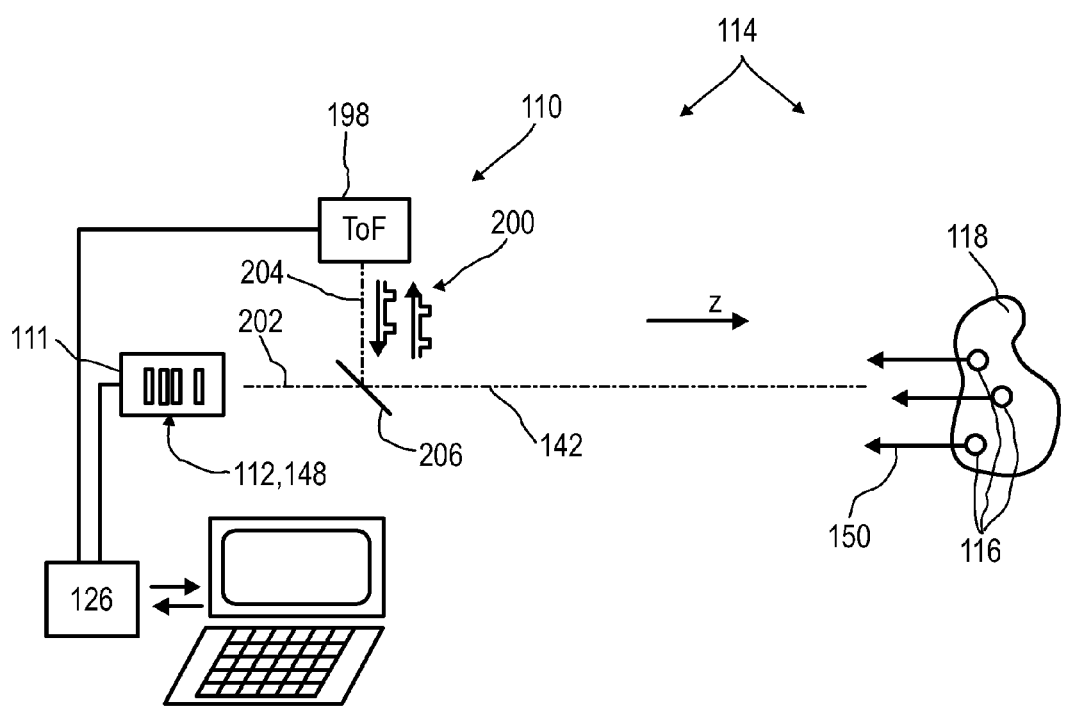
FIG. 7 shows an exemplary arrangement of an implementation of a time-of-flight detector into the detector.

As outlined above, the detector 110 may further comprise one or more time-of-flight detectors. This possibility is shown in FIG. 7. The detector 110, firstly, comprises at least one component comprising the one or more pixelated optical sensors 112, such as a sensor stack 148. In the embodiment shown in FIG. 7, the at least one unit comprising the optical sensors 112 is denoted as a camera 111. It shall be noted, however, that other embodiments are feasible. For details of potential setups of the camera 111, reference may be made to the setups shown above, such as the embodiment shown in FIG. 1, or other embodiments of the detector 110. Basically any setup of the detector 110 as disclosed above may also be used in the context of the embodiment shown in FIG. 7.

Further, the detector 110 comprises at least one time-of-flight (ToF) detector 198. As shown in FIG. 7, the ToF detector 198 may be connected to the evaluation device 126 of the detector 110 or may be provided with a separate evaluation device. As outlined above, the ToF detector 198 may be adapted, by emitting and receiving pulses 200, as symbolically depicted in FIG. 7, to determine a distance between the detector 110 and the object 118 or, in other words, a z-coordinate along the optical axis 142.

The at least one optional ToF detector 198 may be combined with the at least one detector having the pixelated optical sensors 112 such as the camera 111 in various ways. Thus, as an example and as shown in FIG. 7, the at least one camera 111 may be located in a first partial beam path 202, and the ToF detector 198 may be located in a second partial beam path 204. The partial beam paths 202, 204 may be separated and/or combined by at least one beam-splitting element 206. As an example, the beam-splitting element 206 may be a wavelength-indifferent beam-splitting element 206, such as a semi-transparent mirror. Additionally or alternatively, a wavelength-dependency may be provided, thereby allowing for separating different wavelengths. As an alternative, or in addition to the setup shown in FIG. 7, other setups of the ToF detector 198 may be used. Thus, the camera 111 and the ToF detector 198 may be arranged in line, such as by arranging the ToF detector 198 behind the camera 111. In this case, preferably, no intransparent optical sensor is provided in the camera 111, and all optical sensors 112 are at least partially transparent. Again, as an alternative or in addition, the ToF detector 198 may also be arranged independently from the camera 111, and different light paths may be used, without combining the light paths. Various setups are feasible.

As outlined above, the ToF detector 198 and the camera 111 may be combined in a beneficial way, for various purposes, such as for resolving ambiguities, for increasing the range of weather conditions in which the optical detector 110 may be used, or for extending a distance range between the object 118 and the optical detector 110. For further details, reference may be made to the description above.

LIST OF REFERENCE NUMBERS 110 detector
111 camera
112 optical sensor
114 detector system
116 beacon device
118 object
120 human-machine interface
122 entertainment device
124 tracking system
126 evaluation device
128 connector
130 housing
132 control device
134 user
136 transfer device
138 lens
140 opening
142 optical axis
144 direction of view
146 coordinate system
148 sensor stack
150 light beam
152 matrix
154 pixel
156 light spot
158 sensor surface
160 current measurement device
162 switch
164 data memory
166 borderline
168 non-illuminated pixels
170 illuminated pixels
172 track controller
174 focal point
176 machine
178 substrate
180 first electrode
182 first electrode stripes
184 light-sensitive layer
186 contact area
188 second electrode
190 second electrode stripes
192 contact area
194 direction of propagation
192 axis of propagation
194 center
196 imaging device
198 time-of-flight detector
200 pulses
202 first partial beam path
204 second partial beam path
206 beam-splitting element

The invention claimed is:

1. A detector for determining a position of at least one object, the detector comprising:
  at least one optical sensor configured to detect a light beam traveling from the object towards the detector, the optical sensor including at least one matrix of pixels; and
  at least one evaluation device, configured to determine an intensity distribution of pixels of the optical sensor that are illuminated by the light beam, the evaluation device further configured to determine at least one longitudinal coordinate of the object by using the intensity distribution.

2. The detector according to claim 1, wherein the evaluation device is configured to determine the longitudinal coordinate of the object by using a predetermined relationship between the intensity distribution and the longitudinal coordinate.

3. The detector according to claim 1, wherein the evaluation device is configured to determine at least one intensity distribution function approximating the intensity distribution.

4. The detector according to claim 3, wherein the evaluation device is configured to determine the longitudinal coordinate of the object by using a predetermined relationship between a longitudinal coordinate and at least one parameter selected from the group consisting of: the intensity distribution function; at least one parameter derived from the intensity distribution function.

5. The detector according to claim 3, wherein the intensity distribution function is a beam shape function of the light beam.

6. The detector according claim 3, wherein the intensity distribution function comprises a two-dimensional or a three-dimensional mathematical function approximating an intensity information contained within at least part of the pixels of the optical sensor.

7. The detector according to claim 6, wherein the two-dimensional or three-dimensional mathematical function comprises at least one mathematical function selected from the group consisting: of a bell-shaped function; a Gaussian distribution function; a Bessel function; a Hermite-Gaussian function; a Laguerre-Gaussian function; a Lorentz distribution function; a binomial distribution function; a Poisson distribution function; at least one derivative, at least one linear combination or at least one product comprising one or more of the above functions.

8. The detector according to claim 1, wherein the detector is configured to determine intensity distributions in a plurality of planes.

9. The detector according to claim 8, wherein the detector comprises a plurality of optical sensors.

10. The detector according to claim 8, wherein the evaluation device is configured to evaluate a change in the intensity distribution as a function of the longitudinal coordinate along the optical axis for determining the longitudinal coordinate of the object.

11. The detector according to claim 8, wherein the evaluation device is configured to determine a plurality of intensity distribution functions, each intensity distribution function approximating the intensity distribution in one of the planes, wherein the evaluation device is further configured to derive the longitudinal coordinate of the object from the plurality of intensity distribution functions.

12. The detector according to claim 11, wherein each of the intensity distribution functions is a beam shape function of the light beam in the respective plane.

13. The detector according to claim 11, wherein evaluation device is configured to derive at least one beam parameter from each intensity distribution function.

14. The detector according to claim 13, wherein the evaluation device is configured to evaluate a change of the at least one beam parameter as a function of a longitudinal coordinate along the optical axis for determining the longitudinal coordinate of the object.

15. A detector system for determining a position of at least one object, the detector system comprising:
   at least one detector according to claim 1;
   at least one beacon device configured to direct at least one light beam towards the detector, wherein the beacon device is at least one of attachable to the object, holdable by the object, and integratable into the object.

16. A human-machine interface for exchanging at least one item of information between a user and a machine, wherein the human-machine interface comprises:
   at least one detector system according to claim 15, wherein the at least one beacon device is configured to be at least one of directly attached to the user, indirectly attached to the user, and held by the user,
   wherein the human-machine interface is configured to determine at least one position of the user by the detector system, wherein the human-machine interface is configured to assign to the position at least one item of information.

17. An entertainment device for carrying out at least one entertainment function, wherein the entertainment device comprises:
   at least one human-machine interface according to claim 16, wherein the entertainment device is configured to enable at least one item of information to be input by a player by the human-machine interface;
   wherein the entertainment device is configured to vary the entertainment function in accordance with the information.

18. A tracking system for tracking a position of at least one movable object, the tracking system comprising:
   at least one detector system according to claim 15;
   at least one track controller, wherein the track controller is configured to track a series of positions of the object at specific points in time.

19. A camera for imaging at least one object, the camera comprising at least one detector according to claim 1.

20. A method for determining a position of at least one object, the method comprising:
   at least one detection, wherein at least one light beam traveling from the object to a detector is detected by at least one optical sensor of the detector; the at least one optical sensor including at least one matrix of pixels; and
   at least one evaluation, wherein an intensity distribution of pixels of the optical sensor is determined that are illuminated by the light beam; wherein at least one longitudinal coordinate of the object is determined by using the intensity distribution.

* * * * *

UNITED STATES PATENT AND TRADEMARK OFFICE
CERTIFICATE OF CORRECTION

PATENT NO. : 9,989,623 B2
APPLICATION NO. : 14/897467
DATED : June 5, 2018
INVENTOR(S) : Robert Send et al.

It is certified that error appears in the above-identified patent and that said Letters Patent is hereby corrected as shown below:

On the Title Page

On page 5, Column 1, item (56), other publications, Line 54, "Garman" should read -- Gannan --

On page 5, Column 2, item (56), other publications, Line 62, "arid" should read -- and --

In the Specification

In Column 8, Line 51, "filling" should read -- fitting --

In Column 10, Line 2, after "such as" insert -- "as" --

In Column 15, Line 47, "organic inorganic" should read -- organic-inorganic --

In Column 27, Line 4, "applications," should read -- applications. --

In Column 27, Line 44, after "conferences" insert -- . --

In Column 30, Line 52, "and or" should read -- and/or --

In Column 31, Line 27, "applications," should read -- applications. --

In Column 32, Line 57, "logisitics" should read -- logistics --

In Column 33, Line 58, "FP" should read -- FiP --

In Column 34, Line 17, "HP" should read -- FiP --

In Column 39, Line 13, "SRI," should read -- SPI, --

Signed and Sealed this
Seventeenth Day of September, 2019

Andrei Iancu
*Director of the United States Patent and Trademark Office*

CERTIFICATE OF CORRECTION (continued)
U.S. Pat. No. 9,989,623 B2

In Column 39, Line 31, "RE" should read -- RF --

In Column 39, Line 49, "and or" should read -- and/or --

In Column 54, Line 44, "fight" should read -- light --

In Column 77, Line 6, "PAM" should read -- PANI --

In the Claims

In Column 84, Line 33, Claim 6, after "according" insert -- to --

In Column 84, Line 41, Claim 7, "consisting: of" should read -- consisting of: --

In Column 85, Line 1, Claim 13, after "wherein" insert -- the --

In Column 86, Line 21, Claim 20, "detector;" should read -- detector, --

In Column 86, Line 26, Claim 20, "beam;" should read -- beam, --